US011914217B2

(12) United States Patent
Cheng et al.

(10) Patent No.: US 11,914,217 B2
(45) Date of Patent: Feb. 27, 2024

(54) IMAGING LENS ASSEMBLY AND ELECTRONIC DEVICE

(71) Applicant: LARGAN PRECISION CO., LTD., Taichung (TW)

(72) Inventors: Jyun-Jia Cheng, Taichung (TW); Lin-An Chang, Taichung (TW); Ming-Ta Chou, Taichung (TW); Cheng-Feng Lin, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 760 days.

(21) Appl. No.: 16/935,362

(22) Filed: Jul. 22, 2020

(65) Prior Publication Data

US 2021/0173168 A1 Jun. 10, 2021

(30) Foreign Application Priority Data

Dec. 6, 2019 (TW) .................................. 108144800

(51) Int. Cl.
*G02B 7/02* (2021.01)
*G02B 13/18* (2006.01)

(52) U.S. Cl.
CPC ............. *G02B 7/022* (2013.01); *G02B 7/021* (2013.01); *G02B 13/18* (2013.01)

(58) Field of Classification Search
CPC .......... G02B 7/02; G02B 7/021; G02B 7/022; G02B 7/023; G02B 7/025; G02B 7/026; G02B 7/027; G02B 7/028; G02B 1/118
See application file for complete search history.

(56) References Cited

U.S. PATENT DOCUMENTS

| 7,944,630 B2 | 5/2011 | Shyu et al. |
| 8,405,737 B2 | 3/2013 | Ezawa et al. |
| 9,641,732 B2 | 5/2017 | Yasukochi et al. |
| 9,939,607 B2 | 4/2018 | Jono et al. |
| 9,946,048 B2 | 4/2018 | Zhan et al. |
| 10,120,107 B2 | 11/2018 | Abe et al. |
| 10,191,189 B2 | 1/2019 | Mori et al. |
| 10,288,834 B2 | 5/2019 | Wei |

(Continued)

FOREIGN PATENT DOCUMENTS

CN 203881997 U * 10/2014

*Primary Examiner* — Ephrem Z Mebrahtu
(74) *Attorney, Agent, or Firm* — McClure, Qualey & Rodack, LLP

(57) ABSTRACT

An imaging lens assembly has an optical axis, and includes a plastic carrier element and an imaging lens element set. The plastic carrier element includes an object-side surface, an image-side surface, an outer surface and an inner surface. The object-side surface includes an object-side opening. The image-side surface includes an image-side opening. The inner surface is connected to the object-side opening and the image-side opening. The imaging lens element set is disposed in the plastic carrier element, and includes at least three lens elements, each of at least two adjacent lens elements of the lens elements includes a first axial assembling structure, the first axial assembling structures are corresponding to and connected to each other. A solid medium interval is maintained between the adjacent lens elements and the inner surface. The solid medium interval is directly contacted with the adjacent lens elements and the inner surface.

18 Claims, 44 Drawing Sheets

(56) References Cited

U.S. PATENT DOCUMENTS

| | | | |
|---|---|---|---|
| 2005/0226608 A1* | 10/2005 | Kwon | G02B 7/021 396/91 |
| 2012/0218651 A1* | 8/2012 | Onishi | H02N 2/025 310/323.02 |
| 2015/0316742 A1* | 11/2015 | Jono | G02B 23/2476 359/830 |
| 2016/0301875 A1* | 10/2016 | Iwasaki | G03B 5/02 |
| 2018/0003959 A1* | 1/2018 | Lin | G02B 27/0018 |
| 2021/0011198 A1* | 1/2021 | Suginome | B29D 11/00865 |
| 2022/0146777 A1* | 5/2022 | Inaba | G03B 15/00 |

\* cited by examiner

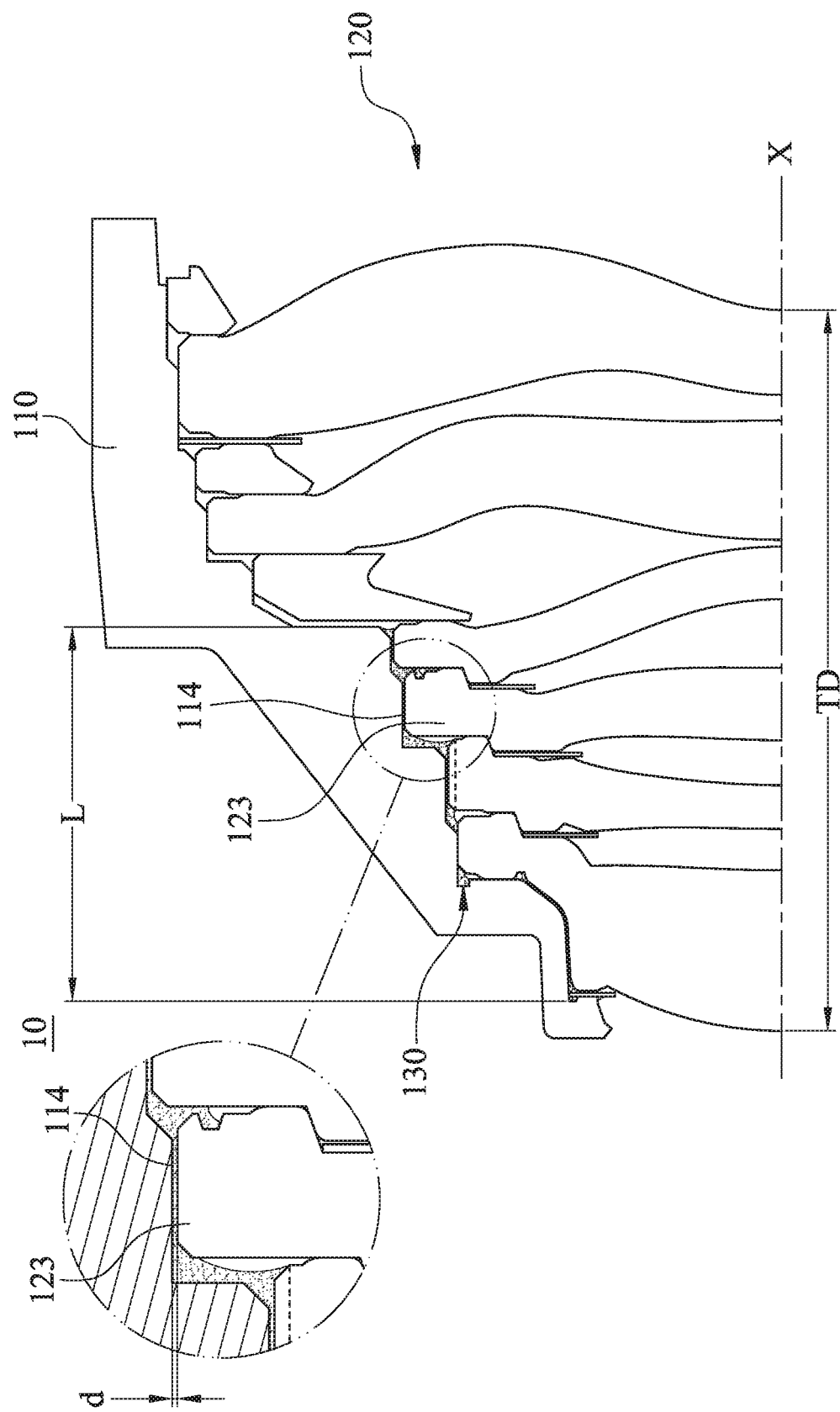

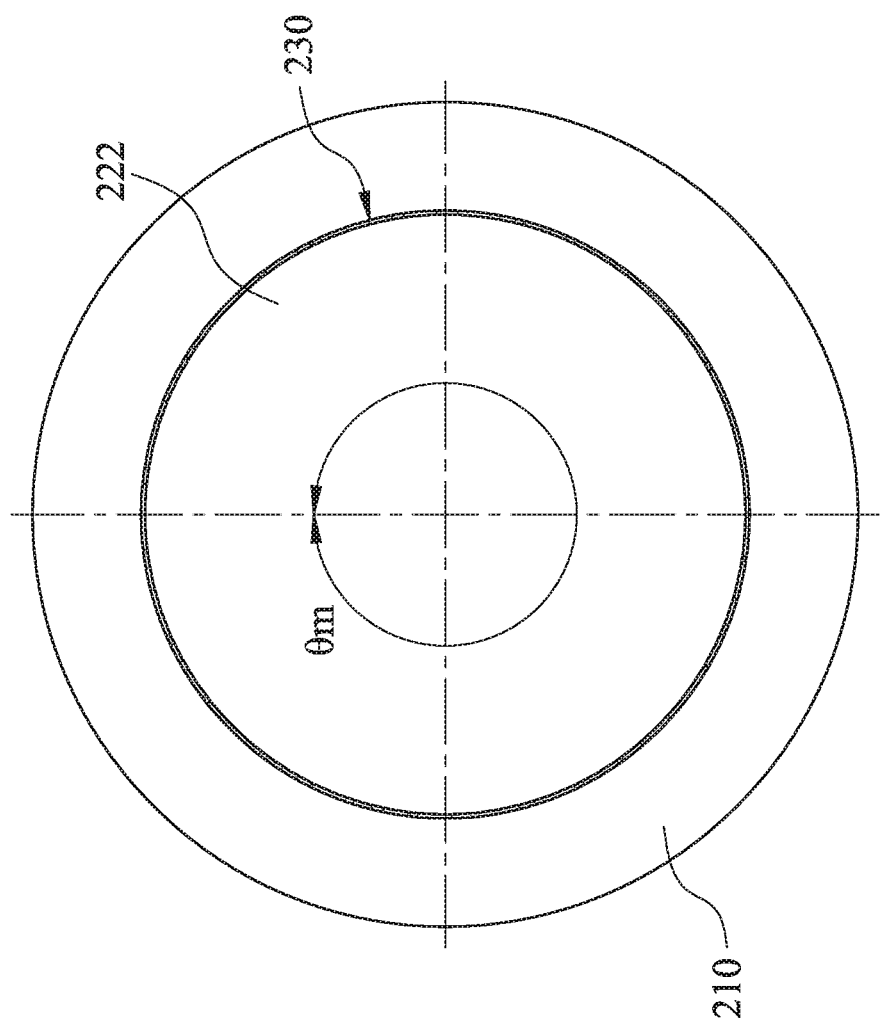

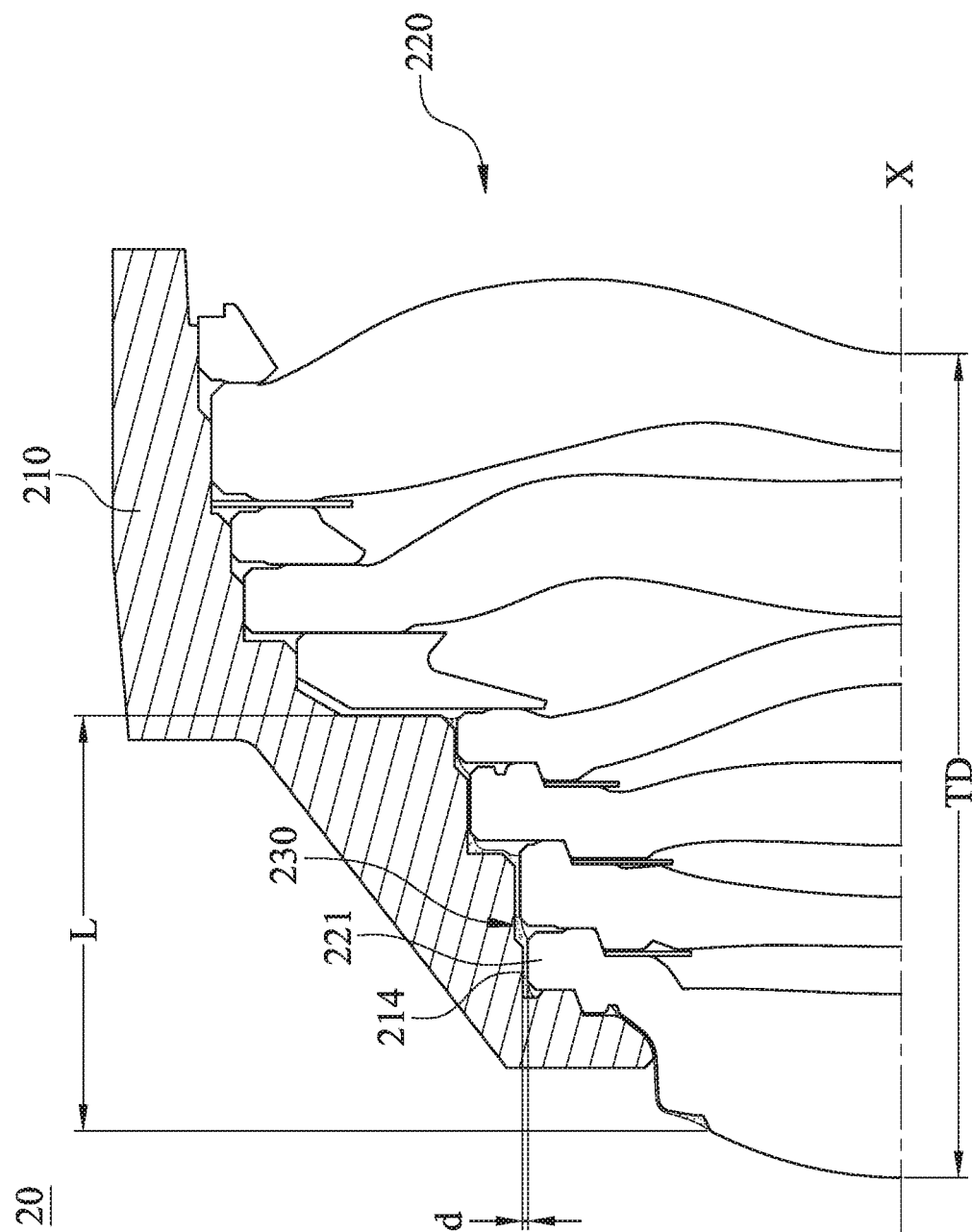

IMAGING LENS ASSEMBLY AND ELECTRONIC DEVICE

RELATED APPLICATIONS

This application claims priority to Taiwan Application Serial Number 108144800, filed Dec. 6, 2019, which is herein incorporated by reference.

BACKGROUND

Technical Field

The present disclosure relates to an imaging lens assembly. More particularly, the present disclosure relates to an imaging lens assembly applicable to portable electronic devices.

Description of Related Art

In recent years, portable electronic devices have developed rapidly. For example, intelligent electronic devices and tablets have been filled in the lives of modern people, and imaging lens assemblies mounted on portable electronic devices have also prospered. However, as technology advances, the quality requirements of imaging lens assembly are becoming higher and higher. Therefore, an imaging lens assembly with an efficiency of blocking the non-imaging light needs to be developed.

SUMMARY

According to one aspect of the present disclosure, an imaging lens assembly has an optical axis, and includes a plastic carrier element and an imaging lens element set. The plastic carrier element includes an object-side surface, an image-side surface, an outer surface and an inner surface. The object-side surface includes an object-side opening. The image-side surface includes an image-side opening. The inner surface is connected to the object-side opening and the image-side opening. The imaging lens element set is disposed in the plastic carrier element, and includes at least three lens elements. Each of at least two adjacent lens elements of the lens elements includes a first axial assembling structure, and the first axial assembling structures are corresponding to and connected to each other. A solid medium interval is maintained between the adjacent lens elements and the inner surface. The solid medium interval is directly contacted with the adjacent lens elements and the inner surface. When an angle between the solid medium interval at a plane vertical to the optical axis and the optical axis is θm, the following condition is satisfied: 90 degrees≤θm≤360 degrees.

According to another aspect of the present disclosure, an imaging lens assembly has an optical axis, and includes a plastic carrier element and an imaging lens element set. The plastic carrier element includes an object-side surface, an image-side surface, an outer surface and an inner surface. The object-side surface includes an object-side opening. The image-side surface includes an image-side opening. The inner surface is connected to the object-side opening and the image-side opening. The imaging lens element set is disposed in the plastic carrier element, and includes at least three lens elements. Each of at least two adjacent lens elements of the lens elements includes a first axial assembling structure, and the first axial assembling structures are corresponding to and connected to each other. A solid medium interval is maintained between the adjacent lens elements and the inner surface. The solid medium interval is directly contacted with the adjacent lens elements and the inner surface. A range of an outer periphery of at least one lens element of the lens elements directly contacted with the solid medium interval is larger than a range of the outer periphery of the at least one lens element of the lens elements non-contacted with the solid medium interval at a plane vertical to the optical axis. When a space width of the solid medium interval between the adjacent lens elements and the inner surface is d, the following condition is satisfied: 0.01 mm≤d<0.18 mm.

According to one aspect of the present disclosure, an electronic device includes the imaging lens assembly of the aforementioned aspect and an image sensor. The image sensor is disposed on an image surface of the imaging lens assembly.

BRIEF DESCRIPTION OF THE DRAWINGS

FIG. 1H is a schematic view of parameters according to the 1st example in FIG. 1A.

FIG. 2D is a plane view of the plastic carrier element and the second lens element according to the 2nd example in FIG. 2A.

FIG. 2E is a schematic view of parameters according to the 2nd example in FIG. 2A.

DETAILED DESCRIPTION

Figure 1A:
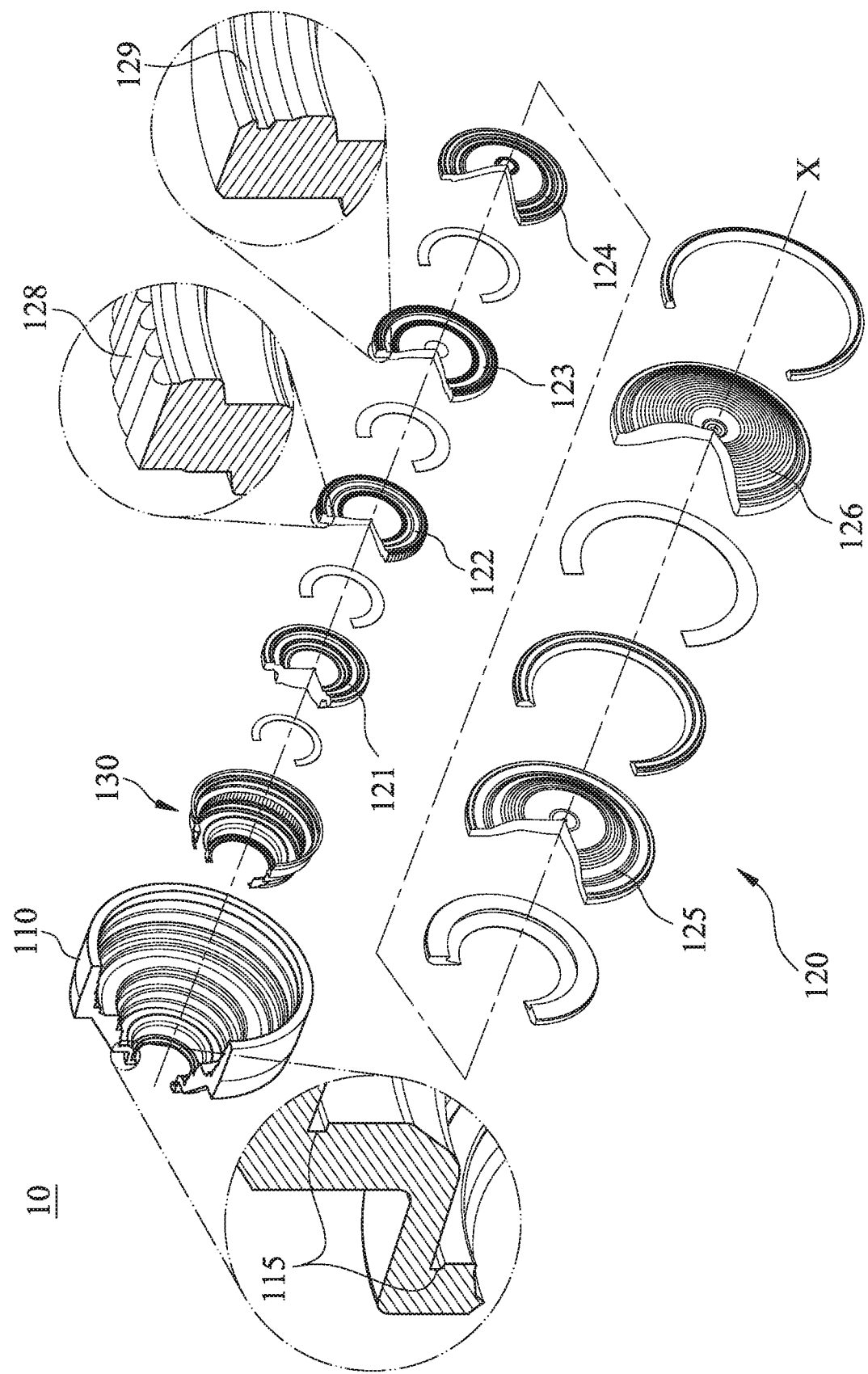
FIG. 1A is an exploded view of an imaging lens assembly according to the 1st example of the present disclosure.

The present disclosure provides an imaging lens assembly. The imaging lens assembly has an optical axis, and includes a plastic carrier element and an imaging lens element set. The plastic carrier element includes an object-side surface, an image-side surface, an outer surface and an inner surface. The object-side surface includes an object-side opening. The image-side surface includes an image-side opening. The inner surface is connected to the object-side opening and the image-side opening. The imaging lens element set is disposed in the plastic carrier element, and includes at least three lens elements. Each of at least two adjacent lens elements of the lens elements includes a first axial assembling structure, and the first axial assembling structures are corresponding to and connected to each other. A solid medium interval is maintained between the lens elements and the inner surface. The solid medium interval is directly contacted with the lens elements and the inner surface. Furthermore, a coaxiality between the lens elements is maintained via the first axial assembling structures.

A range of an outer periphery of at least one lens element of the lens elements directly contacted with the solid medium interval is larger than a range of the outer periphery of the at least one lens element of the lens elements non-contacted with the solid medium interval at a plane vertical to the optical axis. Furthermore, a large coating range in the plastic carrier element is favorable for strengthening an entire assembling structure. Therefore, the built-in stability is provided, and an efficiency of blocking the non-imaging light is enhanced. Furthermore, the plastic carrier element can be a plastic lens barrel or a single member, which is integrally formed of the plastic lens barrel and a carrier element by injection molding.

A medium material can be a thermosetting adhesive, a photocuring adhesive, a light-absorbing layer or a black coating material, but is not limited thereto. Therefore, it is favorable for enhancing the efficiency of blocking the non-imaging light.

By the precise coating technique of the present disclosure, the medium material of the solid medium interval is disposed on the inner surface of the plastic carrier element, and then the imaging lens element set is further assembled in the plastic carrier element, wherein the medium material can be also coated on a specific area of the imaging lens element set according to the light-blocking requirement, but is not limited thereto. By devising a proper spacing between the lens elements and the plastic carrier element, the medium material evenly extends to an ideal coating position between the lens elements and the plastic carrier element by capillarity, and it is different from the technique of prior art, which is spot gluing from the tunnel connected to outside after assembling. Therefore, it is favorable for controlling an ideal coating range of the medium material.

The plastic carrier element can further include a glue-escaping groove, and the glue-escaping groove can be annular or strip-shaped, but is not limited thereto. In detail, the medium material of the solid medium interval is originally liquid, and the medium material can be accumulated in the glue-escaping groove. After assembling the imaging lens element set, the medium material extends to other area of the inner surface by capillarity, and the medium material is formed the solid medium interval after solidifying. Therefore, it is favorable for controlling the medium material coated on the ideal coating range and preventing the overflow of the medium material.

The at least one lens element of the lens elements can include a plurality of protruding structures protruding along a direction vertical to the optical axis and regularly arranged around an outer periphery of the at least one lens element of the lens elements, and the solid medium interval are directly contacted with the protruding structures. In detail, the medium material can be pulled along the inner surface via the protruding structures during assembling the lens elements, and the medium material can be more entirely coated between the plastic carrier element and the lens elements. Therefore, it is favorable for more ideally developing capillarity.

An outer region of the at least one lens element of the lens elements can be totally non-contacted with the inner surface of the plastic carrier element. Therefore, an accommodating space of the medium material can be provided, and the interference during assembling can be decreased to enhance the assembling velocity.

An air gap can be further included between the lens elements and the inner surface, and the air gap along a radial direction is closer to the optical axis than the solid medium interval to the optical axis. Therefore, it is favorable for stably controlling the coating technique to avoid the medium material overflowing to an optical area of the imaging lens element set.

The at least one lens element of the lens elements can include an annular groove structure, wherein at least one of the solid medium interval and the air gap is interconnected to the annular groove structure. Therefore, the anti-overflow mechanism can be provided, and the anti-overflow mechanism can also be an air-venting space during assembling.

A cement material can be disposed between the lens elements, and the lens elements are cemented to each other to form a cemented lens group, wherein the first axial assembling structure of each of the lens elements surrounds the cement material. In detail, the two lens elements are cemented to each other via the cement material, and the cement material has the optical refractive power. Therefore, it is favorable for enhancing the stability and the coaxiality between the lens elements, and the optical refractive power can be provided to promote the optical image quality.

The solid medium interval can be made of an opaque material. Therefore, it is favorable for preventing the non-imaging light is transmitted in the solid medium interval.

The first axial assembling structures can be relatively disposed on the optical axis. In detail, the first axial assembling structures with annular can be regarded as a combination of a plurality of relatively disposed axial assembling structures. Therefore, it is favorable for decreasing the possibility of the axis offset, the relative uniformity of the width of the solid medium interval can be maintained, and the effect of capillarity can be more symmetrical.

Each of the plastic carrier element and the at least one lens element of the lens elements closest to an object side of the imaging lens element set can include a second axial assembling structure, and the second axial assembling structures are corresponding to and connected to each other. Therefore, the coaxiality between the plastic carrier element and the lens element can be provided.

The solid medium interval can be a closed full ring shape, and the solid medium interval surrounds the imaging lens element set. In detail, the medium material is evenly disposed on the outer periphery of the imaging lens element set. Therefore, the deformation between elements is not easily formed after the medium material solidifying to form the solid medium interval.

A driving apparatus can be disposed on the outer surface of the plastic carrier element, and the driving apparatus is for driving the imaging lens assembly to move along a direction parallel to the optical axis. In detail, the driving apparatus can be a coil element or a magnet element, but is not limited thereto. Therefore, the possibility of the autofocus of the imaging lens assembly can be provided.

When an angle between the solid medium interval at the plane vertical to the optical axis and the optical axis is θm, the following condition is satisfied: 90 degrees≤θm≤360 degrees. Furthermore, θm can be a right angle, an obtuse angle, a straight angle, a reflex angle or a full angle. Therefore, it is favorable for simultaneously capturing the stray light from every direction to enhance the efficiency of blocking the non-imaging light.

When a total length of the solid medium interval along the optical axis is L, and a total length of the imaging lens element set along the optical axis is TD, the following condition can be satisfied: 0.20<L/TD<1.20. Therefore, it is favorable for extensively capturing the stray light. Further, the following condition can be satisfied: 0.30<L/TD<1.05. Therefore, the stray light can be more efficiently decreased.

When an angle between each of the first axial assembling structures at the plane vertical to the optical axis and the optical axis is θa, the following condition can be satisfied: 60 degrees<θa≤360 degrees. Therefore, the concentric alignment can be obtained at a limited space to decrease the assembling tolerance.

When a space width of the solid medium interval between the lens elements and the inner surface is d, the following condition can be satisfied: 0.01 mm≤d<0.18 mm. In detail, the above-mentioned range of d is considered that a sufficient width the solid medium interval needs. Also, the above-mentioned range of d is considered that a width the medium material needs, which the medium material can extensively extends owing to capillarity. Further, the following condition can be satisfied: 0.01 mm≤d<0.10 mm. Therefore, the sufficient optical density can be obtained, and it is favorable for obtaining the better effect of capillarity.

When the range of the outer periphery of the at least one lens element of the lens elements directly contacted with the solid medium interval is θm', and a sum of the range of the outer periphery of the at least one lens element of the lens elements directly contacted with the solid medium interval and the range of the outer periphery of the at least one lens element of the lens elements non-contacted with the solid medium interval is θt, the following condition can be satisfied: 0.55<θm'/θt≤1.0. In detail, θt is 360 degrees, and θm' is a sum of θm. Therefore, it is favorable for extensively capturing the stray light to enhance the optical image quality.

Each of the aforementioned features of the imaging lens assembly can be utilized in various combinations for achieving the corresponding effects.

The present disclosure provides an electronic device, which includes the aforementioned imaging lens assembly and an image sensor. The image sensor is disposed on an image surface of the imaging lens assembly.

According to the aforementioned embodiment, specific examples are provided, and illustrated via figures.

1st Example

Figure 1B:
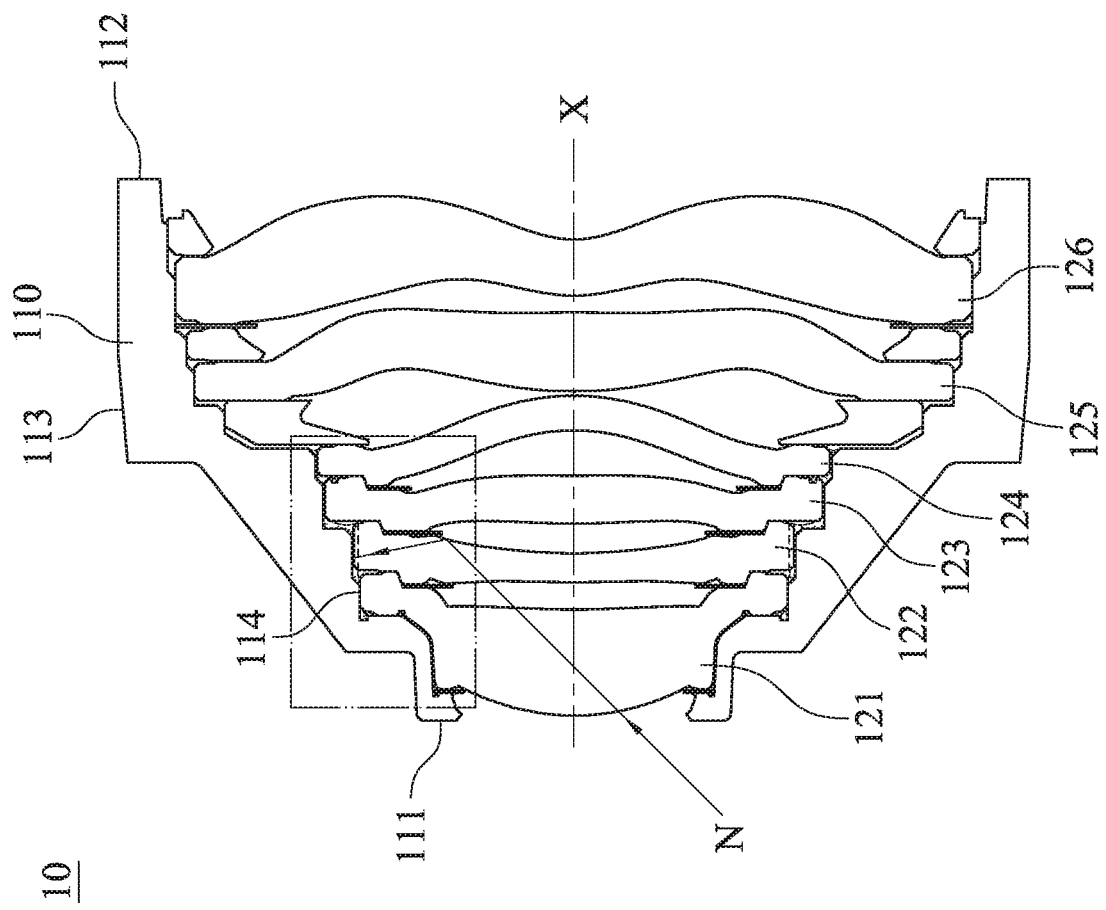
FIG. 1B is an assembling schematic view of the imaging lens assembly according to the 1st example in FIG. 1A.
Figure 1C:
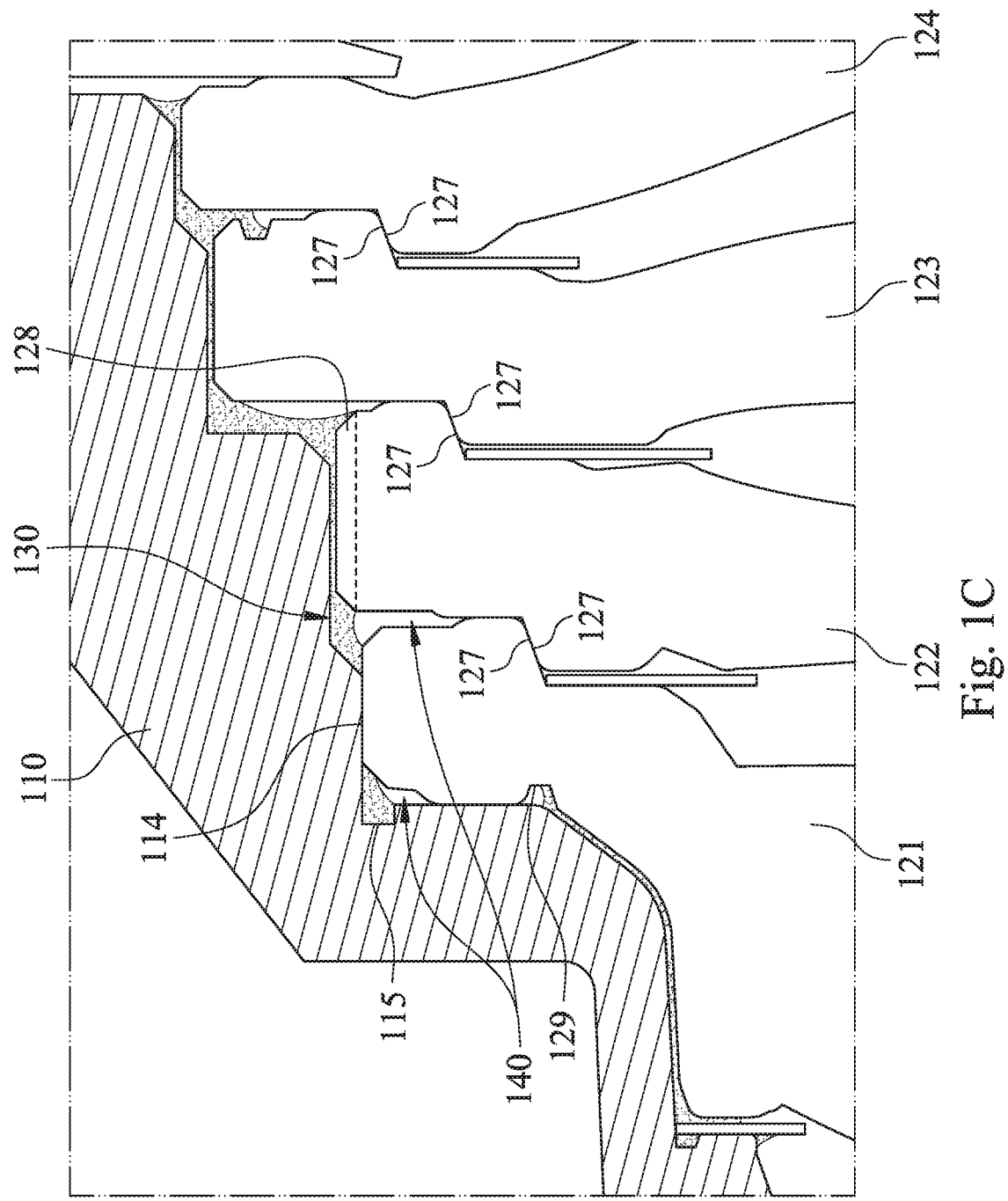
FIG. 1C is a partial enlarged view of the imaging lens assembly according to the 1st example in FIG. 1B.
Figure 1D:
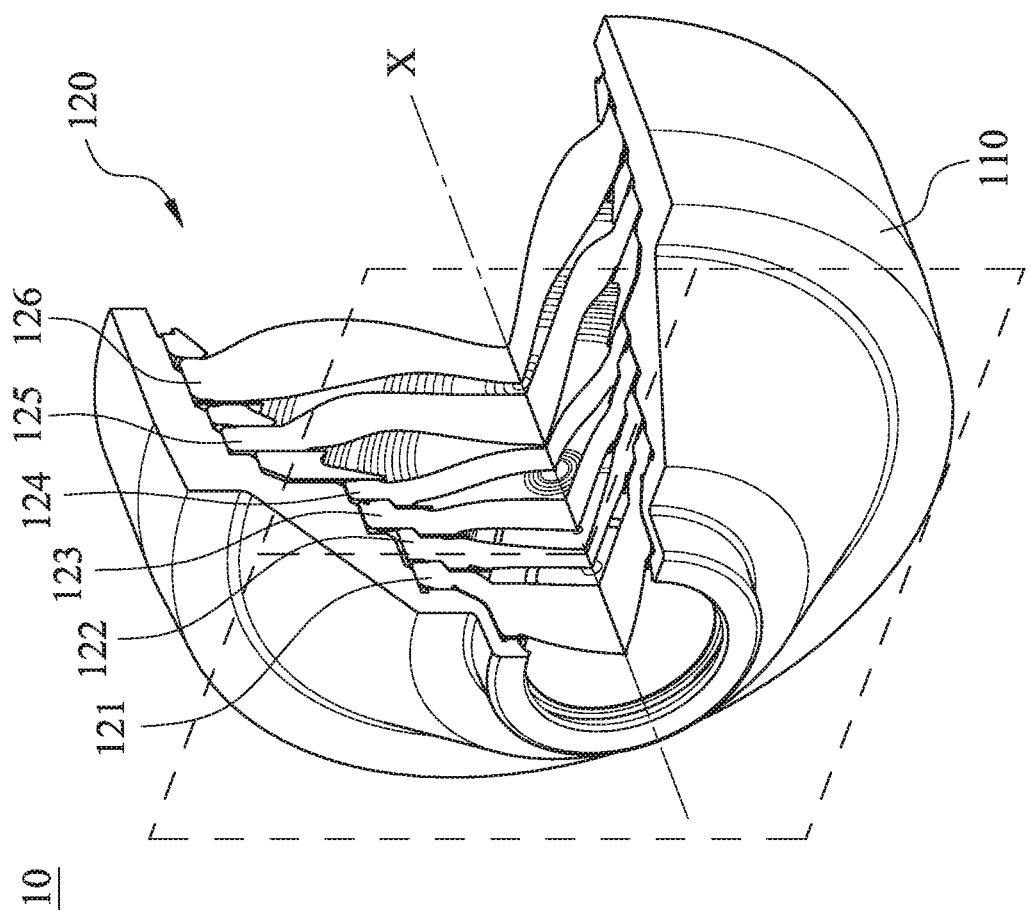
FIG. 1D is a partial cross-sectional view of the imaging lens assembly according to the 1st example in FIG. 1A.

FIG. 1A is an exploded view of an imaging lens assembly 10 according to the 1st example of the present disclosure. FIG. 1B is an assembling schematic view of the imaging lens assembly 10 according to the 1st example in FIG. 1A. FIG. 1D is a partial cross-sectional view of the imaging lens assembly 10 according to the 1st example in FIG. 1A. In FIGS. 1A, 1B, 1D, the imaging lens assembly 10 has an optical axis X, and includes a plastic carrier element 110 and an imaging lens element set 120. The imaging lens element set 120 is disposed in the plastic carrier element 110.

In detail, the plastic carrier element 110 includes an object-side surface 111, an image-side surface 112, an outer surface 113 and an inner surface 114, wherein the object-side surface 111 includes an object-side opening (its reference numeral is omitted), the image-side surface 112 includes an image-side opening (its reference numeral is omitted), and the inner surface 114 is connected to the object-side opening and the image-side opening. Furthermore, the plastic carrier element 110 can be a plastic lens barrel or a single member, which is integrally formed of the plastic lens barrel and a carrier element by injection molding.

The imaging lens element set 120 includes at least three lens elements. In detail, according to the 1st example, the imaging lens element set 120, in order from an object side to an image side, includes a first light blocking sheet, a first lens element 121, a second light blocking sheet, a second lens element 122, a third light blocking sheet, a third lens element 123, a fourth light blocking sheet, a fourth lens element 124, a first spacer, a fifth lens element 125, a second spacer, a fifth light blocking sheet, a sixth lens element 126 and a retainer, wherein optical features such as structures, surface shapes and so on of the first lens element 121, the second lens element 122, the third lens element 123, the fourth lens element 124, the fifth lens element 125 and the sixth lens element 126 can be disposed according to different imaging demand. Further, the optical features are not important to the present disclosure, and the first light blocking sheet to the fifth light blocking sheet, the first spacer, the second spacer and the retainer are not emphases of the present disclosure, so their reference numerals are omitted.

FIG. 10 is a partial enlarged view of the imaging lens assembly 10 according to the 1st example in FIG. 1B. In FIGS. 1A and 10, a solid medium interval 130 is maintained between two adjacent lens elements of the at least three lens elements and the inner surface 114, wherein the solid medium interval 130 is directly contacted with the adjacent lens elements and the inner surface 114. According to the 1st example, the solid medium interval 130 is maintained between the first lens element 121 and the inner surface 114, the second lens element 122 and the inner surface 114, the third lens element 123 and the inner surface 114, and the fourth lens element 124 and the inner surface 114, but is not limited thereto. In detail, the solid medium interval 130 includes a medium material (its reference numeral is omitted), and the medium material is disposed on the inner surface 114 or the imaging lens element set 120, wherein the medium material can be a thermosetting adhesive, a photo-curing adhesive, a light-absorbing layer or a black coating material, but is not limited thereto. Therefore, it is favorable for enhancing the efficiency of blocking the non-imaging light.

Each of at least two adjacent lens elements of the lens elements includes a first axial assembling structure 127, and the first axial assembling structures 127 are corresponding to and connected to each other. According to the 1st example, each of an image side of the first lens element 121, an object side of the second lens element 122, an image side of the second lens element 122, an object side of the third lens element 123, an image side of the third lens element 123 and an object side of the fourth lens element 124 includes the first axial assembling structure 127. In particular, the first axial assembling structure 127 of the image side of the first lens element 121 is corresponding to and connected to the first axial assembling structure 127 of the object side of the second lens element 122, the first axial assembling structure 127 of the image side of the second lens element 122 is corresponding to and connected to the first axial assembling structure 127 of the object side of the third lens element 123, and the first axial assembling structure 127 of the image side of the third lens element 123 is corresponding to and connected to the first axial assembling structure 127 of the object side of the fourth lens element 124. Therefore, it is favorable for maintaining the coaxiality between the lens elements.

Furthermore, the first axial assembling structures 127 are relatively disposed on the optical axis X, and the first axial assembling structures 127 with annular can be regarded as a combination of a plurality of relatively disposed axial assembling structures. Therefore, it is favorable for decreasing the possibility of the axis offset, the relative uniformity of the width of the solid medium interval 130 can be maintained, and the effect of capillarity can be more symmetrical.

Figure 1E:
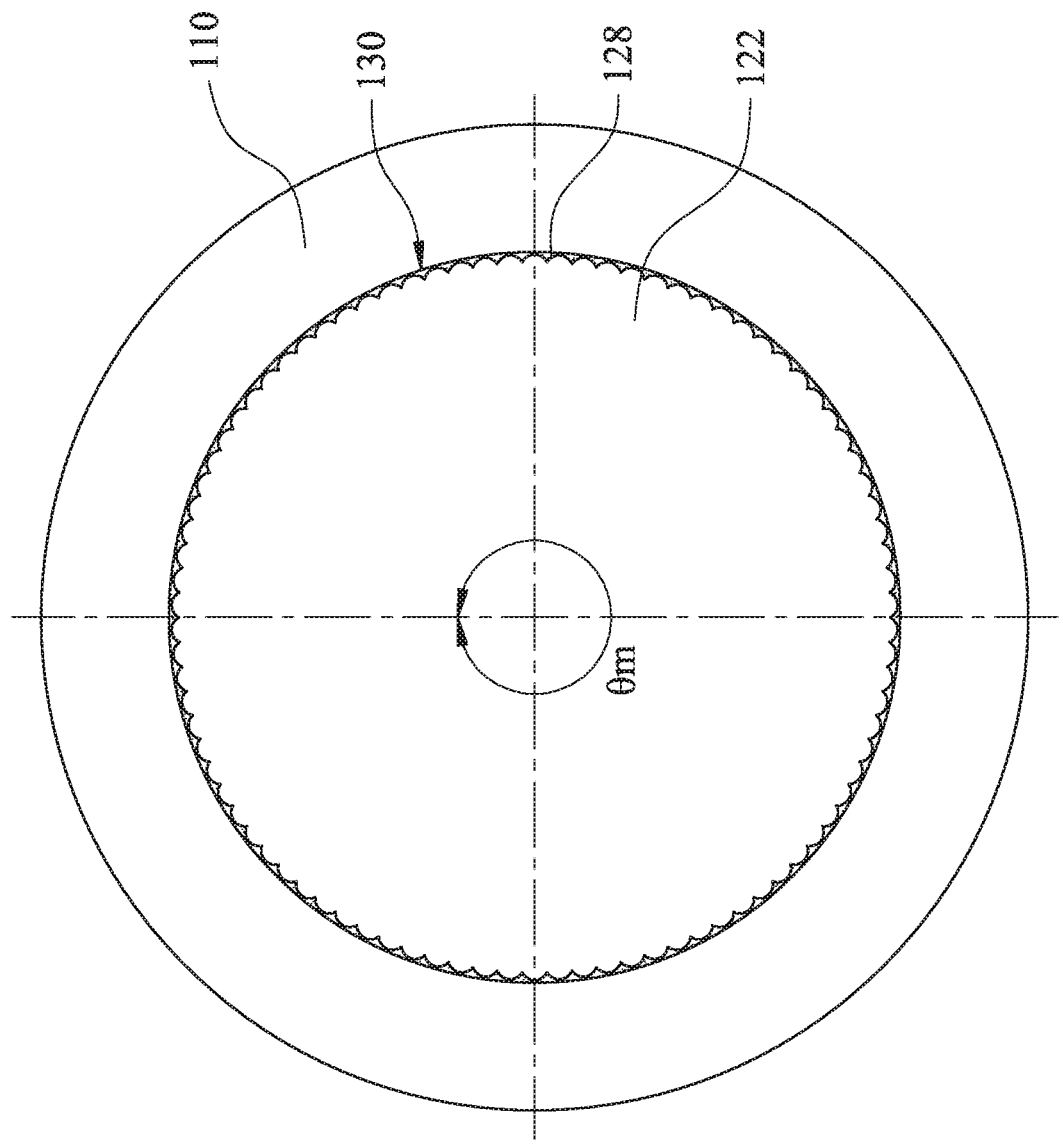
FIG. 1E is a plane view of the plastic carrier element and the second lens element according to the 1st example in FIG. 1D.
Figure 1F:
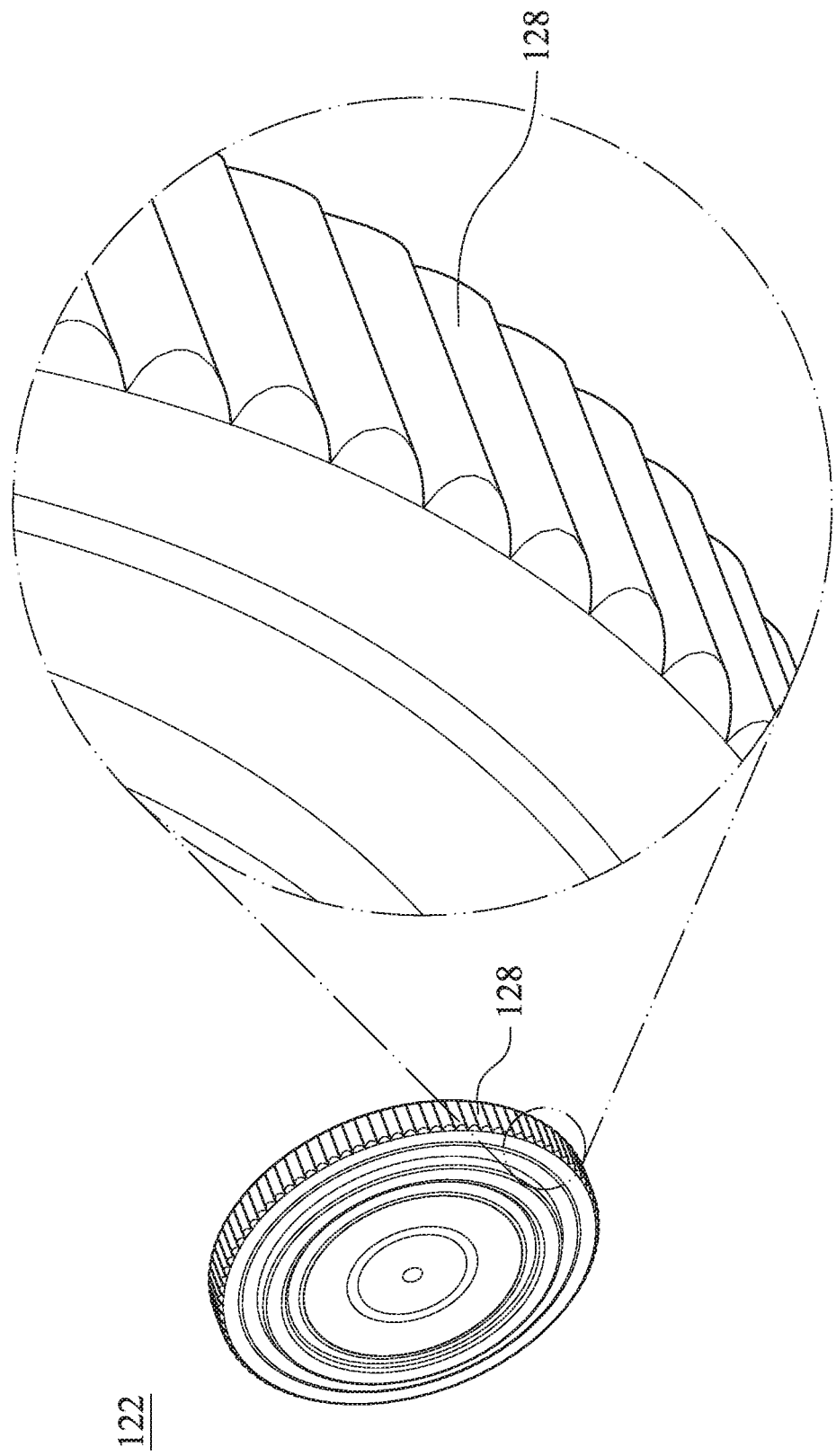
FIG. 1F is a partial enlarged view of the second lens element according to the 1st example in FIG. 1A.
Figure 1G:
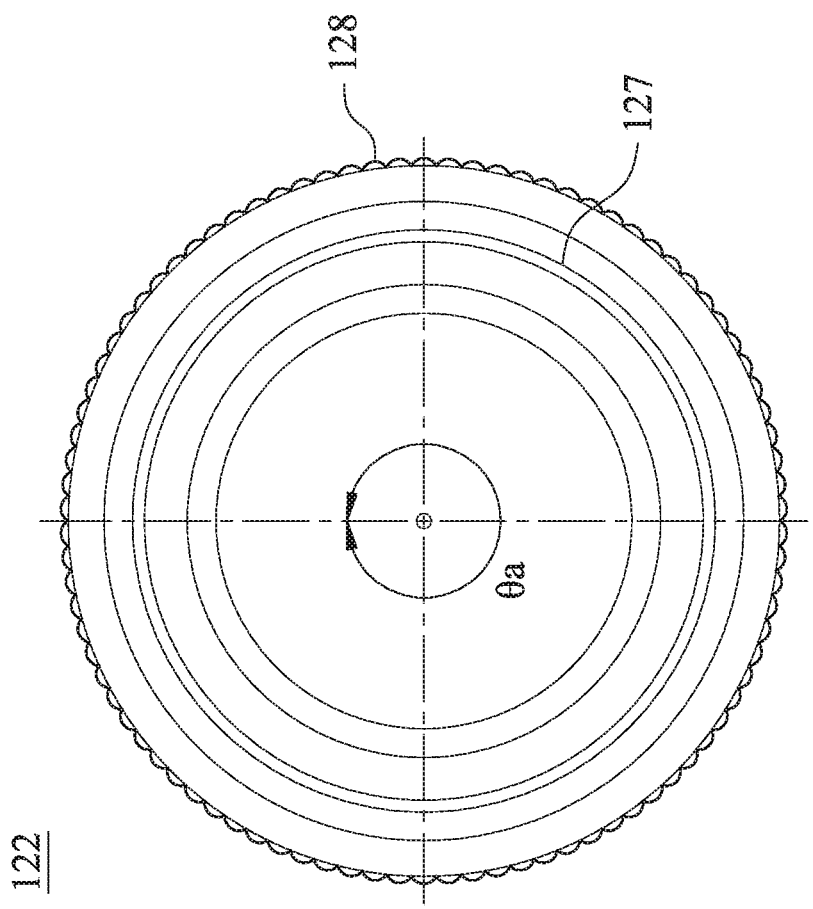
FIG. 1G is a plane view of the second lens element according to the 1st example in FIG. 1F.

FIG. 1E is a plane view of the plastic carrier element 110 and the second lens element 122 according to the 1st example in FIG. 1D. FIG. 1F is a partial enlarged view of the second lens element 122 according to the 1st example in FIG. 1A. FIG. 1G is a plane view of the second lens element 122 according to the 1st example in FIG. 1F. In FIGS. 1A, 10, 1E, 1F and 1G, the at least one lens element of the lens elements includes a plurality of protruding structures 128. According to the 1st example, the at least one element including the protruding structures 128 is the second lens element 122. The protruding structures 128 protrude along a direction vertical to the optical axis X and are regularly arranged around an outer periphery of the second lens element 122, and the solid medium interval 130 are directly contacted with the protruding structures 128. In detail, the medium material can be pulled along the inner surface 114 via the protruding structures 128 during assembling the lens elements, and the medium material can be more entirely coated between the plastic carrier element 110 and the lens elements. Therefore, it is favorable for more ideally developing capillarity.

An outer region of the at least one lens element of the lens elements is totally non-contacted with the inner surface 114 of the plastic carrier element 110. According to the 1st example, an outer region of the second lens element 122, an outer region of the third lens element 123 and an outer region of the fourth lens element 124 are totally non-contacted with the inner surface 114 of the plastic carrier element 110. Therefore, an accommodating space of the medium material can be provided, and the interference during assembling can be decreased to enhance the assembling velocity.

An air gap 140 is further included between the lens elements and the inner surface 114, and the air gap 140 along a radial direction is closer to the optical axis X than the solid medium interval 130 to the optical axis X. Therefore, it is favorable for stably controlling the coating technique to avoid the medium material overflowing to an optical area of the imaging lens element set 120.

In FIGS. 1A and 10, the at least one lens element of the lens elements includes an annular groove structure 129, wherein at least one of the solid medium interval 130 and the air gap 140 is interconnected to the annular groove structure 129. According to the 1st example, both of the first lens element 121 and the third lens element 123 include the annular groove structures 129. Therefore, the anti-overflow mechanism can be provided, and the anti-overflow mechanism can also be an air-venting space during assembling.

In FIG. 1B, the solid medium interval 130 is made of an opaque material. Therefore, it is favorable for preventing the non-imaging light N is transmitted in the solid medium interval 130.

In FIG. 1E, a range of an outer periphery of the at least one lens element of the lens elements directly contacted with the solid medium interval 130 is larger than a range of the outer periphery of the at least one lens element of the lens elements non-contacted with the solid medium interval 130 at a plane vertical to the optical axis X. According to the 1st example, a range of an outer periphery of the second lens element 122 directly contacted with the solid medium interval 130 is larger than a range of the outer periphery of the second lens element 122 non-contacted with the solid medium interval 130.

In FIGS. 1A and 1G, the plastic carrier element 110 further includes a glue-escaping groove 115, and the glue-escaping groove 115 can be annular or strip-shaped, but is not limited thereto. In detail, the medium material of the solid medium interval 130 is originally liquid, and the medium material can be accumulated in the glue-escaping groove 115. After assembling the imaging lens element set 120, the medium material extends to other area of the inner surface 114 by capillarity, and the medium material is formed the solid medium interval 130 after solidifying. Therefore, it is favorable for controlling the medium material coated on the ideal coating range and preventing the overflow of the medium material.

In FIG. 1A, the solid medium interval 130 is a closed full ring shape, and the solid medium interval 130 surrounds the imaging lens element set 120. In detail, the medium material is evenly disposed on the outer periphery of the imaging lens element set 120. Therefore, the deformation between elements is not easily formed after the medium material solidifying to form the solid medium interval 130.

FIG. 1H is a schematic view of parameters according to the 1st example in FIG. 1A. In FIGS. 1E, 1G and 1H, according to the 1st example, when an angle between the solid medium interval 130 at the plane vertical to the optical axis X and the optical axis X is θm, the range of the outer periphery of the at least one lens element of the lens elements directly contacted with the solid medium interval 130 is θm', a sum of the range of the outer periphery of the at least one lens element of the lens elements directly contacted with the solid medium interval 130 and the range of the outer periphery of the at least one lens element of the lens elements non-contacted with the solid medium interval 130 is θt (according to the 1st example, the lens element is the second lens element 122), an angle between each of the first axial assembling structures 127 at the plane vertical to the optical axis X and the optical axis X is θa, a total length of the solid medium interval 130 along the optical axis X is L, a total length of the imaging lens element set 120 along the optical axis X is TD, and a space width of the solid medium interval 130 between the lens elements and the inner surface 114 is d (according to the 1st example, the lens element is the third lens element 123), the following conditions of the Table 1 are satisfied.

TABLE 1

| 1st example | | | |
|---|---|---|---|
| θm (degree) | 360 | L (mm) | 1.63 |
| θm' (degree) | 360 | TD (mm) | 3.14 |
| θt (degree) | 360 | L/TD | 0.52 |
| θm'/θt | 1 | d (mm) | 0.01 |
| θa (degree) | 360 | | |

Furthermore, the angle between the solid medium interval 130 at the plane vertical to the optical axis X and the optical axis X is 360 degrees.

2nd Example

Figure 2A:
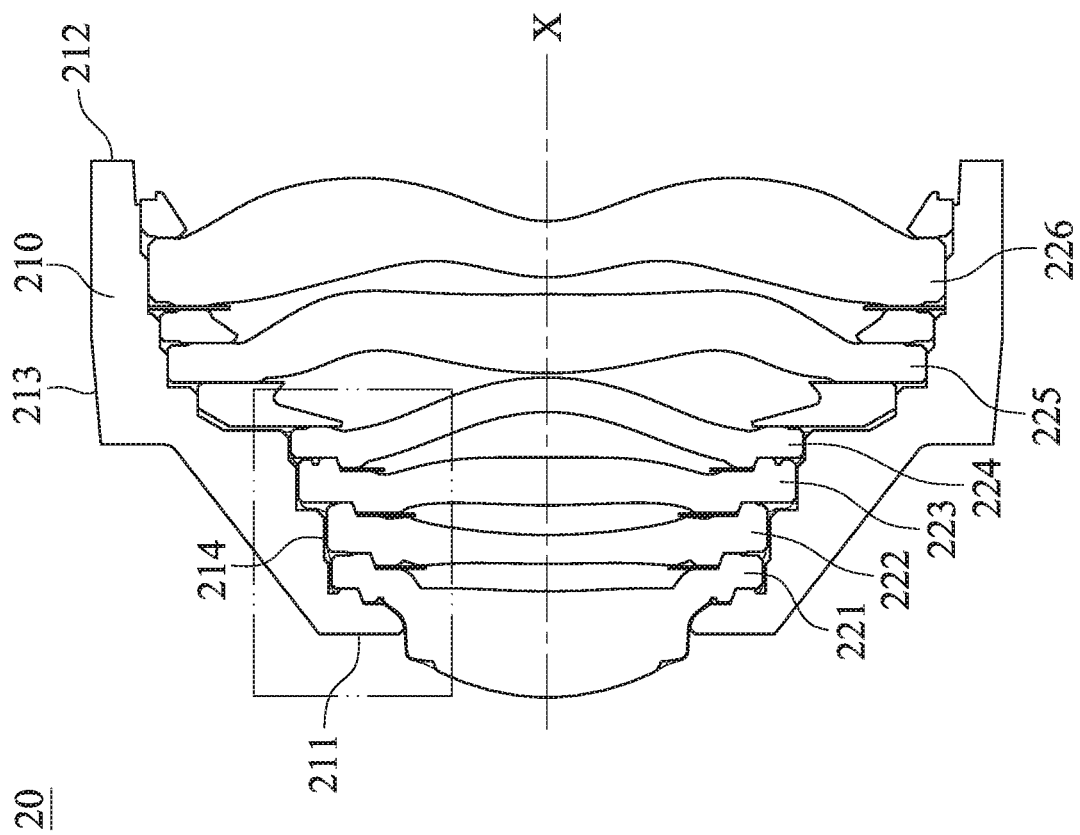
FIG. 2A is a schematic view of an imaging lens assembly according to the 2nd example of the present disclosure.

FIG. 2A is a schematic view of an imaging lens assembly 20 according to the 2nd example of the present disclosure. In FIG. 2A, the imaging lens assembly 20 has an optical axis X, and includes a plastic carrier element 210 and an imaging lens element set 220. The imaging lens element set 220 is disposed in the plastic carrier element 210.

In detail, the plastic carrier element 210 includes an object-side surface 211, an image-side surface 212, an outer surface 213 and an inner surface 214, wherein the object-side surface 211 includes an object-side opening (its reference numeral is omitted), the image-side surface 212 includes an image-side opening (its reference numeral is omitted), and the inner surface 214 is connected to the object-side opening and the image-side opening. Furthermore, the plastic carrier element 210 can be a plastic lens barrel or a single member, which is integrally formed of the plastic lens barrel and a carrier element by injection molding.

The imaging lens element set 220 includes at least three lens elements. In detail, according to the 2nd example, the imaging lens element set 220, in order from an object side to an image side, includes a first lens element 221, a first light blocking sheet, a second lens element 222, a second light blocking sheet, a third lens element 223, a third light blocking sheet, a fourth lens element 224, a first spacer, a fifth lens element 225, a second spacer, a fourth light blocking sheet, a sixth lens element 226 and a retainer, wherein optical features such as structures, surface shapes and so on of the first lens element 221, the second lens element 222, the third lens element 223, the fourth lens element 224, the fifth lens element 225 and the sixth lens element 226 can be disposed according to different imaging demand. Further, the optical features are not important to the present disclosure, and the first light blocking sheet to the fourth light blocking sheet, the first spacer, the second spacer and the retainer are not emphases of the present disclosure, so their reference numerals are omitted.

Figure 2B:
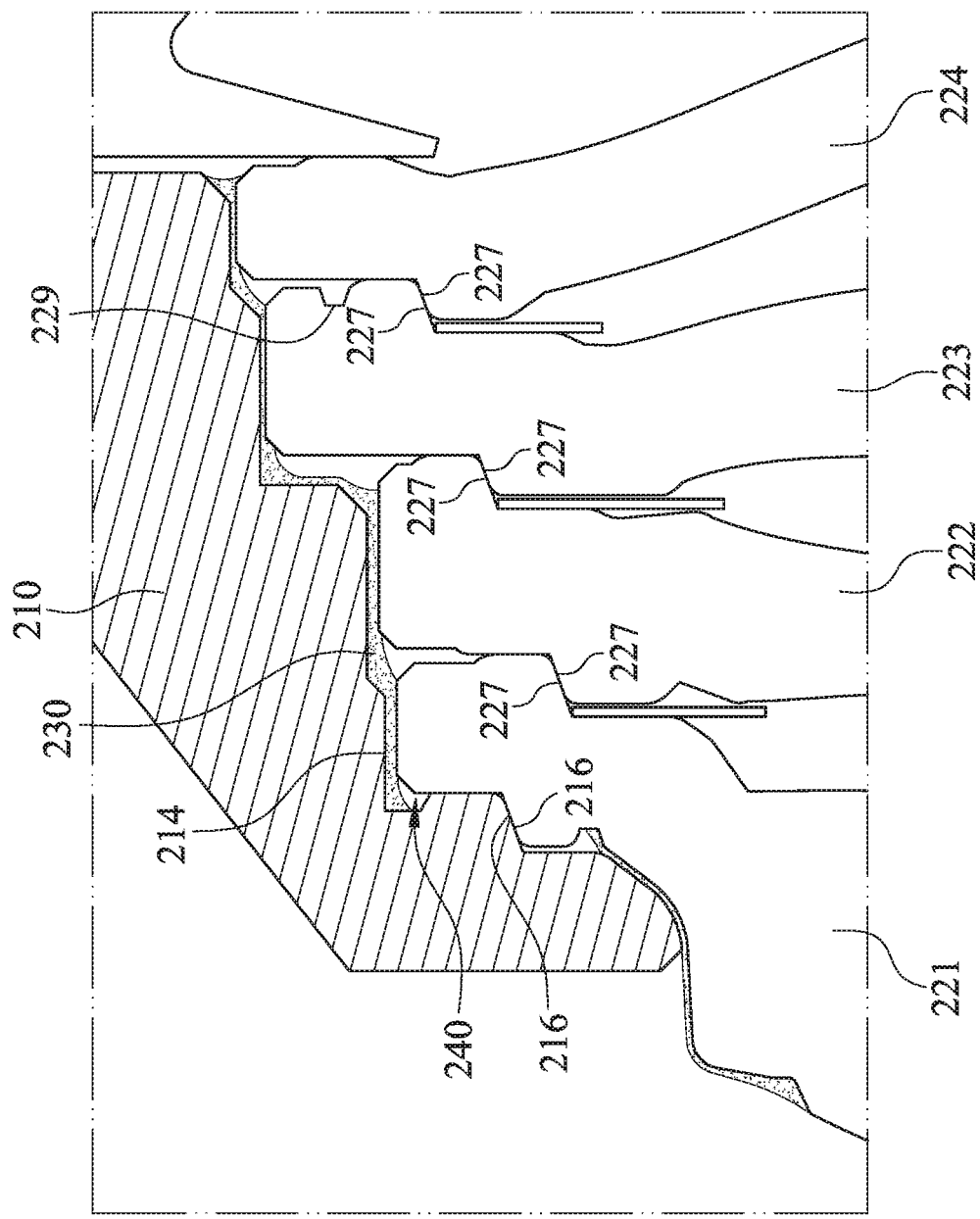
FIG. 2B is a partial enlarged view of the imaging lens assembly according to the 2nd example in FIG. 2A.

FIG. 2B is a partial enlarged view of the imaging lens assembly 20 according to the 2nd example in FIG. 2A. In FIG. 2B, a solid medium interval 230 is maintained between two adjacent lens elements of the at least three lens elements and the inner surface 214, wherein the solid medium interval 230 is directly contacted with the adjacent lens elements and the inner surface 214. According to the 2nd example, the solid medium interval 230 is maintained between the first lens element 221 and the inner surface 214, the second lens element 222 and the inner surface 214, the third lens element 223 and the inner surface 214, and the fourth lens element 224 and the inner surface 214, but is not limited thereto.

Figure 2C:
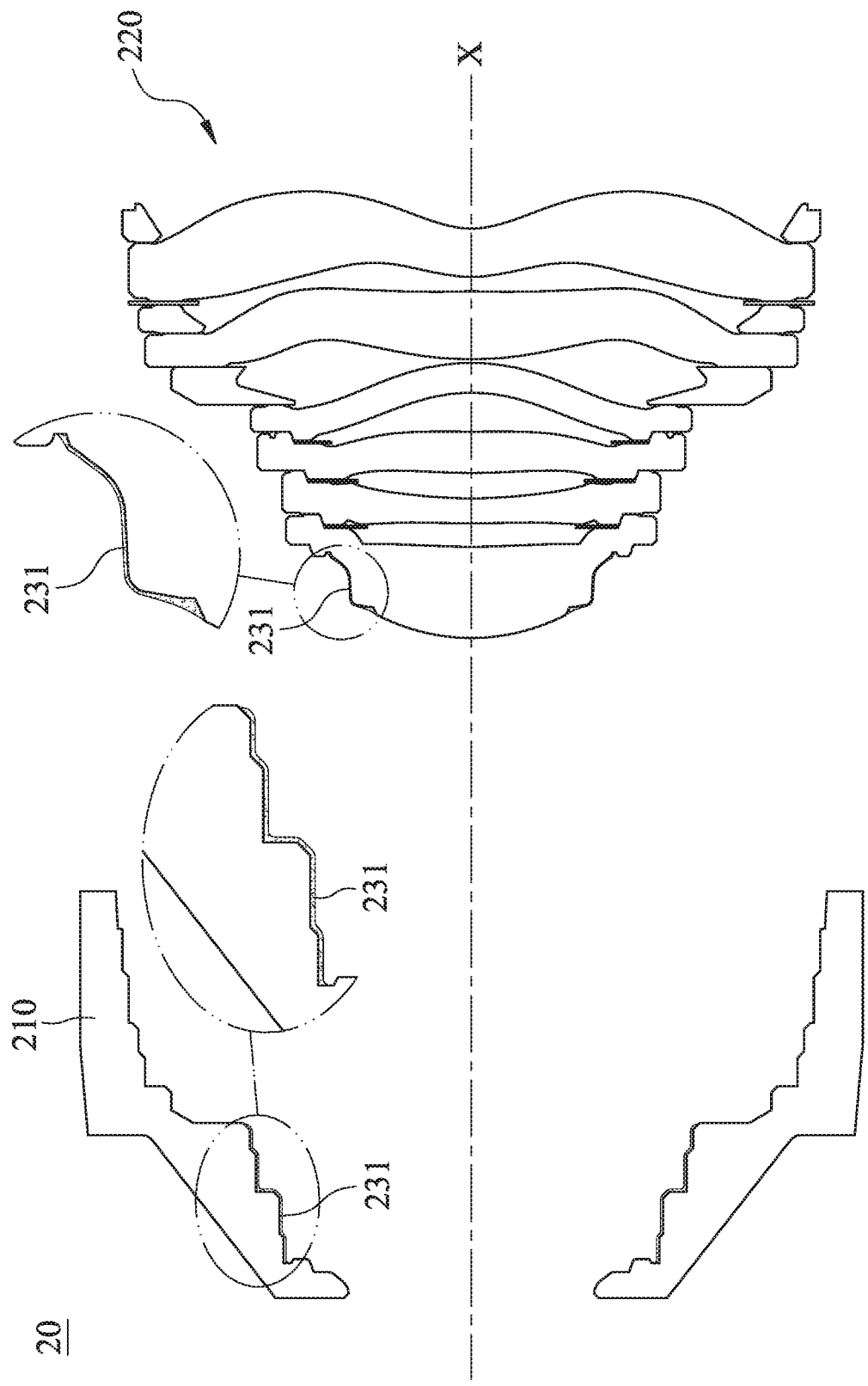
FIG. 2C is an assembling schematic view of the imaging lens assembly according to the 2nd example in FIG. 2A.

FIG. 2C is an assembling schematic view of the imaging lens assembly 20 according to the 2nd example in FIG. 2A. In FIG. 2C, the solid medium interval 230 includes a medium material 231, the medium material 231 is originally liquid, and the medium material 231 is disposed on the inner surface 214 or the imaging lens element set 220. According to the 2nd example, the medium material 231 is disposed on the inner surface 214, and the medium material 231 is formed the solid medium interval 230 after solidifying. In detail, the medium material 231 can be a thermosetting adhesive, a photocuring adhesive, a light-absorbing layer or a black coating material, but is not limited thereto. According to the 2nd example, the medium material 231 is the light-absorbing layer, but is not limited thereto. Therefore, it is favorable for enhancing the efficiency of blocking the non-imaging light.

In detail, according to the 2nd example, by the precise coating technique, the medium material 231 is disposed on the inner surface 214 of the plastic carrier element 210, and then the imaging lens element set 220 is further assembled in the plastic carrier element 210, wherein the medium material 231 can be also coated on a specific area of the imaging lens element set 220 according to the light-blocking requirement, but is not limited thereto. By devising a proper spacing between the lens elements and the plastic carrier element 210, the medium material 231 evenly extends to an ideal coating position between the lens elements and the plastic carrier element 210 by capillarity, and it is different from the technique of prior art, which is spot gluing from the tunnel connected to outside after assembling. Therefore, it is favorable for controlling an ideal coating range of the medium material 231. Also, the entire assembling structure can be strengthened to provide the internal stability.

Each of at least two adjacent lens elements of the lens elements includes a first axial assembling structure 227, and the first axial assembling structures 227 are corresponding to and connected to each other. According to the 2nd example, each of an image side of the first lens element 221, an object side of the second lens element 222, an image side of the second lens element 222, an object side of the third lens element 223, an image side of the third lens element 223 and an object side of the fourth lens element 224 includes the first axial assembling structure 227. In particular, the first axial assembling structure 227 of the image side of the first lens element 221 is corresponding to and connected to the first axial assembling structure 227 of the object side of the second lens element 222, the first axial assembling structure 227 of the image side of the second lens element 222 is corresponding to and connected to the first axial assembling structure 227 of the object side of the third lens element 223, and the first axial assembling structure 227 of the image side of the third lens element 223 is corresponding to and connected to the first axial assembling structure 227 of the object side of the fourth lens element 224. Therefore, it is favorable for maintaining the coaxiality between the lens elements.

Furthermore, the first axial assembling structures 227 are relatively disposed on the optical axis X, and the first axial assembling structures 227 with annular can be regarded as a combination of a plurality of relatively disposed axial assembling structures. Therefore, it is favorable for decreasing the possibility of the axis offset, the relative uniformity of the width of the solid medium interval 230 can be maintained, and the effect of capillarity can be more symmetrical.

Each of the plastic carrier element 210 and the at least one lens element of the lens elements closest to an object side of the imaging lens element set 220 includes a second axial assembling structure 216, and the second axial assembling structures 216 are corresponding to and connected to each other. According to the 2nd example, each of an image side of the plastic carrier element 210 and an object side of the first lens element 221 includes the second axial assembling structure 216, and the second axial assembling structures 216 are corresponding to and connected to each other. Therefore, the coaxiality between the plastic carrier element 210 and the first lens element 221 can be provided.

An outer region of the at least one lens element of the lens elements is totally non-contacted with the inner surface 214 of the plastic carrier element 210. According to the 2nd example, an outer region of the second lens element 222, an outer region of the third lens element 223 and an outer region of the fourth lens element 224 are totally non-contacted with the inner surface 214 of the plastic carrier element 210. Therefore, an accommodating space of the medium material 231 can be provided, and the interference during assembling can be decreased to enhance the assembling velocity.

An air gap 240 is further included between the lens elements and the inner surface 214, and the air gap 240 along a radial direction is closer to the optical axis X than the solid medium interval 230 to the optical axis X. Therefore, it is favorable for stably controlling the coating technique to avoid the medium material 231 overflowing to an optical area of the imaging lens element set 220.

In FIG. 2B, the at least one lens element of the lens elements includes an annular groove structure 229, wherein at least one of the solid medium interval 230 and the air gap 240 is interconnected to the annular groove structure 229. According to the 2nd example, the third lens element 223 includes the annular groove structures 229. Therefore, the anti-overflow mechanism can be provided, and the anti-overflow mechanism can also be an air-venting space during assembling.

The solid medium interval 230 is made of an opaque material. Therefore, it is favorable for preventing the non-imaging light is transmitted in the solid medium interval 230.

FIG. 2D is a plane view of the plastic carrier element 210 and the second lens element 222 according to the 2nd example in FIG. 2A. In FIG. 2D, a range of an outer periphery of the at least one lens element of the lens elements directly contacted with the solid medium interval 230 is larger than a range of the outer periphery of the at least one lens element of the lens elements non-contacted with the solid medium interval 230 at a plane vertical to the optical axis X. According to the 2nd example, a range of an outer periphery of the second lens element 222 directly contacted with the solid medium interval 230 is larger than a range of the outer periphery of the second lens element 222 non-contacted with the solid medium interval 230.

The solid medium interval 230 is a closed full ring shape, and the solid medium interval 230 surrounds the imaging lens element set 220. In detail, the medium material 231 is evenly disposed on the outer periphery of the imaging lens element set 220. Therefore, the deformation between elements is not easily formed after the medium material 231 solidifying to form the solid medium interval 230.

FIG. 2E is a schematic view of parameters according to the 2nd example in FIG. 2A. In FIGS. 2D and 2E, according to the 2nd example, when an angle between the solid medium interval 230 at the plane vertical to the optical axis X and the optical axis X is $\theta m$, the range of the outer periphery of the at least one lens element of the lens elements directly contacted with the solid medium interval 230 is $\theta m'$, a sum of the range of the outer periphery of the at least one lens element of the lens elements directly contacted with the solid medium interval 230 and the range of the outer periphery of the at least one lens element of the lens elements non-contacted with the solid medium interval 230 is $\theta t$ (according to the 2nd example, the lens element is the second lens element 222), an angle between each of the first axial assembling structures 227 at the plane vertical to the optical axis X and the optical axis X is $\theta a$, a total length of the solid medium interval 230 along the optical axis X is L, a total length of the imaging lens element set 220 along the optical axis X is TD, and a space width of the solid medium interval 230 between the lens elements and the inner surface 214 is d (according to the 2nd example, the lens element is the first lens element 221), the following conditions of the Table 2 are satisfied.

TABLE 2

| 2nd example | | | |
|---|---|---|---|
| θm (degree) | 360 | L (mm) | 1.582 |
| θm' (degree) | 360 | TD (mm) | 3.14 |
| θt (degree) | 360 | L/TD | 0.50 |
| θm'/θt | 1 | d (mm) | 0.02 |
| θa (degree) | 360 | | |

Furthermore, the angle between the solid medium interval 230 at the plane vertical to the optical axis X and the optical axis X is 360 degrees.

3rd Example

Figure 3A:
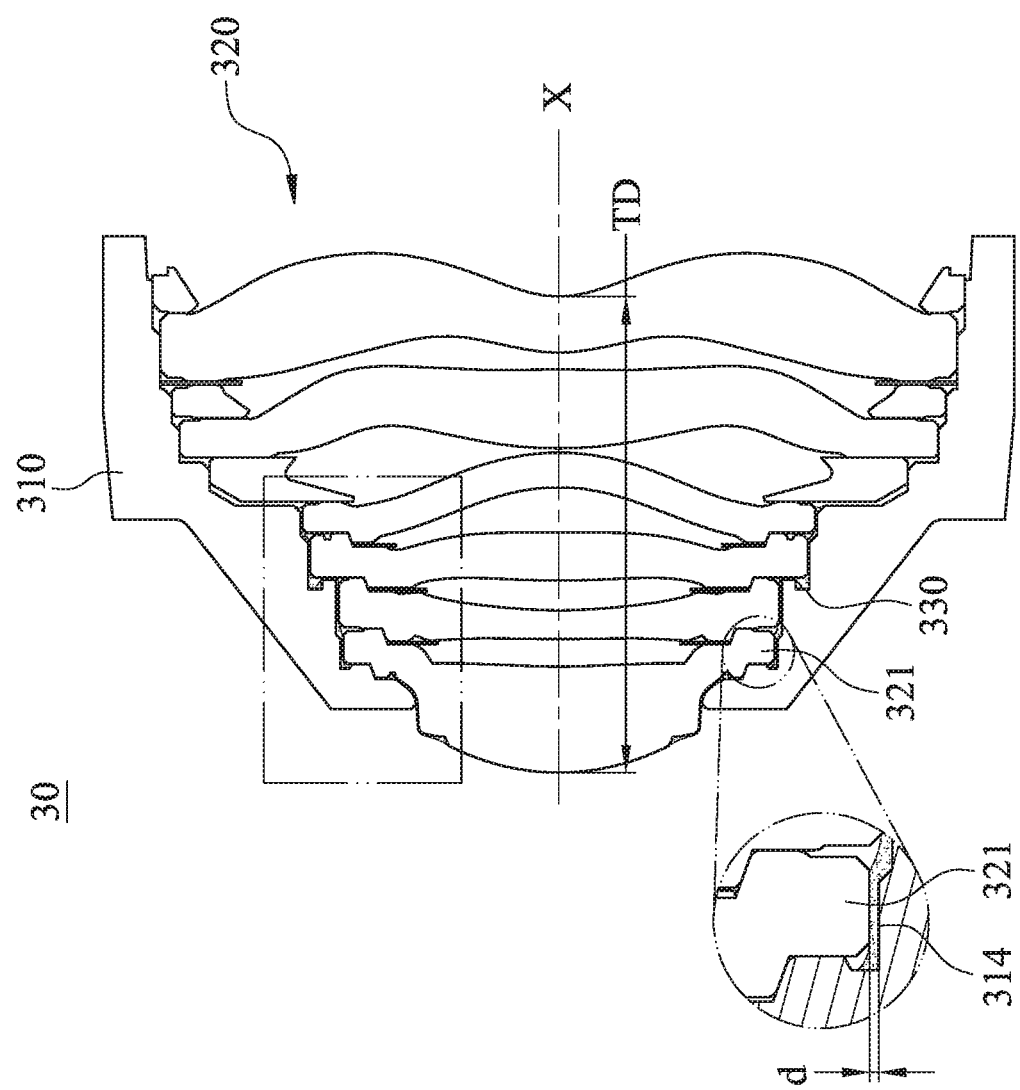
FIG. 3A is a schematic view of an imaging lens assembly according to the 3rd example of the present disclosure.

FIG. 3A is a schematic view of an imaging lens assembly 30 according to the 3rd example of the present disclosure. In FIG. 3A, the imaging lens assembly 30 has an optical axis X, and includes a plastic carrier element 310 and an imaging lens element set 320. The imaging lens element set 320 is disposed in the plastic carrier element 310.

In detail, the plastic carrier element 310 includes an object-side surface 311, an image-side surface 312, an outer surface 313 and an inner surface 314, wherein the object-side surface 311 includes an object-side opening (its reference numeral is omitted), the image-side surface 312 includes an image-side opening (its reference numeral is omitted), and the inner surface 314 is connected to the object-side opening and the image-side opening. Furthermore, the plastic carrier element 310 can be a plastic lens barrel or a single member, which is integrally formed of the plastic lens barrel and a carrier element by injection molding.

The imaging lens element set 320 includes at least three lens elements. In detail, according to the 3rd example, the imaging lens element set 320, in order from an object side to an image side, includes a first lens element 321, a first light blocking sheet, a second lens element 322, a second light blocking sheet, a third lens element 323, a third light blocking sheet, a fourth lens element 324, a first spacer, a fifth lens element 325, a second spacer, a fourth light blocking sheet, a sixth lens element 326 and a retainer, wherein optical features such as structures, surface shapes and so on of the first lens element 321, the second lens element 322, the third lens element 323, the fourth lens element 324, the fifth lens element 325 and the sixth lens element 326 can be disposed according to different imaging demand. Further, the optical features are not important to the present disclosure, and the first light blocking sheet to the fourth light blocking sheet, the first spacer, the second spacer and the retainer are not emphases of the present disclosure, so their reference numerals are omitted.

Figure 3B:
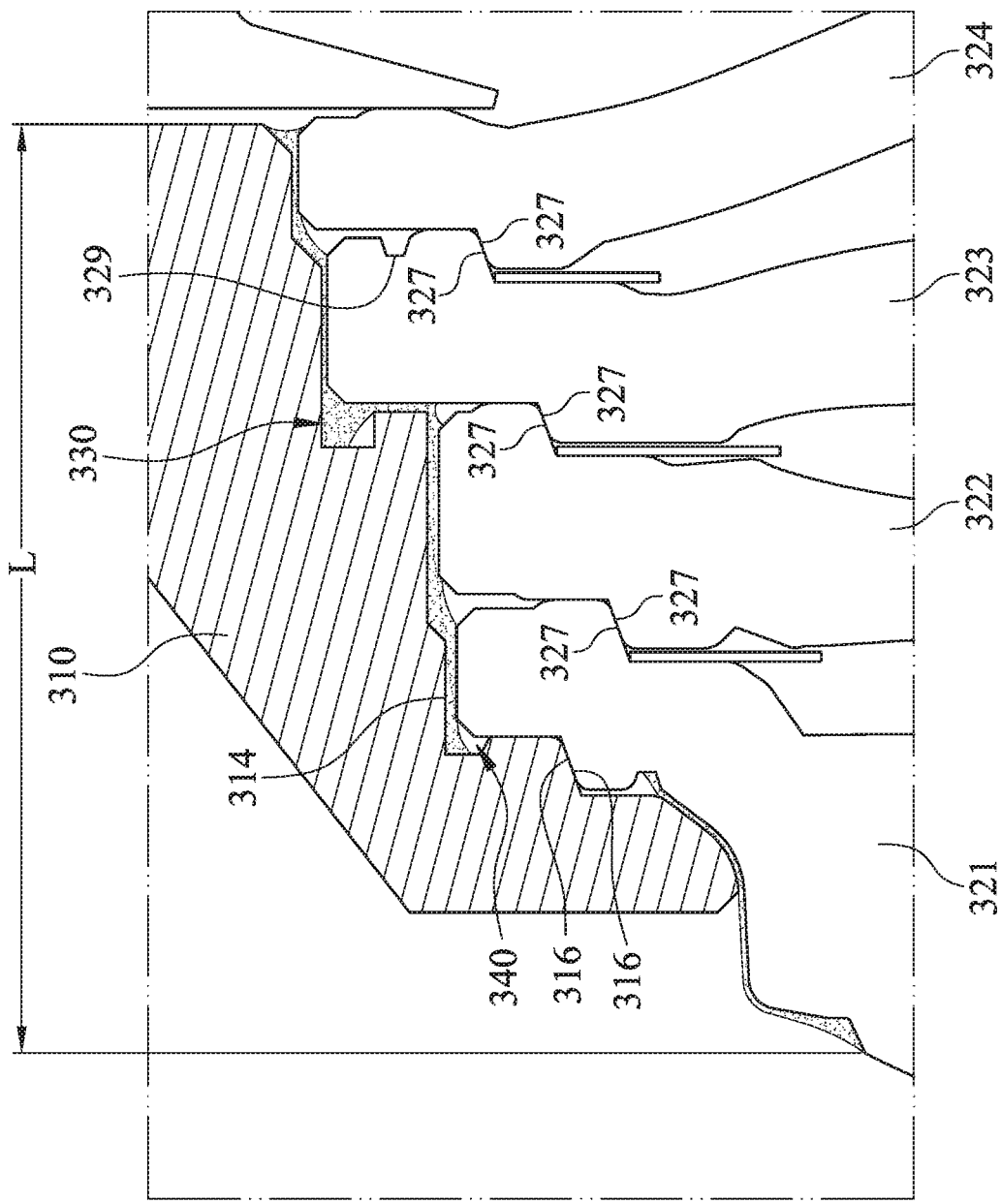
FIG. 3B is a partial enlarged view of the imaging lens assembly according to the 3rd example in FIG. 3A.

FIG. 3B is a partial enlarged view of the imaging lens assembly 30 according to the 3rd example in FIG. 3A. In FIG. 3B, a solid medium interval 330 is maintained between two adjacent lens elements of the at least three lens elements and the inner surface 314, wherein the solid medium interval 330 is directly contacted with the adjacent lens elements and the inner surface 314. According to the 3rd example, the solid medium interval 330 is maintained between the first lens element 321 and the inner surface 314, the second lens element 322 and the inner surface 314, the third lens element 323 and the inner surface 314, and the fourth lens element 324 and the inner surface 314, but is not limited thereto.

Figure 3C:
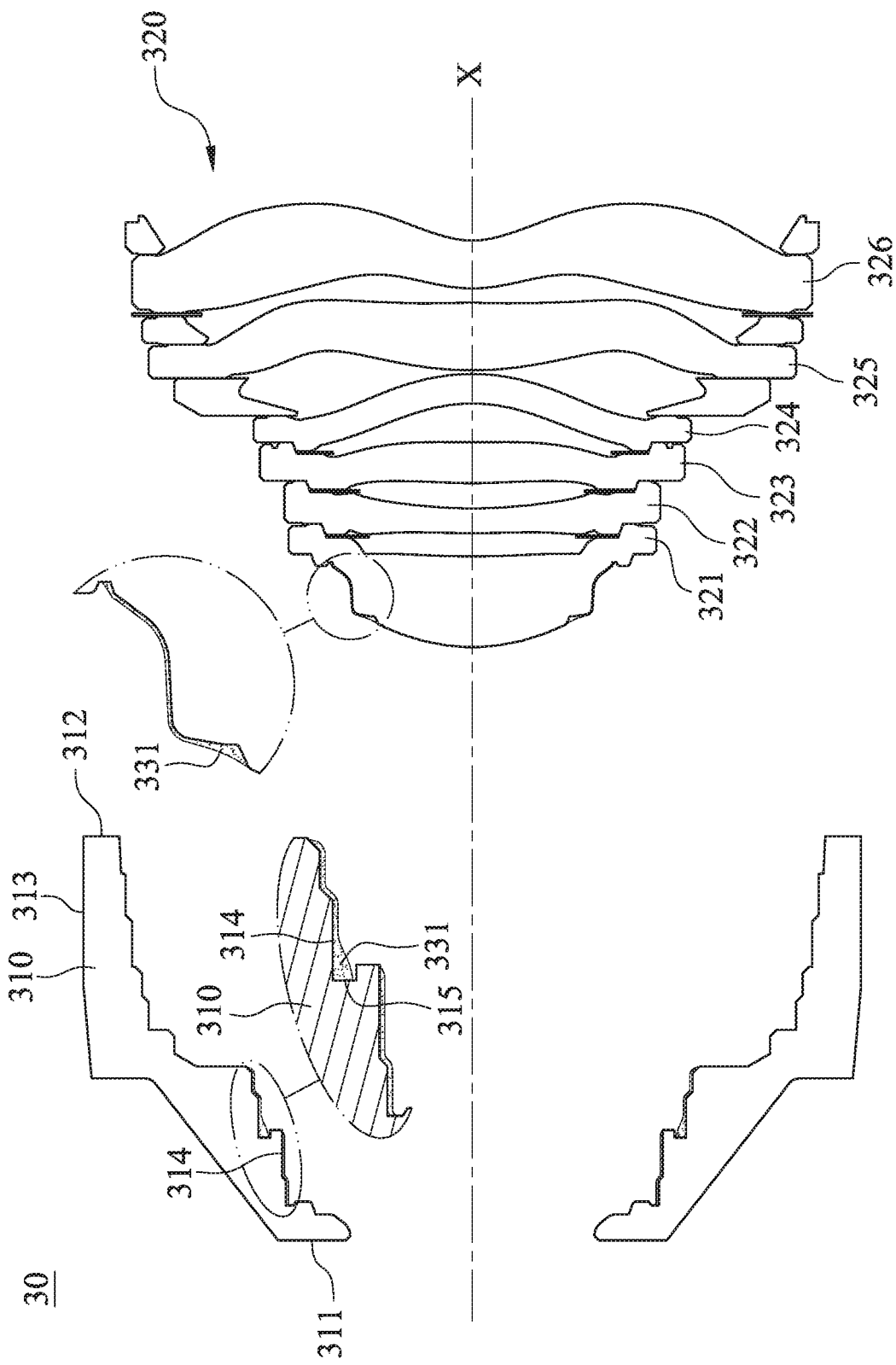
FIG. 3C is an assembling schematic view of the imaging lens assembly according to the 3rd example in FIG. 3A.

FIG. 3C is an assembling schematic view of the imaging lens assembly 30 according to the 3rd example in FIG. 3A. In FIG. 3C, the solid medium interval 330 includes a medium material 331, the medium material 331 is originally liquid, and the medium material 331 is disposed on the inner surface 314 or the imaging lens element set 320. According to the 3rd example, the medium material 331 is disposed on the inner surface 314, and the medium material 331 is formed the solid medium interval 330 after solidifying. In detail, the medium material 331 can be a thermosetting adhesive, a photocuring adhesive, a light-absorbing layer or a black coating material, but is not limited thereto. Therefore, it is favorable for enhancing the efficiency of blocking the non-imaging light.

In detail, according to the 3rd example, by the precise coating technique, the medium material 331 is disposed on the inner surface 314 of the plastic carrier element 310, and then the imaging lens element set 320 is further assembled in the plastic carrier element 310. Further, by devising a proper spacing between the lens elements and the plastic carrier element 310, the medium material 331 evenly extends to an ideal coating position between the lens elements and the plastic carrier element 310 by capillarity, and it is different from the technique of prior art, which is spot gluing from the tunnel connected to outside after assembling. Therefore, it is favorable for controlling an ideal coating range of the medium material 331. Also, the entire assembling structure can be strengthened to provide the internal stability.

Each of at least two adjacent lens elements of the lens elements includes a first axial assembling structure 327, and the first axial assembling structures 327 are corresponding to and connected to each other. According to the 3rd example, each of an image side of the first lens element 321, an object side of the second lens element 322, an image side of the second lens element 322, an object side of the third lens element 323, an image side of the third lens element 323 and an object side of the fourth lens element 324 includes the first axial assembling structure 327. In particular, the first axial assembling structure 327 of the image side of the first lens element 321 is corresponding to and connected to the first axial assembling structure 327 of the object side of the second lens element 322, the first axial assembling structure 327 of the image side of the second lens element 322 is corresponding to and connected to the first axial assembling structure 327 of the object side of the third lens element 323, and the first axial assembling structure 327 of the image side of the third lens element 323 is corresponding to and connected to the first axial assembling structure 327 of the object side of the fourth lens element 324. Therefore, it is favorable for maintaining the coaxiality between the lens elements.

Furthermore, the first axial assembling structures 327 are relatively disposed on the optical axis X, and the first axial assembling structures 327 with annular can be regarded as a combination of a plurality of relatively disposed axial assembling structures. Therefore, it is favorable for decreasing the possibility of the axis offset, the relative uniformity of the width of the solid medium interval 330 can be maintained, and the effect of capillarity can be more symmetrical.

Each of the plastic carrier element 310 and the at least one lens element of the lens elements closest to an object side of the imaging lens element set 320 includes a second axial assembling structure 316, and the second axial assembling structures 316 are corresponding to and connected to each other. According to the 3rd example, each of an image side of the plastic carrier element 310 and an object side of the first lens element 321 includes the second axial assembling structure 316, and the second axial assembling structures 316 are corresponding to and connected to each other. Therefore, the coaxiality between the plastic carrier element 310 and the first lens element 321 can be provided.

An outer region of the at least one lens element of the lens elements is totally non-contacted with the inner surface 314 of the plastic carrier element 310. According to the 3rd example, an outer region of the second lens element 322, an outer region of the third lens element 323 and an outer region of the fourth lens element 324 are totally non-contacted with the inner surface 314 of the plastic carrier element 310. Therefore, an accommodating space of the medium material 331 can be provided, and the interference during assembling can be decreased to enhance the assembling velocity.

An air gap 340 is further included between the lens elements and the inner surface 314, and the air gap 340 along a radial direction is closer to the optical axis X than the solid medium interval 330 to the optical axis X. Therefore, it is favorable for stably controlling the coating technique to avoid the medium material 331 overflowing to an optical area of the imaging lens element set 320.

In FIG. 3B, the at least one lens element of the lens elements includes an annular groove structure 329, wherein at least one of the solid medium interval 330 and the air gap 340 is interconnected to the annular groove structure 329. According to the 3rd example, the third lens element 323 includes the annular groove structures 329. Therefore, the anti-overflow mechanism can be provided, and the anti-overflow mechanism can also be an air-venting space during assembling.

The solid medium interval 330 is made of an opaque material. Therefore, it is favorable for preventing the non-imaging light is transmitted in the solid medium interval 330.

Figure 3D:
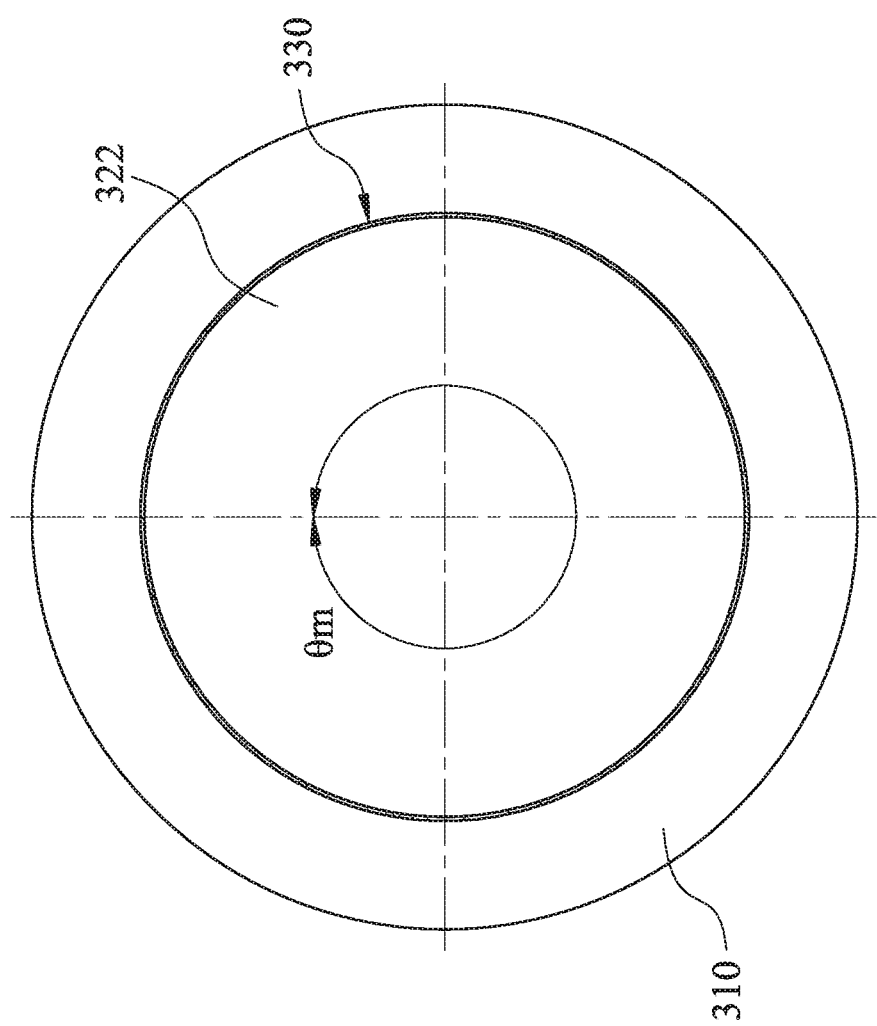
FIG. 3D is a plane view of the plastic carrier element and the second lens element according to the 3rd example in FIG. 3A.

FIG. 3D is a plane view of the plastic carrier element 310 and the second lens element 322 according to the 3rd example in FIG. 3A. In FIG. 3D, a range of an outer periphery of the at least one lens element of the lens elements directly contacted with the solid medium interval 330 is larger than a range of the outer periphery of the at least one lens element of the lens elements non-contacted with the solid medium interval 330 at a plane vertical to the optical axis X. According to the 3rd example, a range of an outer periphery of the second lens element 322 directly contacted with the solid medium interval 330 is larger than a range of the outer periphery of the second lens element 322 non-contacted with the solid medium interval 330.

In FIG. 3C, the plastic carrier element 310 further includes a glue-escaping groove 315, and the glue-escaping groove 315 can be annular or strip-shaped, but is not limited thereto. In detail, the medium material 331 can be accumulated in the glue-escaping groove 315. After assembling the imaging lens element set 320, the medium material 331 extends to other area of the inner surface 314 by capillarity, and the medium material 331 is formed the solid medium interval 330 after solidifying. Therefore, it is favorable for controlling the medium material 331 coated on the ideal coating range and preventing the overflow of the medium material 331.

The solid medium interval 330 is a closed full ring shape, and the solid medium interval 330 surrounds the imaging lens element set 320. In detail, the medium material 331 is evenly disposed on the outer periphery of the imaging lens element set 320. Therefore, the deformation between elements is not easily formed after the medium material 331 solidifying to form the solid medium interval 330.

In FIGS. 3A, 3B and 3D, according to the 3rd example, when an angle between the solid medium interval 330 at the plane vertical to the optical axis X and the optical axis X is θm, the range of the outer periphery of the at least one lens element of the lens elements directly contacted with the solid medium interval 330 is θm', a sum of the range of the outer periphery of the at least one lens element of the lens elements directly contacted with the solid medium interval 330 and the range of the outer periphery of the at least one lens element of the lens elements non-contacted with the solid medium interval 330 is θt (according to the 3rd example, the lens element is the second lens element 322), an angle between each of the first axial assembling structures 327 at the plane vertical to the optical axis X and the optical axis X is θa, a total length of the solid medium interval 330 along the optical axis X is L, a total length of the imaging lens element set 320 along the optical axis X is TD, and a space width of the solid medium interval 330 between the lens elements and the inner surface 314 is d (according to the 3rd example, the lens element is the first lens element 321), the following conditions of the Table 3 are satisfied.

TABLE 3

| 3rd example | | | |
|---|---|---|---|
| θm (degree) | 360 | L (mm) | 1.582 |
| θm' (degree) | 360 | TD (mm) | 3.14 |
| θt (degree) | 360 | L/TD | 0.50 |
| θm'/θt | 1 | d (mm) | 0.02 |
| θa (degree) | 360 | | |

Furthermore, the angle between the solid medium interval 330 at the plane vertical to the optical axis X and the optical axis X is 360 degrees.

4th Example

Figure 4A:
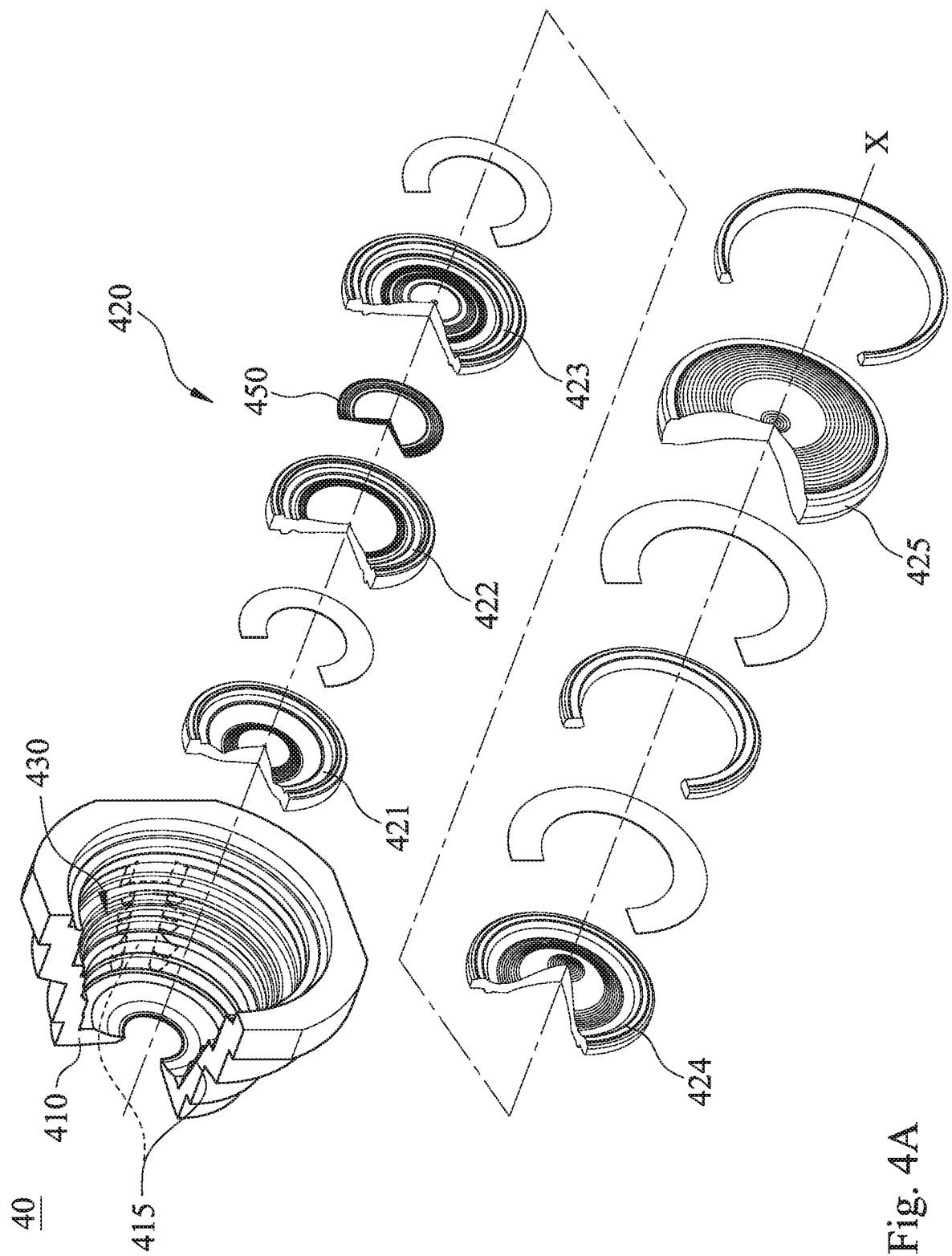
FIG. 4A is an exploded view of an imaging lens assembly according to the 4th example of the present disclosure.
Figure 4B:
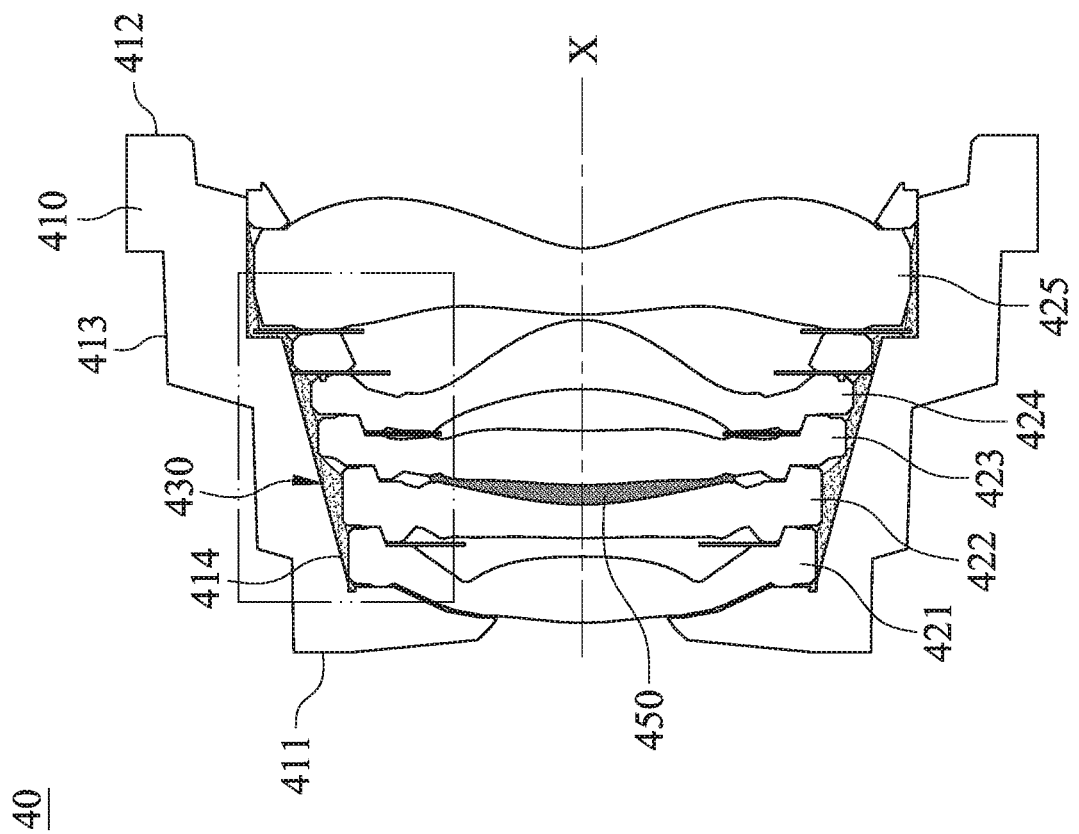
FIG. 4B is an assembling schematic view of the imaging lens assembly according to the 4th example in FIG. 4A.

FIG. 4A is an exploded view of an imaging lens assembly 40 according to the 4th example of the present disclosure. FIG. 4B is an assembling schematic view of the imaging lens assembly 40 according to the 4th example in FIG. 4A. FIG. 4D is a partial cross-sectional view of the imaging lens assembly 40 according to the 4th example in FIG. 4A. In FIGS. 4A, 4B, 4D, the imaging lens assembly 40 has an optical axis X, and includes a plastic carrier element 410 and an imaging lens element set 420. The imaging lens element set 420 is disposed in the plastic carrier element 410.

In detail, the plastic carrier element 410 includes an object-side surface 411, an image-side surface 412, an outer surface 413 and an inner surface 414, wherein the object-side surface 411 includes an object-side opening (its reference numeral is omitted), the image-side surface 412 includes an image-side opening (its reference numeral is omitted), and the inner surface 414 is connected to the object-side opening and the image-side opening. Furthermore, the plastic carrier element 410 can be a plastic lens barrel or a single member, which is integrally formed of the plastic lens barrel and a carrier element by injection molding.

The imaging lens element set 420 includes at least three lens elements. In detail, according to the 4th example, the imaging lens element set 420, in order from an object side to an image side, includes a first lens element 421, a first light blocking sheet, a second lens element 422, a third lens element 423, a second light blocking sheet, a fourth lens element 424, a third light blocking sheet, a first spacer, a fourth light blocking sheet, a fifth lens element 425 and a retainer, wherein optical features such as structures, surface shapes and so on of the first lens element 421, the second lens element 422, the third lens element 423, the fourth lens element 424 and the fifth lens element 425 can be disposed according to different imaging demand. Further, the optical features are not important to the present disclosure, and the first light blocking sheet to the fourth light blocking sheet, the first spacer and the retainer are not emphases of the present disclosure, so their reference numerals are omitted.

Figure 4C:
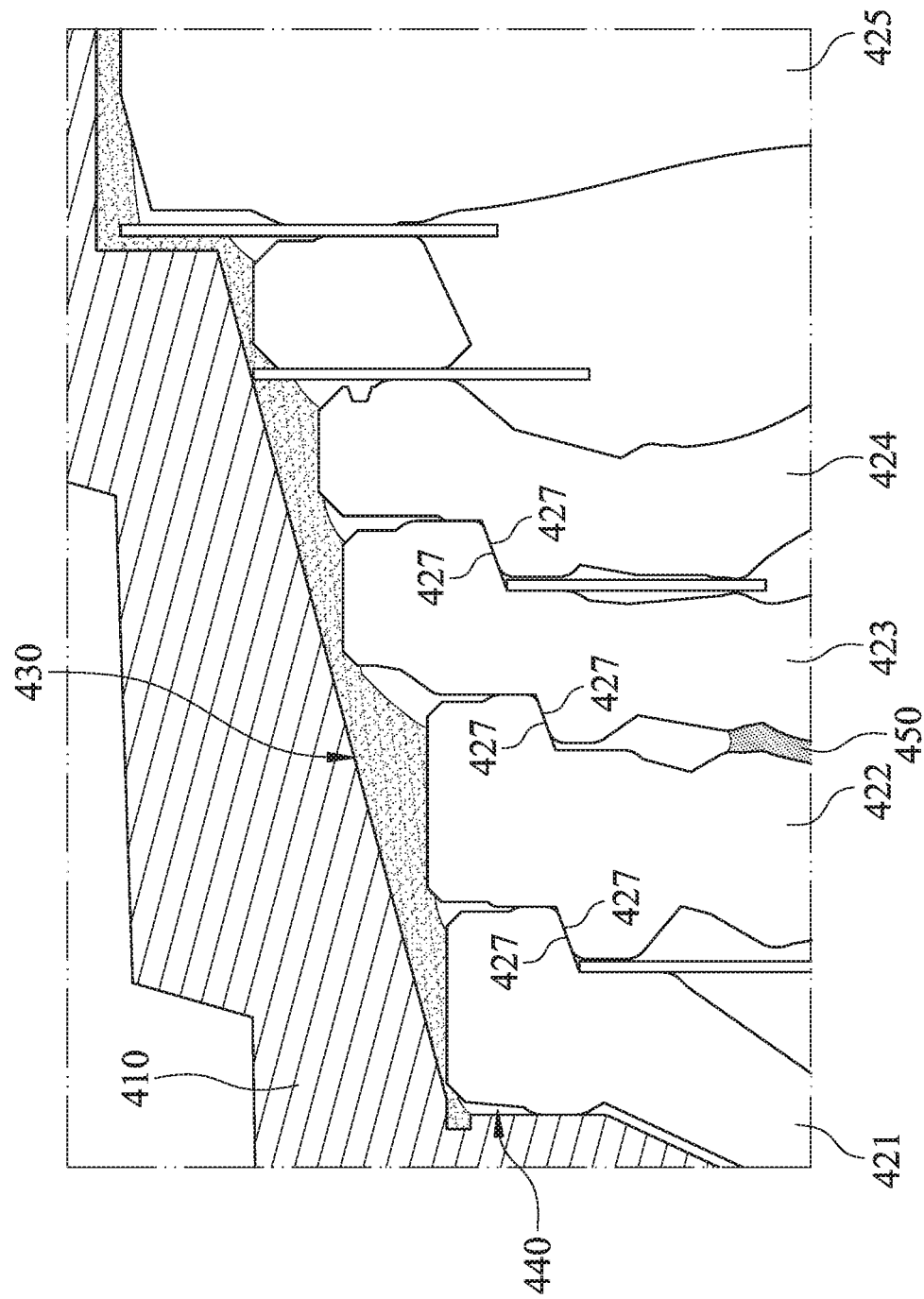
FIG. 4C is a partial enlarged view of the imaging lens assembly according to the 4th example in FIG. 4B.
Figure 4D:
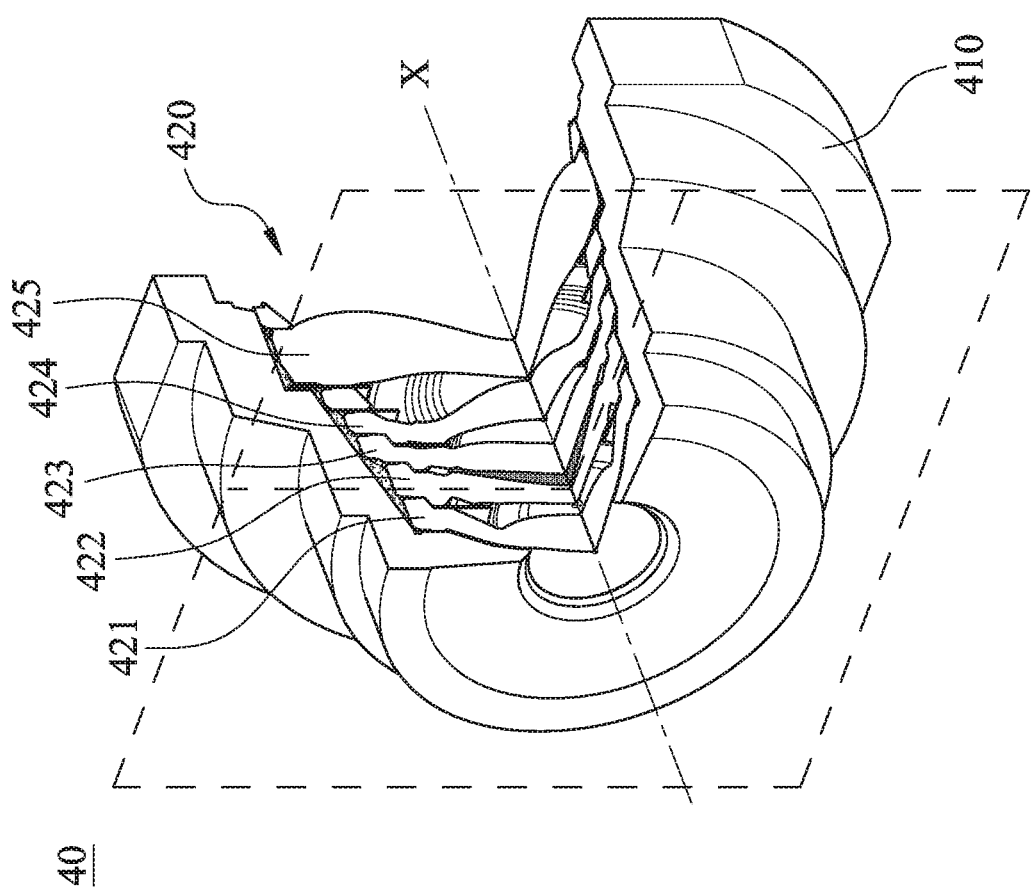
FIG. 4D is a partial cross-sectional view of the imaging lens assembly according to the 4th example in FIG. 4A.

FIG. 4C is a partial enlarged view of the imaging lens assembly 40 according to the 4th example in FIG. 4B. In FIGS. 4A and 4C, a solid medium interval 430 is maintained between two adjacent lens elements of the at least three lens elements and the inner surface 414, wherein the solid medium interval 430 is directly contacted with the adjacent lens elements and the inner surface 414. According to the 4th example, the solid medium interval 430 is maintained between the first lens element 421 and the inner surface 414, the second lens element 422 and the inner surface 414, the third lens element 423 and the inner surface 414, the fourth lens element 424 and the inner surface 414, and the fifth lens element 425 and the inner surface 414, but is not limited thereto. In detail, the solid medium interval 430 includes a medium material (its reference numeral is omitted), and the medium material is disposed on the inner surface 414 or the imaging lens element set 420, wherein the medium material can be a thermosetting adhesive, a photocuring adhesive, a light-absorbing layer or a black coating material, but is not limited thereto. Therefore, it is favorable for enhancing the efficiency of blocking the non-imaging light.

Each of at least two adjacent lens elements of the lens elements includes a first axial assembling structure 427, and the first axial assembling structures 427 are corresponding to and connected to each other. According to the 4th example, each of an image side of the first lens element 421, an object side of the second lens element 422, an image side of the second lens element 422, an object side of the third lens element 423, an image side of the third lens element 423 and an object side of the fourth lens element 424 includes the first axial assembling structure 427. In particular, the first axial assembling structure 427 of the image side of the first lens element 421 is corresponding to and connected to the first axial assembling structure 427 of the object side of the second lens element 422, the first axial assembling structure 427 of the image side of the second lens element 422 is corresponding to and connected to the first axial assembling structure 427 of the object side of the third lens element 423, and the first axial assembling structure 427 of the image side of the third lens element 423 is corresponding to and connected to the first axial assembling structure 427 of the object side of the fourth lens element 424. Therefore, it is favorable for maintaining the coaxiality between the lens elements.

Furthermore, the first axial assembling structures 427 are relatively disposed on the optical axis X, and the first axial assembling structures 427 with annular can be regarded as a combination of a plurality of relatively disposed axial assembling structures. Therefore, it is favorable for decreasing the possibility of the axis offset, the relative uniformity of the width of the solid medium interval 430 can be maintained, and the effect of capillarity can be more symmetrical.

In FIGS. 4A and 4B, a cement material 450 is disposed between the lens elements, and the lens elements are cemented to each other to form a cemented lens group, wherein the first axial assembling structure 427 of each of the lens elements surrounds the cement material 450. According to the 4th example, the cement material 450 is disposed between the second lens element 422 and the third lens element 423, and the second lens element 422 and the third lens element 423 are cemented to each other to form the cemented lens group. Furthermore, the second lens element 422 and the third lens element 423 are cemented to each other via the cement material 450, and the cement material 450 has the optical refractive power. Therefore, it is favorable for enhancing the stability and the coaxiality between the lens elements, and the optical refractive power can be provided to promote the optical image quality.

An outer region of the at least one lens element of the lens elements is totally non-contacted with the inner surface 414 of the plastic carrier element 410. According to the 4th example, an outer region of the second lens element 422, an outer region of the third lens element 423, an outer region of the fourth lens element 424 and an outer region of the fifth lens element 425 are totally non-contacted with the inner surface 414 of the plastic carrier element 410. Therefore, an accommodating space of the medium material can be provided, and the interference during assembling can be decreased to enhance the assembling velocity.

An air gap 440 is further included between the lens elements and the inner surface 414, and the air gap 440 along a radial direction is closer to the optical axis X than the solid medium interval 430 to the optical axis X. Therefore, it is favorable for stably controlling the coating technique to avoid the medium material overflowing to an optical area of the imaging lens element set 420.

The solid medium interval 430 is made of an opaque material. Therefore, it is favorable for preventing the non-imaging light is transmitted in the solid medium interval 430.

Figure 4E:
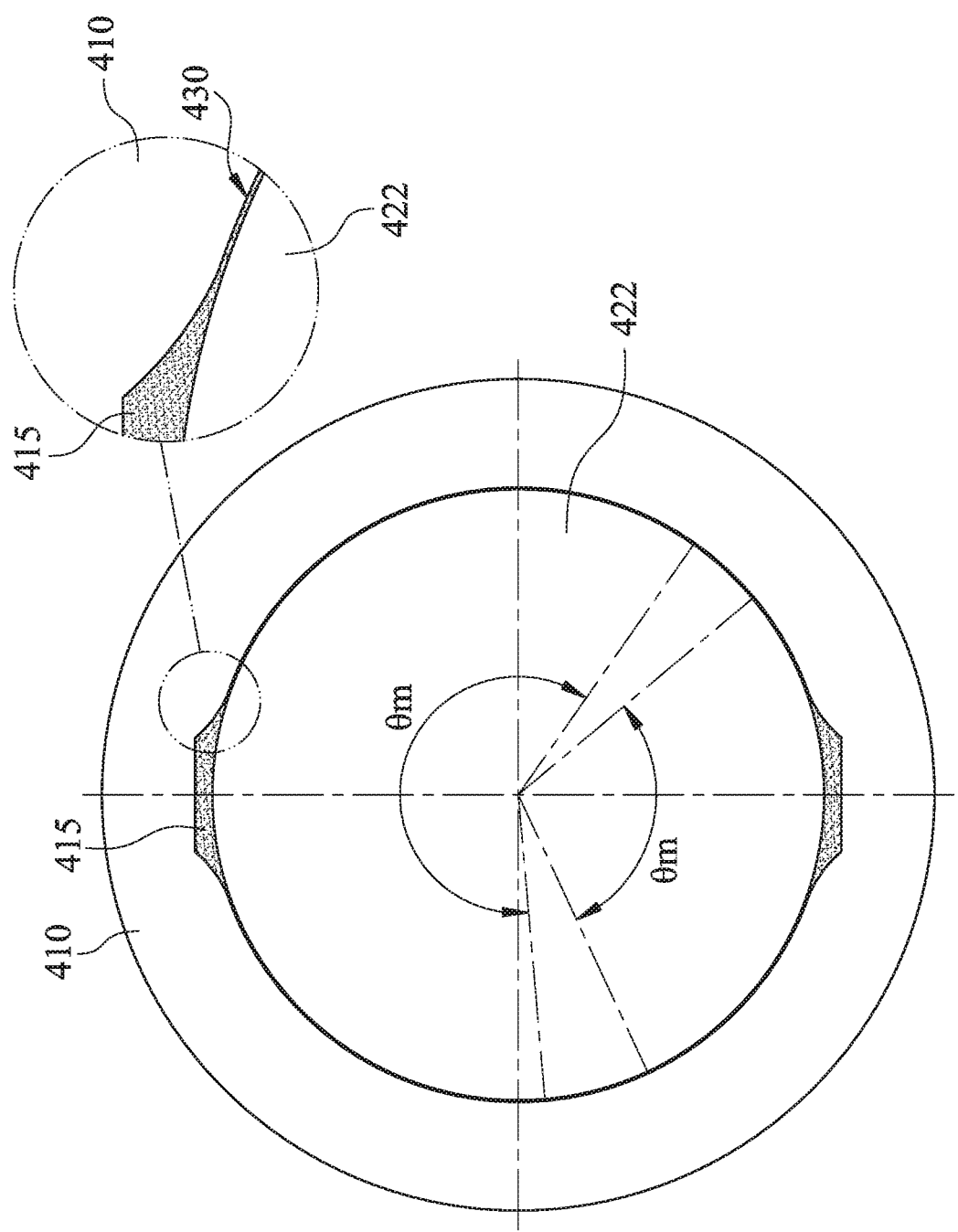
FIG. 4E is a plane view of the plastic carrier element and the second lens element according to the 4th example in FIG. 4D.

FIG. 4E is a plane view of the plastic carrier element 410 and the second lens element 422 according to the 4th example in FIG. 4D. In FIG. 4E, a range of an outer periphery of the at least one lens element of the lens elements directly contacted with the solid medium interval 430 is larger than a range of the outer periphery of the at least one lens element of the lens elements non-contacted with the solid medium interval 430 at a plane vertical to the optical axis X. According to the 4th example, a range of an outer periphery of the second lens element 422 directly contacted with the solid medium interval 430 is larger than a range of the outer periphery of the second lens element 422 non-contacted with the solid medium interval 430. Moreover, when an amount of the medium material is too little during the manufacturing process, a portion of the outer periphery of the lens elements may be non-contacted with the medium material. However, in reality, the medium material is disposed on the outer periphery of the lens elements by capillarity, and a coating range of the medium material can be kept.

Figure 4F:
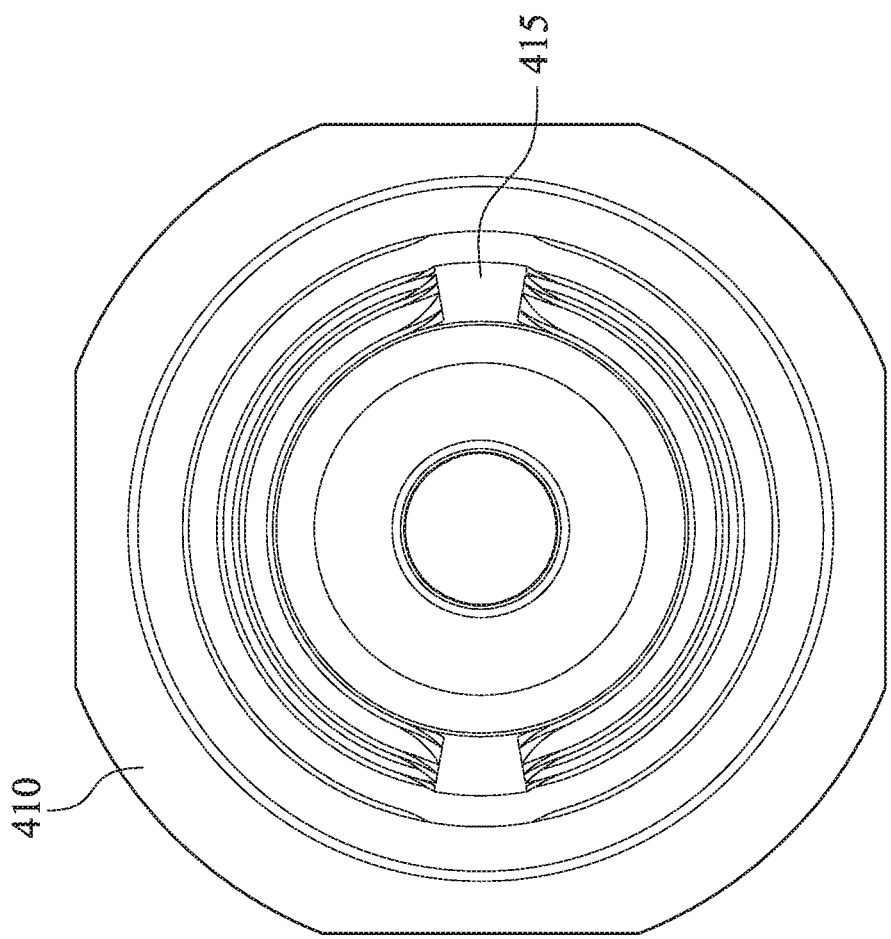
FIG. 4F is a plane view of the plastic carrier element according to the 4th example in FIG. 4A.

FIG. 4F is a plane view of the plastic carrier element 410 according to the 4th example in FIG. 4A. In FIGS. 4A, 4E and 4F, the plastic carrier element 410 further includes a glue-escaping groove 415, and the glue-escaping groove 415 can be annular or strip-shaped, but is not limited thereto. In detail, the medium material of the solid medium interval 430 is originally liquid, and the medium material can be accumulated in the glue-escaping groove 415. After assembling the imaging lens element set 420, the medium material extends to other area of the inner surface 414 by capillarity, and the medium material is formed the solid medium interval 430 after solidifying. Therefore, it is favorable for controlling the medium material coated on the ideal coating range and preventing the overflow of the medium material.

In FIG. 4A, the solid medium interval 430 is a closed full ring shape, and the solid medium interval 430 surrounds the imaging lens element set 420. In detail, the medium material is evenly disposed on the outer periphery of the imaging lens element set 420. Therefore, the deformation between elements is not easily formed after the medium material solidifying to form the solid medium interval 430.

Figure 4G:
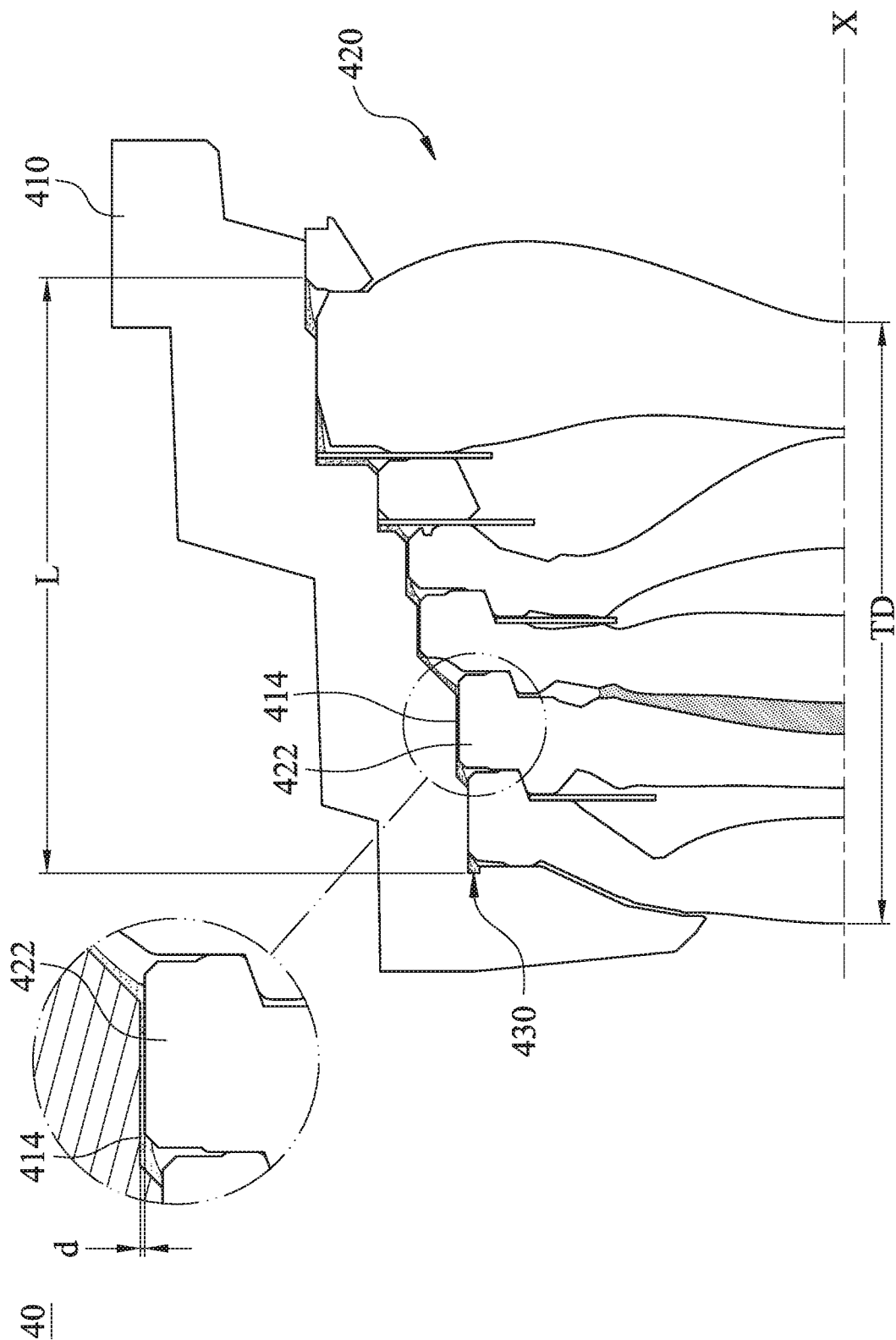
FIG. 4G is a schematic view of parameters according to the 4th example in FIG. 4A.

FIG. 4G is a schematic view of parameters according to the 4th example in FIG. 4A. In FIGS. 4E and 4G, according to the 4th example, when an angle between the solid medium interval 430 at the plane vertical to the optical axis X and the optical axis X is θm, the range of the outer periphery of the at least one lens element of the lens elements directly contacted with the solid medium interval 430 is θm', a sum of the range of the outer periphery of the at least one lens element of the lens elements directly contacted with the solid medium interval 430 and the range of the outer periphery of the at least one lens element of the lens elements non-contacted with the solid medium interval 430 is θt (according to the 4th example, the lens element is the second lens element 422), an angle between each of the first axial assembling structures 427 at the plane vertical to the optical axis X and the optical axis X is θa, a total length of the solid medium interval 430 along the optical axis X is L, a total length of the imaging lens element set 420 along the optical axis X is TD, and a space width of the solid medium interval 430 between the lens elements and the inner surface 414 is d (according to the 4th example, the lens element is the second lens element 422), the following conditions of the Table 4 are satisfied.

TABLE 4

| 4th example | | | |
|---|---|---|---|
| θm (upper portion) (degree) | 220 | θa (degree) | 360 |
| θm (lower portion) (degree) | 105 | L (mm) | 2.653 |
| θm' (degree) | 325 | TD (mm) | 2.682 |
| θt (degree) | 360 | L/TD | 0.99 |
| θm'/θt | 0.90 | d (mm) | 0.01 |

Furthermore, each of the angles between the solid medium interval 430 at the plane vertical to the optical axis X and the optical axis X is 220 degrees and 105 degrees.

5th Example

Figure 5A:
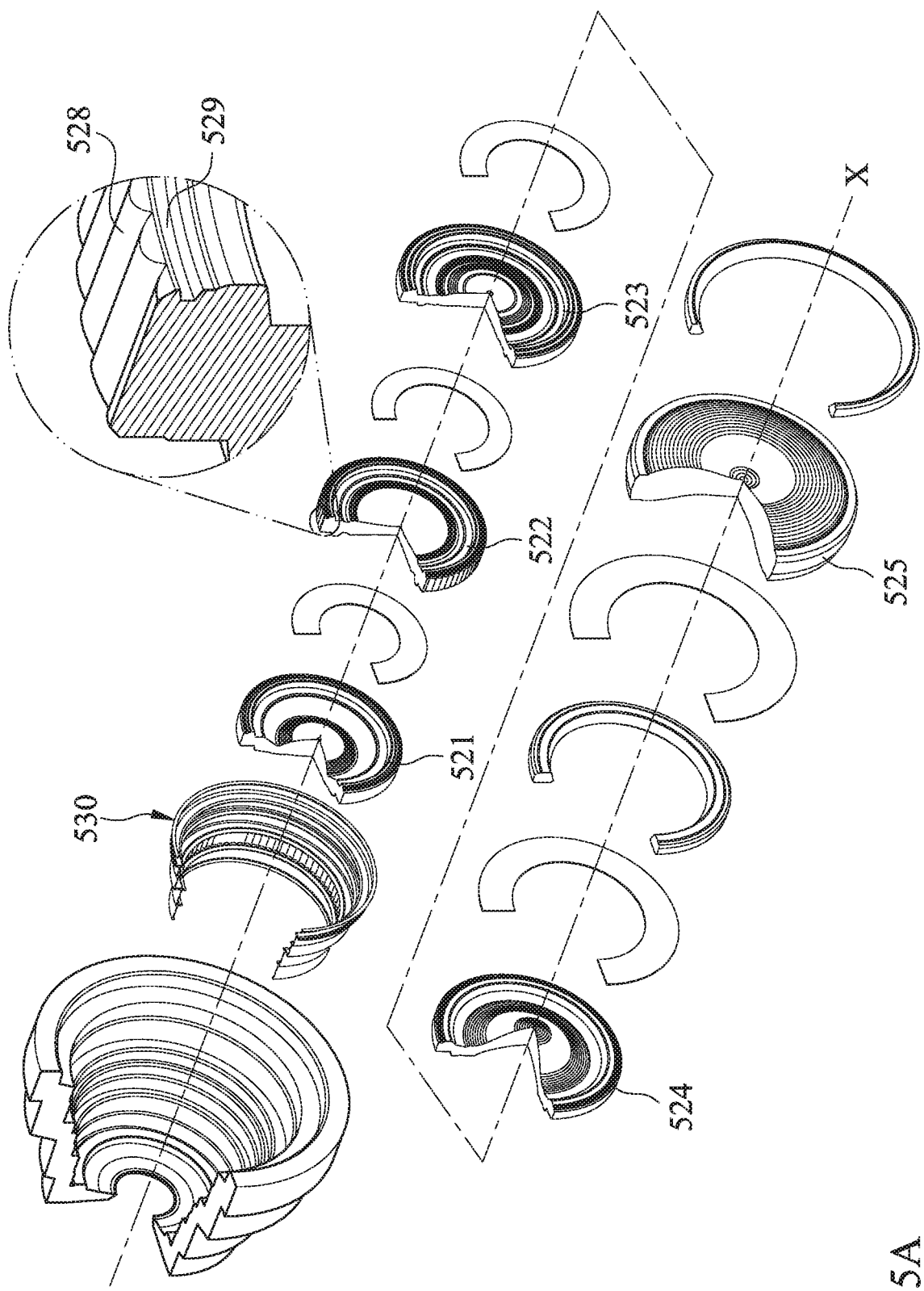
FIG. 5A is an exploded view of an imaging lens assembly according to the 5th example of the present disclosure.
Figure 5B:
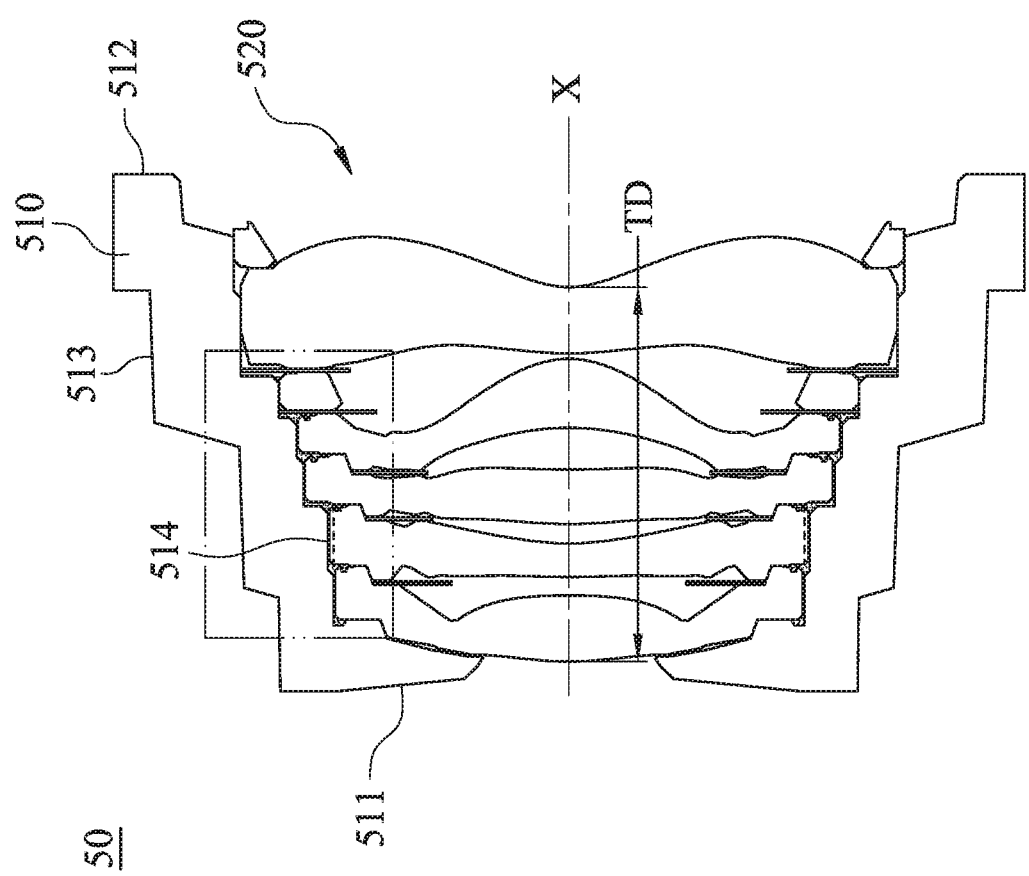
FIG. 5B is an assembling schematic view of the imaging lens assembly according to the 5th example in FIG. 5A.

FIG. 5A is an exploded view of an imaging lens assembly 50 according to the 5th example of the present disclosure. FIG. 5B is an assembling schematic view of the imaging lens assembly 50 according to the 5th example in FIG. 5A. FIG. 5D is a partial cross-sectional view of the imaging lens assembly 50 according to the 5th example in FIG. 5A. In FIGS. 5A, 5B, 5D, the imaging lens assembly 50 has an optical axis X, and includes a plastic carrier element 510 and an imaging lens element set 520. The imaging lens element set 520 is disposed in the plastic carrier element 510.

In detail, the plastic carrier element 510 includes an object-side surface 511, an image-side surface 512, an outer surface 513 and an inner surface 514, wherein the object-side surface 511 includes an object-side opening (its reference numeral is omitted), the image-side surface 512 includes an image-side opening (its reference numeral is omitted), and the inner surface 514 is connected to the object-side opening and the image-side opening. Furthermore, the plastic carrier element 510 can be a plastic lens barrel or a single member, which is integrally formed of the plastic lens barrel and a carrier element by injection molding.

The imaging lens element set 520 includes at least three lens elements. In detail, according to the 5th example, the imaging lens element set 520, in order from an object side to an image side, includes a first lens element 521, a first light blocking sheet, a second lens element 522, a second light blocking sheet, a third lens element 523, a third light blocking sheet, a fourth lens element 524, a fourth light blocking sheet, a first spacer, a fifth light blocking sheet, a fifth lens element 525 and a retainer, wherein optical features such as structures, surface shapes and so on of the first lens element 521, the second lens element 522, the third lens element 523, the fourth lens element 524 and the fifth lens element 525 can be disposed according to different imaging demand. Further, the optical features are not important to the present disclosure, and the first light blocking sheet to the fifth light blocking sheet, the first spacer and the retainer are not emphases of the present disclosure, so their reference numerals are omitted.

Figure 5C:
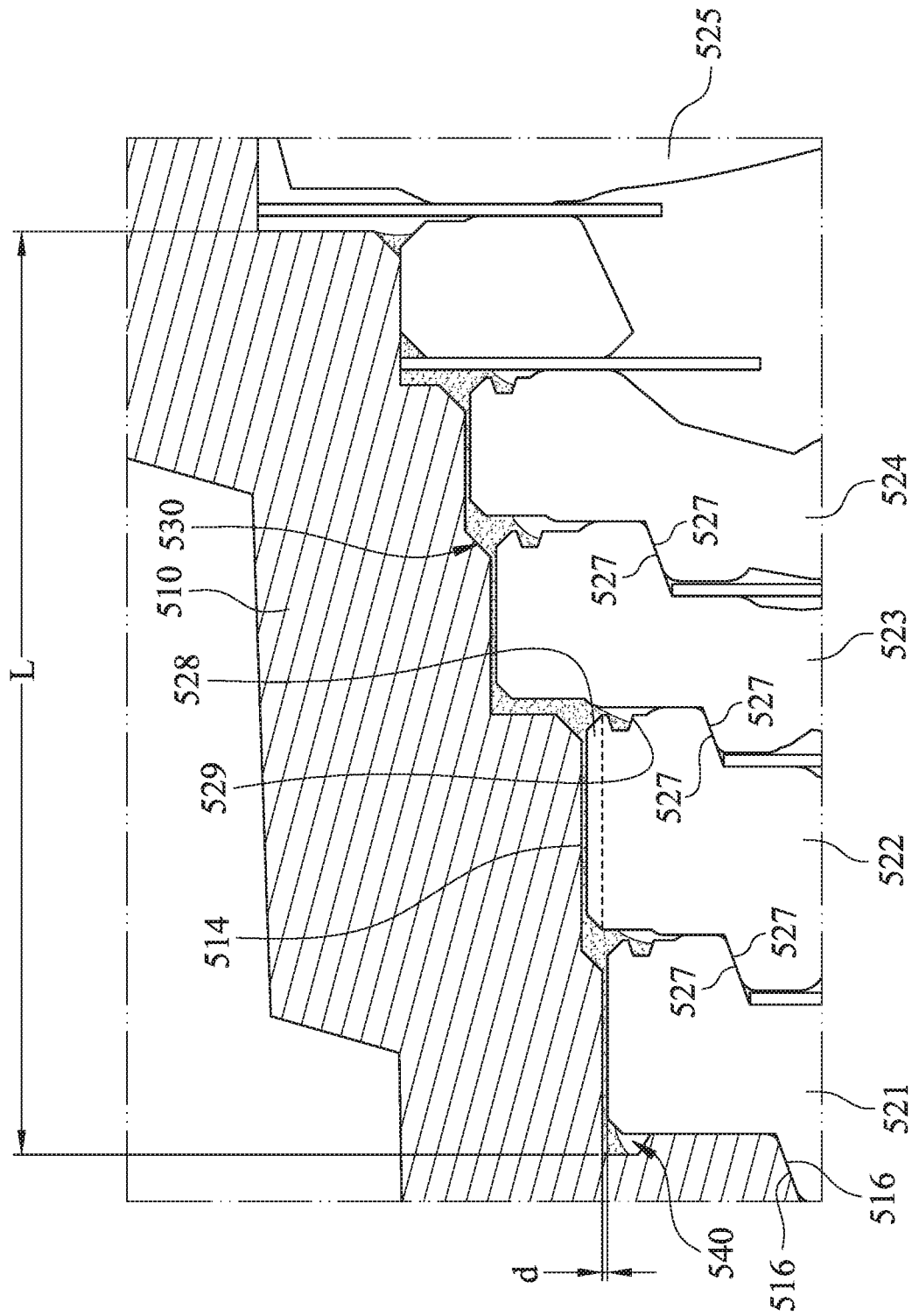
FIG. 5C is a partial enlarged view of the imaging lens assembly according to the 5th example in FIG. 5B.
Figure 5D:
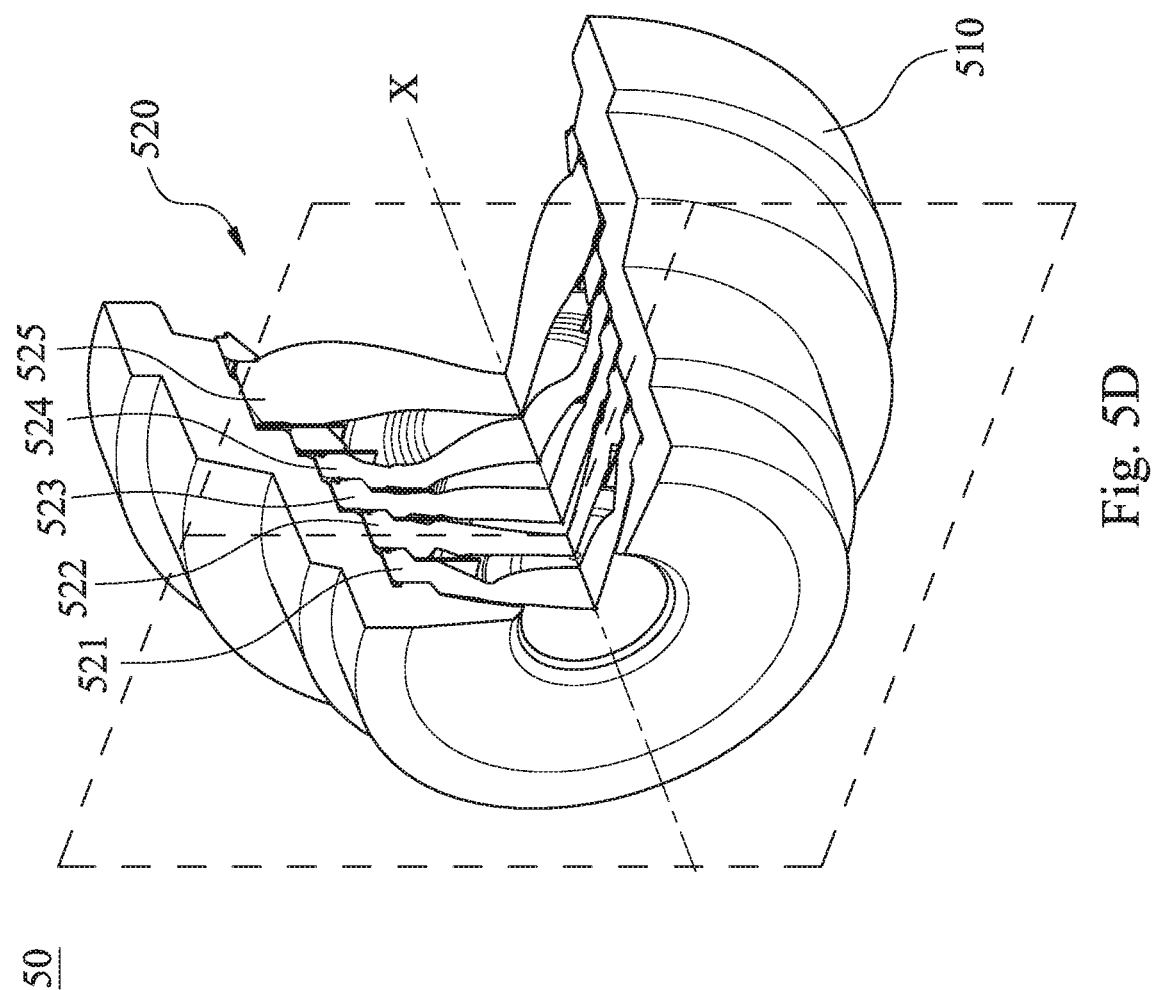
FIG. 5D is a partial cross-sectional view of the imaging lens assembly according to the 5th example in FIG. 5A.

FIG. 5C is a partial enlarged view of the imaging lens assembly 50 according to the 5th example in FIG. 5B. In FIGS. 5A and 5C, a solid medium interval 530 is maintained between two adjacent lens elements of the at least three lens elements and the inner surface 514, wherein the solid medium interval 530 is directly contacted with the adjacent lens elements and the inner surface 514. According to the 5th example, the solid medium interval 530 is maintained between the first lens element 521 and the inner surface 514, the second lens element 522 and the inner surface 514, the third lens element 523 and the inner surface 514, and the fourth lens element 524 and the inner surface 514, but is not limited thereto. In detail, the solid medium interval 530 includes a medium material (its reference numeral is omitted), and the medium material is disposed on the inner surface 514 or the imaging lens element set 520, wherein the medium material can be a thermosetting adhesive, a photo-curing adhesive, a light-absorbing layer or a black coating material, but is not limited thereto. Therefore, it is favorable for enhancing the efficiency of blocking the non-imaging light.

Each of at least two adjacent lens elements of the lens elements includes a first axial assembling structure 527, and the first axial assembling structures 527 are corresponding to and connected to each other. According to the 5th example, each of an image side of the first lens element 521, an object side of the second lens element 522, an image side of the second lens element 522, an object side of the third lens element 523, an image side of the third lens element 523 and an object side of the fourth lens element 524 includes the first axial assembling structure 527. In particular, the first axial assembling structure 527 of the image side of the first lens element 521 is corresponding to and connected to the first axial assembling structure 527 of the object side of the second lens element 522, the first axial assembling structure 527 of the image side of the second lens element 522 is corresponding to and connected to the first axial assembling structure 527 of the object side of the third lens element 523, and the first axial assembling structure 527 of the image side of the third lens element 523 is corresponding to and connected to the first axial assembling structure 527 of the object side of the fourth lens element 524. Therefore, it is favorable for maintaining the coaxiality between the lens elements.

Furthermore, the first axial assembling structures 527 are relatively disposed on the optical axis X, and the first axial assembling structures 527 with annular can be regarded as a combination of a plurality of relatively disposed axial assembling structures. Therefore, it is favorable for decreasing the possibility of the axis offset, the relative uniformity of the width of the solid medium interval 530 can be maintained, and the effect of capillarity can be more symmetrical.

Each of the plastic carrier element 510 and the at least one lens element of the lens elements closest to an object side of the imaging lens element set 520 includes a second axial assembling structure 516, and the second axial assembling structures 516 are corresponding to and connected to each other. According to the 5th example, each of an image side of the plastic carrier element 510 and an object side of the first lens element 521 includes the second axial assembling structure 516, and the second axial assembling structures 516 are corresponding to and connected to each other. Therefore, the coaxiality between the plastic carrier element 510 and the first lens element 521 can be provided.

Figure 5E:
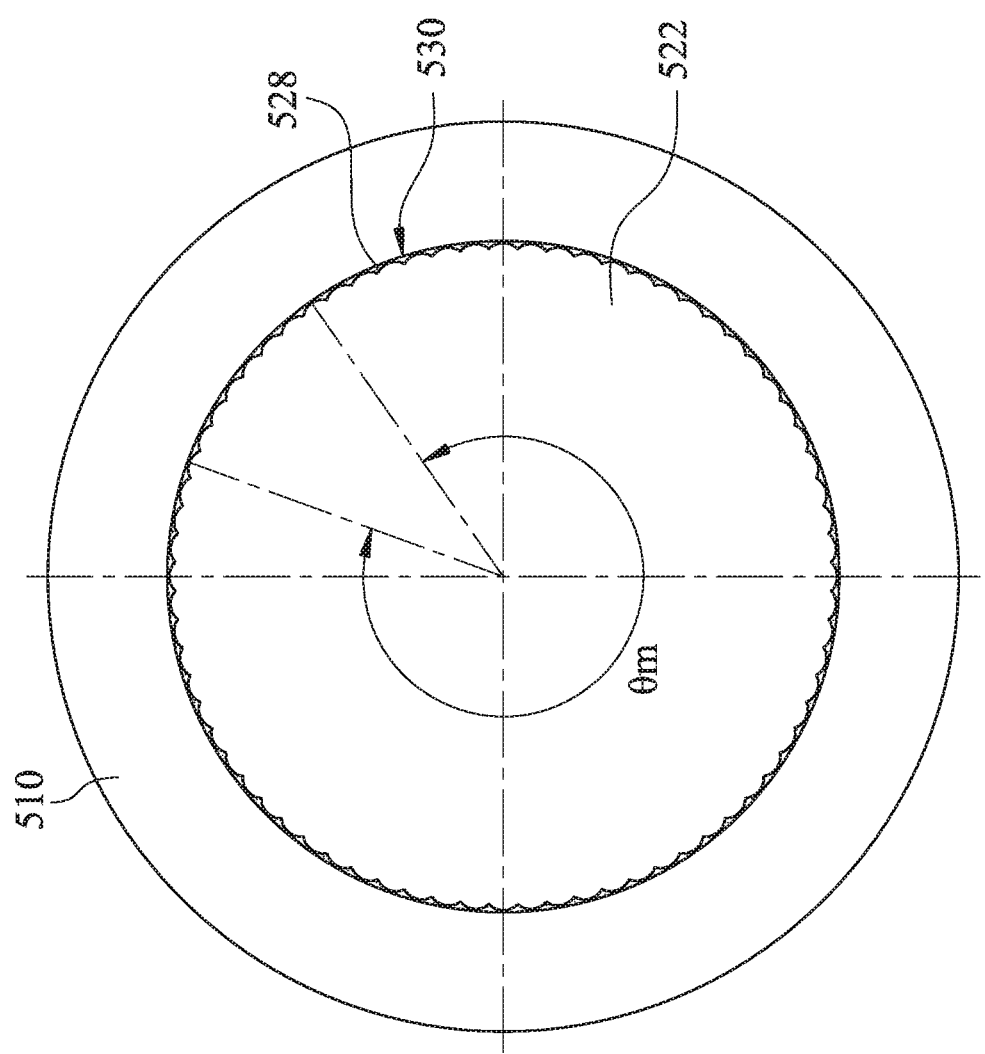
FIG. 5E is a plane view of the plastic carrier element and the second lens element according to the 5th example in FIG. 5D.
Figure 5F:
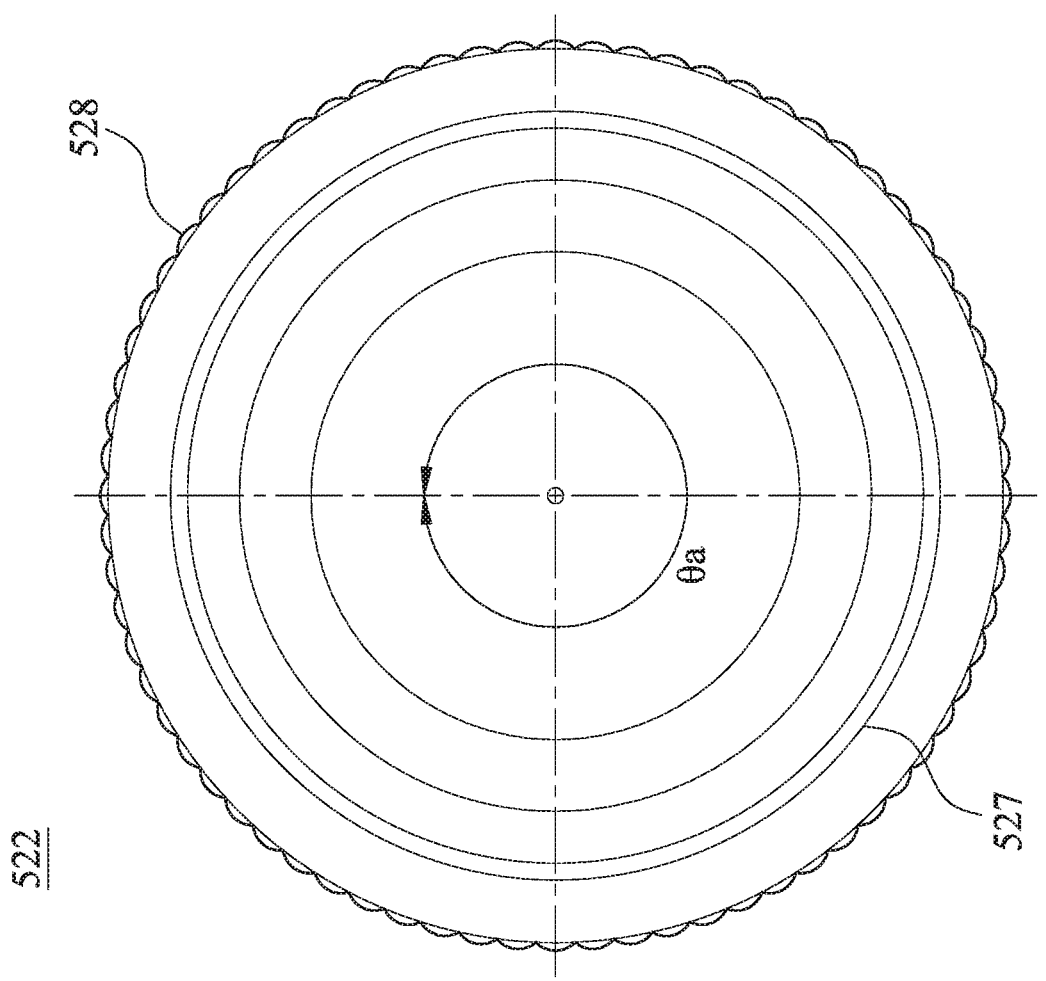
FIG. 5F is a plane view of the second lens element according to the 5th example in FIG. 5A.

FIG. 5E is a plane view of the plastic carrier element 510 and the second lens element 522 according to the 5th example in FIG. 5D. FIG. 5F is a plane view of the second lens element 522 according to the 5th example in FIG. 5A. In FIGS. 5A, 5C, 5E and 5F, the at least one lens element of the lens elements includes a plurality of protruding structures 528. According to the 5th example, the at least one element including the protruding structures 528 is the second lens element 522. The protruding structures 528 protrude along a direction vertical to the optical axis X and are regularly arranged around an outer periphery of the second lens element 522, and the solid medium interval 530 are directly contacted with the protruding structures 528. In detail, the medium material can be pulled along the inner surface 514 via the protruding structures 528 during assembling the lens elements, and the medium material can be more entirely coated between the plastic carrier element 510 and the lens elements. Therefore, it is favorable for more ideally developing capillarity.

An outer region of the at least one lens element of the lens elements is totally non-contacted with the inner surface 514 of the plastic carrier element 510. According to the 5th example, an outer region of the second lens element 522, an outer region of the third lens element 523 and an outer region of the fourth lens element 524 are totally non-contacted with the inner surface 514 of the plastic carrier element 510. Therefore, an accommodating space of the medium material can be provided, and the interference during assembling can be decreased to enhance the assembling velocity.

An air gap 540 is further included between the lens elements and the inner surface 514, and the air gap 540 along a radial direction is closer to the optical axis X than the solid medium interval 530 to the optical axis X. Therefore, it is favorable for stably controlling the coating technique to avoid the medium material overflowing to an optical area of the imaging lens element set 520.

In FIGS. 5A and 5C, the at least one lens element of the lens elements includes an annular groove structure 529, wherein at least one of the solid medium interval 530 and the air gap 540 is interconnected to the annular groove structure 529. According to the 5th example, the second lens element 522 includes the annular groove structures 529. Therefore, the anti-overflow mechanism can be provided, and the anti-overflow mechanism can also be an air-venting space during assembling.

The solid medium interval 530 is made of an opaque material. Therefore, it is favorable for preventing the non-imaging light is transmitted in the solid medium interval 530.

In FIG. 5E, a range of an outer periphery of the at least one lens element of the lens elements directly contacted with the solid medium interval 530 is larger than a range of the outer periphery of the at least one lens element of the lens elements non-contacted with the solid medium interval 530 at a plane vertical to the optical axis X. According to the 5th example, a range of an outer periphery of the second lens element 522 directly contacted with the solid medium interval 530 is larger than a range of the outer periphery of the second lens element 522 non-contacted with the solid medium interval 530.

In FIG. 5A, the solid medium interval 530 is a closed full ring shape, and the solid medium interval 530 surrounds the imaging lens element set 520. In detail, the medium material is evenly disposed on the outer periphery of the imaging lens element set 520. Therefore, the deformation between elements is not easily formed after the medium material solidifying to form the solid medium interval 530.

In FIGS. 5B, 5C, 5E and 5F, according to the 5th example, when an angle between the solid medium interval 530 at the plane vertical to the optical axis X and the optical axis X is θm, the range of the outer periphery of the at least one lens element of the lens elements directly contacted with the solid medium interval 530 is θm', a sum of the range of the outer periphery of the at least one lens element of the lens elements directly contacted with the solid medium interval 530 and the range of the outer periphery of the at least one lens element of the lens elements non-contacted with the solid medium interval 530 is θt (according to the 5th example, the lens element is the second lens element 522), an angle between each of the first axial assembling structures 527 at the plane vertical to the optical axis X and the optical axis X is θa, a total length of the solid medium interval 530 along the optical axis X is L, a total length of the imaging lens element set 520 along the optical axis X is TD, and a space width of the solid medium interval 530 between the lens elements and the inner surface 514 is d (according to the 5th example, the lens element is the first lens element 521), the following conditions of the Table 5 are satisfied.

TABLE 5

| 5th example | | | |
|---|---|---|---|
| θm (degree) | 325 | L (mm) | 1.785 |
| θm' (degree) | 325 | TD (mm) | 2.682 |
| θt (degree) | 360 | L/TD | 0.67 |
| θm'/θt | 0.90 | d (mm) | 0.01 |
| θa (degree) | 360 | | |

Furthermore, the angle between the solid medium interval 530 at the plane vertical to the optical axis X and the optical axis X is 325 degrees.

6th Example

Figure 6A:
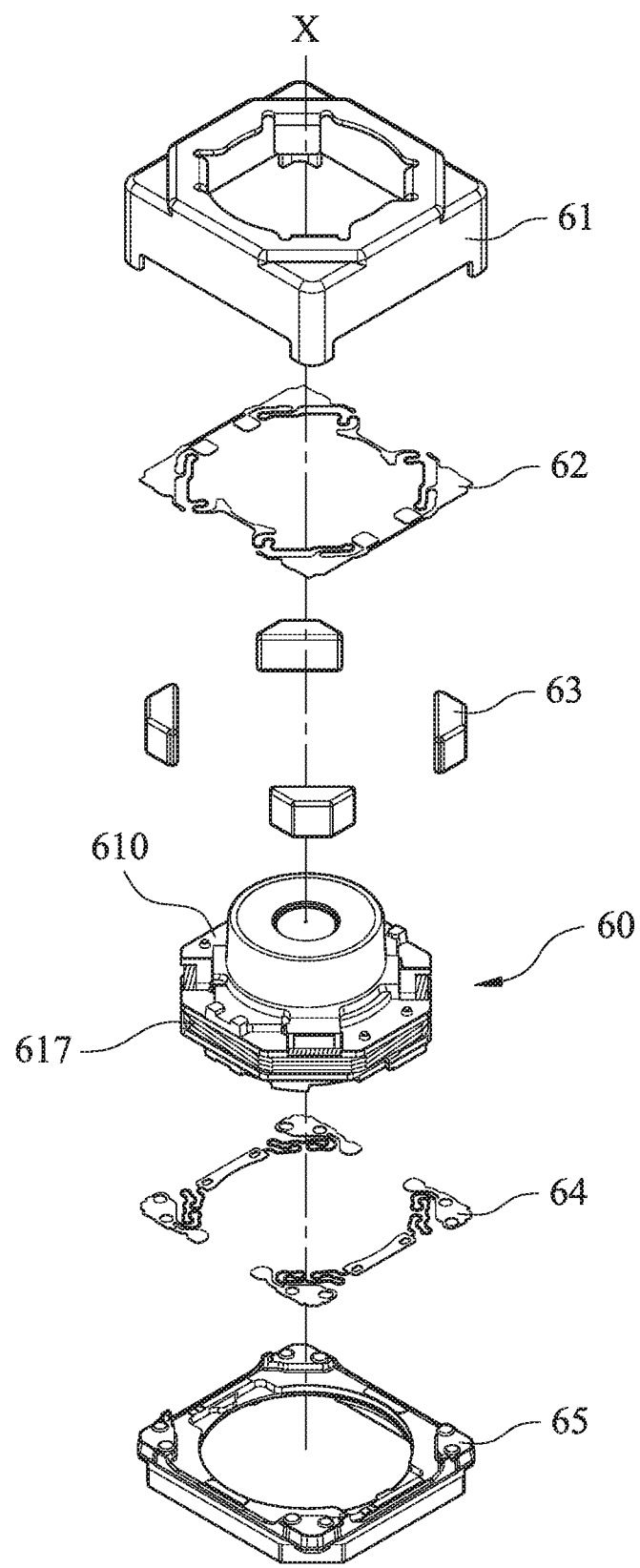
FIG. 6A is an exploded view of an electronic device according to the 6th example of the present disclosure.

FIG. 6A is an exploded view of an electronic device according to the 6th example of the present disclosure. In FIG. 6A, the electronic device (its reference numeral is omitted) includes a cover 61, an upper spring leaf 62, a plurality of magnets 63, an imaging lens assembly 60, a lower spring leaf 64 and a holder 65, wherein the cover 61 is coupled with the holder 65.

Figure 6B:
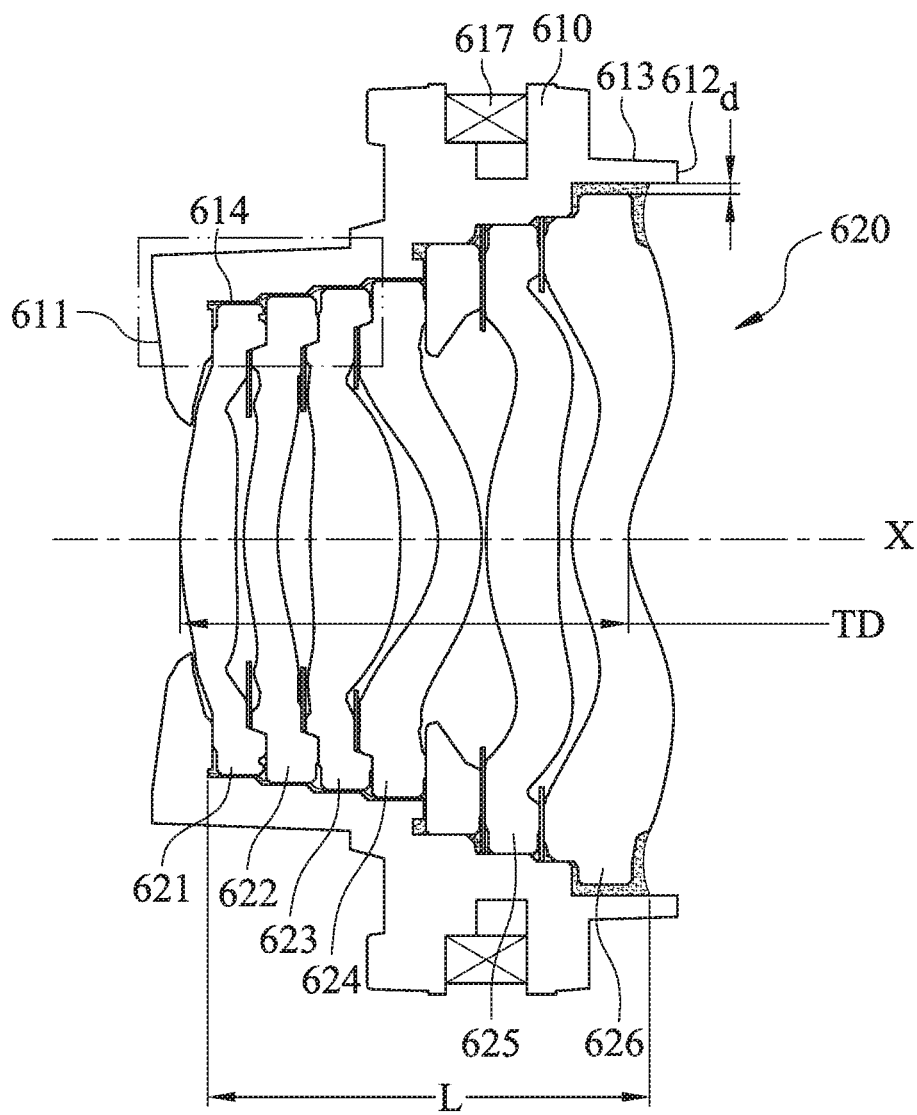
FIG. 6B is a schematic view of an imaging lens assembly according to the 6th example in FIG. 6A.

FIG. 6B is a schematic view of an imaging lens assembly 60 according to the 6th example in FIG. 6A. In FIGS. 6A and 6B, the imaging lens assembly 60 has an optical axis X, and includes a plastic carrier element 610 and an imaging lens element set 620. The imaging lens element set 620 is disposed in the plastic carrier element 610. According to the 6th example, the plastic carrier element 610 is a single member, which is integrally formed of the plastic lens barrel and a carrier element by injection molding, and the plastic carrier element 610 is disposed in the cover 61, but is not limited thereto.

In FIG. 6B, the plastic carrier element 610 includes an object-side surface 611, an image-side surface 612, an outer surface 613 and an inner surface 614, wherein the object-side surface 611 includes an object-side opening (its reference numeral is omitted), the image-side surface 612 includes an image-side opening (its reference numeral is omitted), and the inner surface 614 is connected to the object-side opening and the image-side opening. Furthermore, a driving apparatus 617 is disposed on the outer surface 613 of the plastic carrier element 610, and the driving apparatus 617 is for driving the imaging lens assembly 60 to move along a direction parallel to the optical axis X, wherein the driving apparatus 617 can be a coil element or a magnet element. According to the 6th example, the driving apparatus 617 is the coil element, but is not limited thereto. Therefore, the possibility of the autofocus of the imaging lens assembly 60 can be provided.

The plastic carrier element 610 can be assembled with one of the magnet 63 and the driving apparatus 617. The holder 65 has a central opening (its reference numeral is omitted), and the cover 61 has an opening (its reference numeral is omitted), wherein the opening of the cover 61 is corresponding to the central opening of the holder 65.

The magnet 63 has a surface facing the driving apparatus 617. The upper spring leaf 62 is disposed between the magnet 63 and the cover 61, the lower spring leaf 64 is disposed between the imaging lens assembly 60 and the holder 65, and both of the upper spring leaf 62 and the lower spring leaf 64 are disposed along the optical axis X. Each of the upper spring leaf 62 and the lower spring leaf 64 is connected to the plastic carrier element 610, and both of the upper spring leaf 62 and the lower spring leaf 64 are for supporting the plastic carrier element 610 to move along the direction parallel to the optical axis X. Therefore, it is favorable for achieving the space disposition of the compact size, and the stability of autofocus can be maintained.

In FIG. 6B, the imaging lens element set 620 includes at least three lens elements. In detail, according to the 6th example, the imaging lens element set 620, in order from an object side to an image side, includes a first lens element 621, a first light blocking sheet, a second lens element 622, a second light blocking sheet, a third lens element 623, a third light blocking sheet, a fourth lens element 624, a first spacer, a fourth light blocking sheet, a fifth lens element 625, a fifth light blocking sheet and a sixth lens element 626, wherein optical features such as structures, surface shapes and so on of the first lens element 621, the second lens element 622, the third lens element 623, the fourth lens element 624, the fifth lens element 625 and the sixth lens element 626 can be disposed according to different imaging demand. Further, the optical features are not important to the present disclosure, and the first light blocking sheet to the fifth light blocking sheet and the first spacer are not emphases of the present disclosure, so their reference numerals are omitted.

Figure 6C:
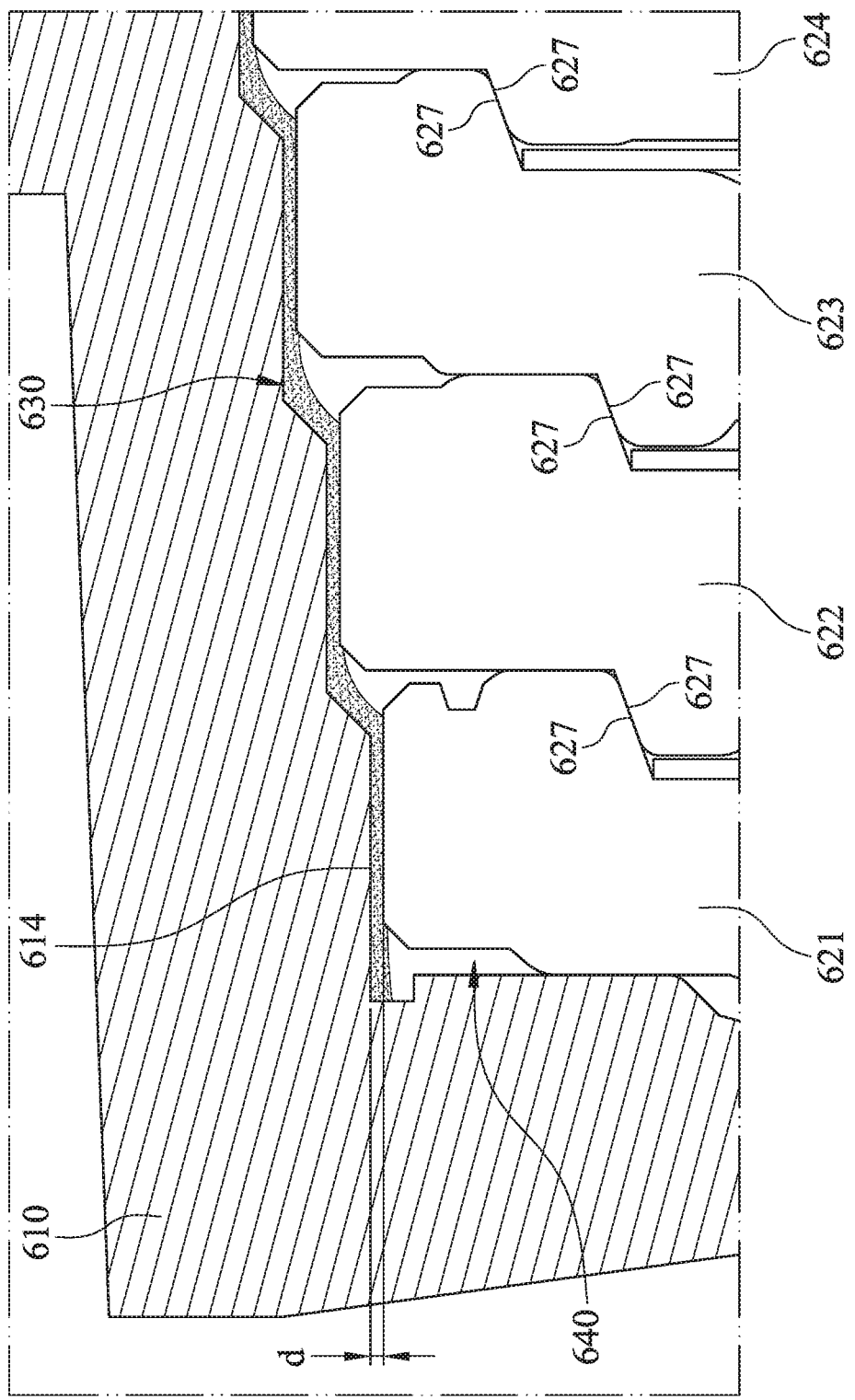
FIG. 6C is a partial enlarged view of the imaging lens assembly according to the 6th example in FIG. 6B.

FIG. 6C is a partial enlarged view of the imaging lens assembly 60 according to the 6th example in FIG. 6B. In FIG. 6C, a solid medium interval 630 is maintained between two adjacent lens elements of the at least three lens elements and the inner surface 614, wherein the solid medium interval 630 is directly contacted with the adjacent lens elements and the inner surface 614. According to the 6th example, the solid medium interval 630 is maintained between the first lens element 621 and the inner surface 614, the second lens element 622 and the inner surface 614, the third lens element 623 and the inner surface 614, the fourth lens element 624 and the inner surface 614, the fifth lens element 625 and the inner surface 614, and the sixth lens element 626 and the inner surface 614, but is not limited thereto. In detail, the solid medium interval 630 includes a medium material (its reference numeral is omitted), and the medium material is disposed on the inner surface 614 or the imaging lens element set 620, wherein the medium material can be a thermosetting adhesive, a photocuring adhesive, a light-absorbing layer or a black coating material, but is not limited thereto. Therefore, it is favorable for enhancing the efficiency of blocking the non-imaging light.

Each of at least two adjacent lens elements of the lens elements includes a first axial assembling structure 627, and the first axial assembling structures 627 are corresponding to and connected to each other. According to the 6th example, each of an image side of the first lens element 621, an object side of the second lens element 622, an image side of the second lens element 622, an object side of the third lens element 623, an image side of the third lens element 623 and an object side of the fourth lens element 624 includes the first axial assembling structure 627. In particular, the first axial assembling structure 627 of the image side of the first lens element 621 is corresponding to and connected to the first axial assembling structure 627 of the object side of the second lens element 622, the first axial assembling structure 627 of the image side of the second lens element 622 is corresponding to and connected to the first axial assembling structure 627 of the object side of the third lens element 623, and the first axial assembling structure 627 of the image side of the third lens element 623 is corresponding to and connected to the first axial assembling structure 627 of the object side of the fourth lens element 624. Therefore, it is favorable for maintaining the coaxiality between the lens elements.

Furthermore, the first axial assembling structures 627 are relatively disposed on the optical axis X, and the first axial assembling structures 627 with annular can be regarded as a combination of a plurality of relatively disposed axial assembling structures. Therefore, it is favorable for decreasing the possibility of the axis offset, the relative uniformity of the width of the solid medium interval 630 can be maintained, and the effect of capillarity can be more symmetrical.

An outer region of the at least one lens element of the lens elements is totally non-contacted with the inner surface 614 of the plastic carrier element 610. According to the 6th example, an outer region of the second lens element 622, an outer region of the third lens element 623 and an outer region of the fourth lens element 624 are totally non-contacted with the inner surface 614 of the plastic carrier element 610. Therefore, an accommodating space of the medium material can be provided, and the interference during assembling can be decreased to enhance the assembling velocity.

An air gap 640 is further included between the lens elements and the inner surface 614, and the air gap 640 along a radial direction is closer to the optical axis X than the solid medium interval 630 to the optical axis X. Therefore, it is favorable for stably controlling the coating technique to avoid the medium material overflowing to an optical area of the imaging lens element set 620.

The solid medium interval 630 is made of an opaque material. Therefore, it is favorable for preventing the non-imaging light is transmitted in the solid medium interval 630.

Figure 6D:
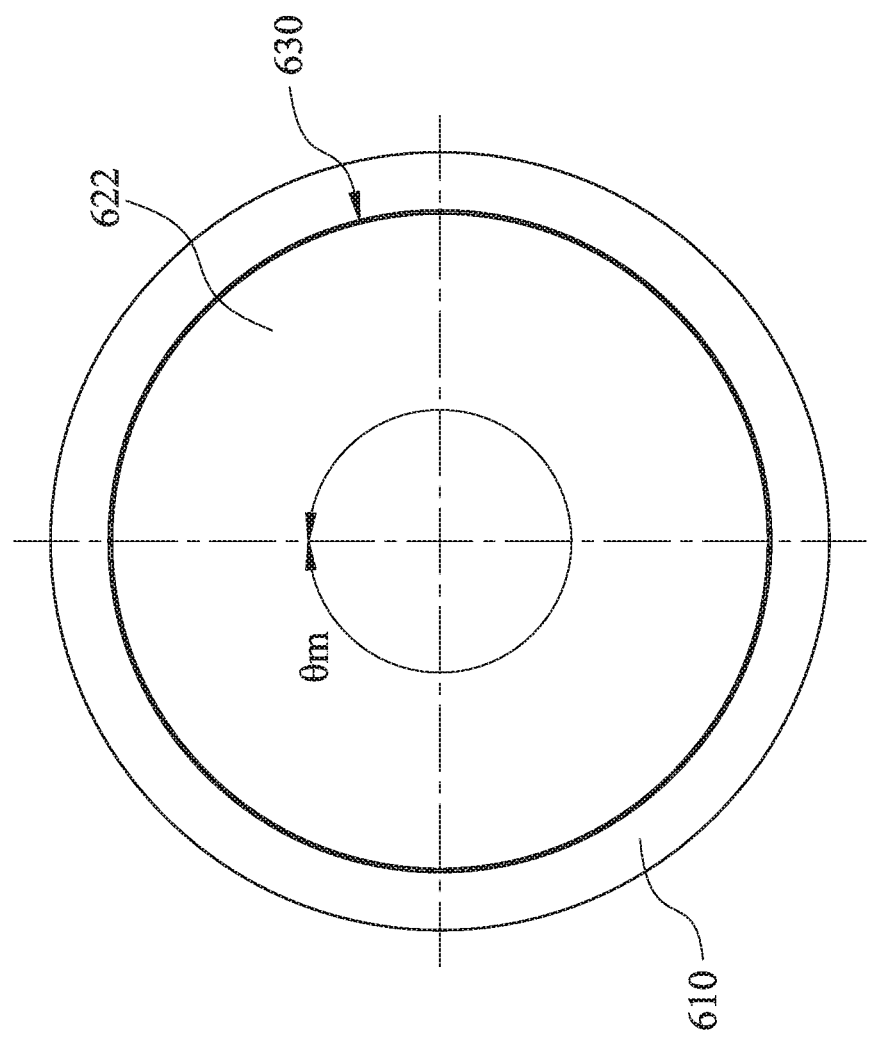
FIG. 6D is a plane view of the plastic carrier element and the second lens element according to the 6th example in FIG. 6A.

FIG. 6D is a plane view of the plastic carrier element 610 and the second lens element 622 according to the 6th example in FIG. 6A. In FIG. 6D, a range of an outer periphery of the at least one lens element of the lens elements directly contacted with the solid medium interval 630 is larger than a range of the outer periphery of the at least one lens element of the lens elements non-contacted with the solid medium interval 630 at a plane vertical to the optical axis X. According to the 6th example, a range of an outer periphery of the second lens element 622 directly contacted with the solid medium interval 630 is larger than a range of the outer periphery of the second lens element 622 non-contacted with the solid medium interval 630.

The solid medium interval 630 is a closed full ring shape, and the solid medium interval 630 surrounds the imaging lens element set 620. In detail, the medium material is evenly disposed on the outer periphery of the imaging lens element set 620. Therefore, the deformation between elements is not easily formed after the medium material solidifying to form the solid medium interval 630.

In FIGS. 6B, 6C and 6D, according to the 6th example, when an angle between the solid medium interval 630 at the plane vertical to the optical axis X and the optical axis X is θm, the range of the outer periphery of the at least one lens element of the lens elements directly contacted with the solid medium interval 630 is θm', a sum of the range of the outer periphery of the at least one lens element of the lens elements directly contacted with the solid medium interval 630 and the range of the outer periphery of the at least one lens element of the lens elements non-contacted with the solid medium interval 630 is θt (according to the 6th example, the lens element is the second lens element 622), an angle between each of the first axial assembling structures 627 at the plane vertical to the optical axis X and the optical axis X is θa, a total length of the solid medium interval 630 along the optical axis X is L, a total length of the imaging lens element set 620 along the optical axis X is TD, and a space width of the solid medium interval 630 between the lens elements and the inner surface 614 is d (according to the 6th example, the lens elements are the first lens element 621 and the sixth lens element 626), the following conditions of the Table 6 are satisfied.

TABLE 6

| 6th example | | | |
|---|---|---|---|
| θm (degree) | 360 | L (mm) | 2.877 |
| θm' (degree) | 360 | TD (mm) | 2.92 |
| θt (degree) | 360 | L/TD | 0.99 |
| θm'/θt | 1 | d (mm) (the first lens element) | 0.015 |
| θa (degree) | 360 | d (mm) (the sixth lens element) | 0.07 |

Furthermore, the angle between the solid medium interval 630 at the plane vertical to the optical axis X and the optical axis X is 360 degrees.

7th Example

Figure 7A:
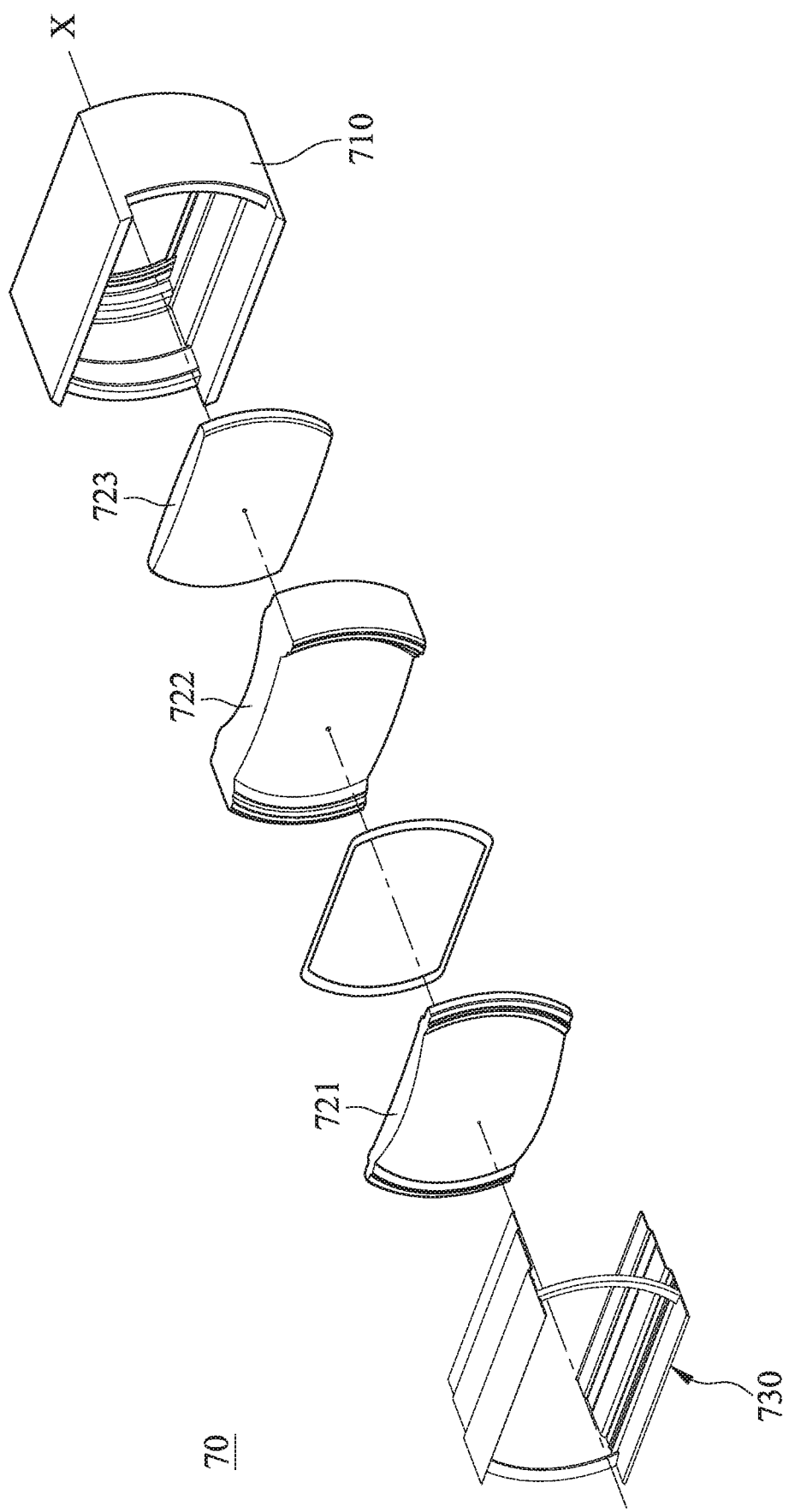
FIG. 7A is an exploded view of an imaging lens assembly according to the 7th example of the present disclosure.
Figure 7B:
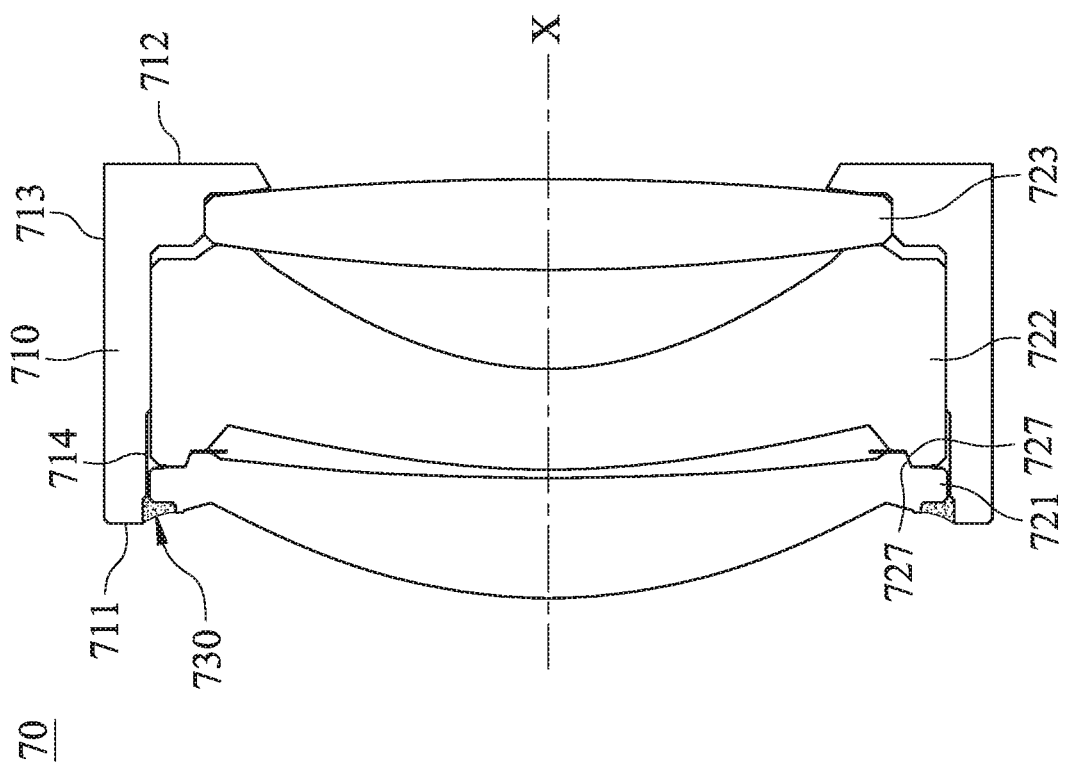
FIG. 7B is an assembling schematic view of the imaging lens assembly according to the 7th example in FIG. 7A.
Figure 7C:
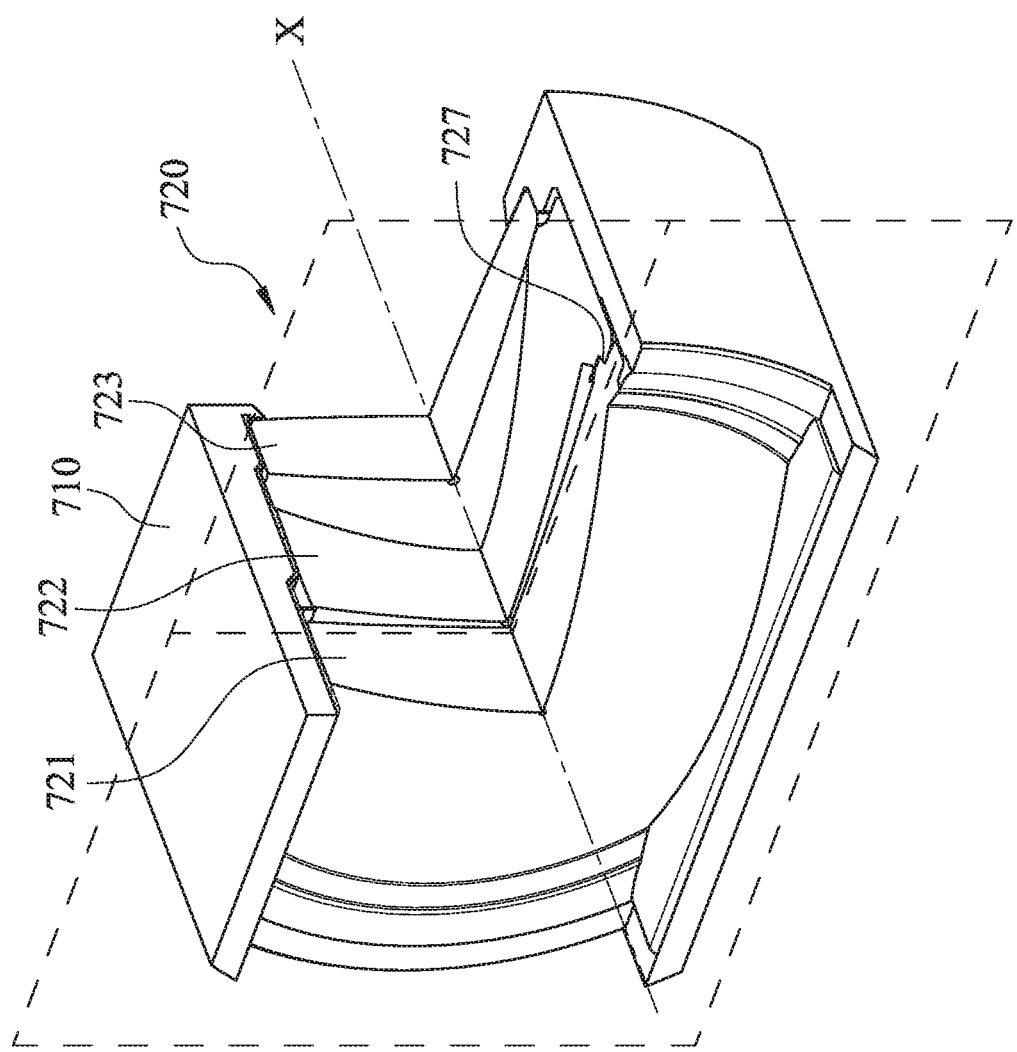
FIG. 7C is a partial cross-sectional view of the imaging lens assembly according to the 7th example in FIG. 7A.

FIG. 7A is an exploded view of an imaging lens assembly 70 according to the 7th example of the present disclosure. FIG. 7B is an assembling schematic view of the imaging lens assembly 70 according to the 7th example in FIG. 7A. FIG. 7C is a partial cross-sectional view of the imaging lens assembly 70 according to the 7th example in FIG. 7A. In FIGS. 7A to 7C, the imaging lens assembly 70 has an optical axis X, and includes a plastic carrier element 710 and an imaging lens element set 720. The imaging lens element set 720 is disposed in the plastic carrier element 710.

In detail, the plastic carrier element 710 includes an object-side surface 711, an image-side surface 712, an outer surface 713 and an inner surface 714, wherein the object-side surface 711 includes an object-side opening (its reference numeral is omitted), the image-side surface 712 includes an image-side opening (its reference numeral is omitted), and the inner surface 714 is connected to the object-side opening and the image-side opening. Furthermore, the plastic carrier element 710 can be a plastic lens barrel or a single member, which is integrally formed of the plastic lens barrel and a carrier element by injection molding.

The imaging lens element set 720 includes at least three lens elements. In detail, according to the 7th example, the imaging lens element set 720, in order from an object side to an image side, includes a first lens element 721, a first light blocking sheet, a second lens element 722 and a third lens element 723, wherein optical features such as structures, surface shapes and so on of the first lens element 721, the second lens element 722 and the third lens element 723 can be disposed according to different imaging demand. Further, the optical features are not important to the present disclosure, and the first light blocking sheet is not emphases of the present disclosure, so its reference numeral is omitted.

In FIG. 7A, a solid medium interval 730 is maintained between two adjacent lens elements of the at least three lens elements and the inner surface 714, wherein the solid medium interval 730 is directly contacted with the adjacent lens elements and the inner surface 714. According to the 7th example, the solid medium interval 730 is maintained between the first lens element 721 and the inner surface 714, the second lens element 722 and the inner surface 714, and the third lens element 723 and the inner surface 714, but is not limited thereto. In detail, the solid medium interval 730 includes a medium material (its reference numeral is omitted), and the medium material is disposed on the inner surface 714 or the imaging lens element set 720, wherein the medium material can be a thermosetting adhesive, a photo-curing adhesive, a light-absorbing layer or a black coating material, but is not limited thereto. Therefore, it is favorable for enhancing the efficiency of blocking the non-imaging light.

Each of at least two adjacent lens elements of the lens elements includes a first axial assembling structure 727, and the first axial assembling structures 727 are corresponding to and connected to each other. According to the 7th example, each of an image side of the first lens element 721 and an object side of the second lens element 722 includes the first axial assembling structure 727. In particular, the first axial assembling structure 727 of the image side of the first lens element 721 is corresponding to and connected to the first axial assembling structure 727 of the object side of the second lens element 722, but is not limited thereto. Therefore, it is favorable for maintaining the coaxiality between the lens elements.

Furthermore, the first axial assembling structures 727 are relatively disposed on the optical axis X, and the first axial assembling structures 727 with annular can be regarded as a combination of a plurality of relatively disposed axial assembling structures. Therefore, it is favorable for decreasing the possibility of the axis offset, the relative uniformity of the width of the solid medium interval 730 can be maintained, and the effect of capillarity can be more symmetrical.

An outer region of the at least one lens element of the lens elements is totally non-contacted with the inner surface 714 of the plastic carrier element 710. According to the 7th example, an outer region of the first lens element 721, an outer region of the second lens element 722 and an outer region of the third lens element 723 are totally non-contacted with the inner surface 714 of the plastic carrier element 710. Therefore, an accommodating space of the medium material can be provided, and the interference during assembling can be decreased to enhance the assembling velocity.

The solid medium interval 730 is made of an opaque material. Therefore, it is favorable for preventing the non-imaging light is transmitted in the solid medium interval 730.

Figure 7D:
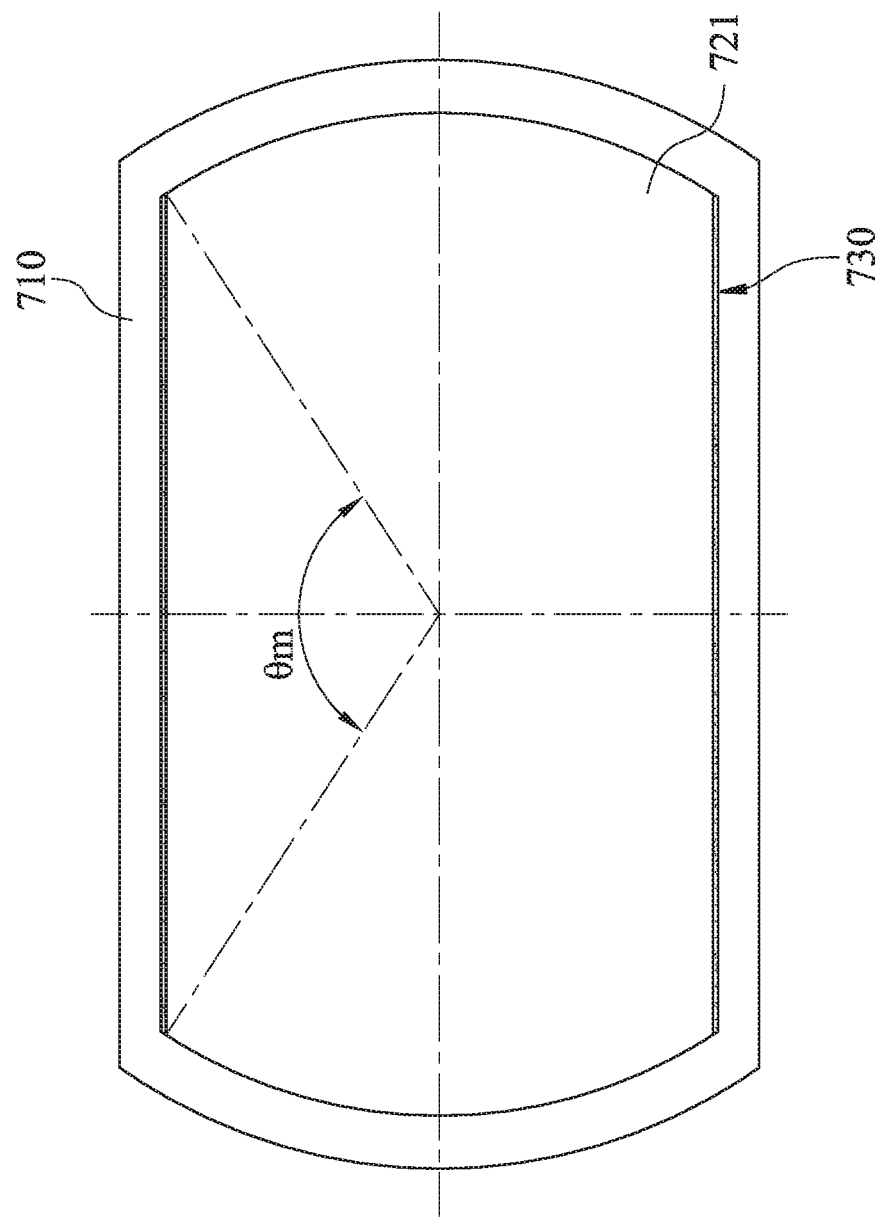
FIG. 7D is a plane view of the plastic carrier element and the first lens element according to the 7th example in FIG. 7C.

FIG. 7D is a plane view of the plastic carrier element 710 and the first lens element 721 according to the 7th example in FIG. 7C. In FIG. 7D, a range of an outer periphery of the at least one lens element of the lens elements directly contacted with the solid medium interval 730 is larger than a range of the outer periphery of the at least one lens element of the lens elements non-contacted with the solid medium interval 730 at a plane vertical to the optical axis X. According to the 7th example, a range of an outer periphery of the first lens element 721 directly contacted with the solid medium interval 730 is larger than a range of the outer periphery of the first lens element 721 non-contacted with the solid medium interval 730.

In FIG. 7A, the solid medium interval 730 is a closed full ring shape, and the solid medium interval 730 surrounds the imaging lens element set 720. In detail, the medium material is evenly disposed on the outer periphery of the imaging lens element set 720. Therefore, the deformation between elements is not easily formed after the medium material solidifying to form the solid medium interval 730.

Figure 7E:
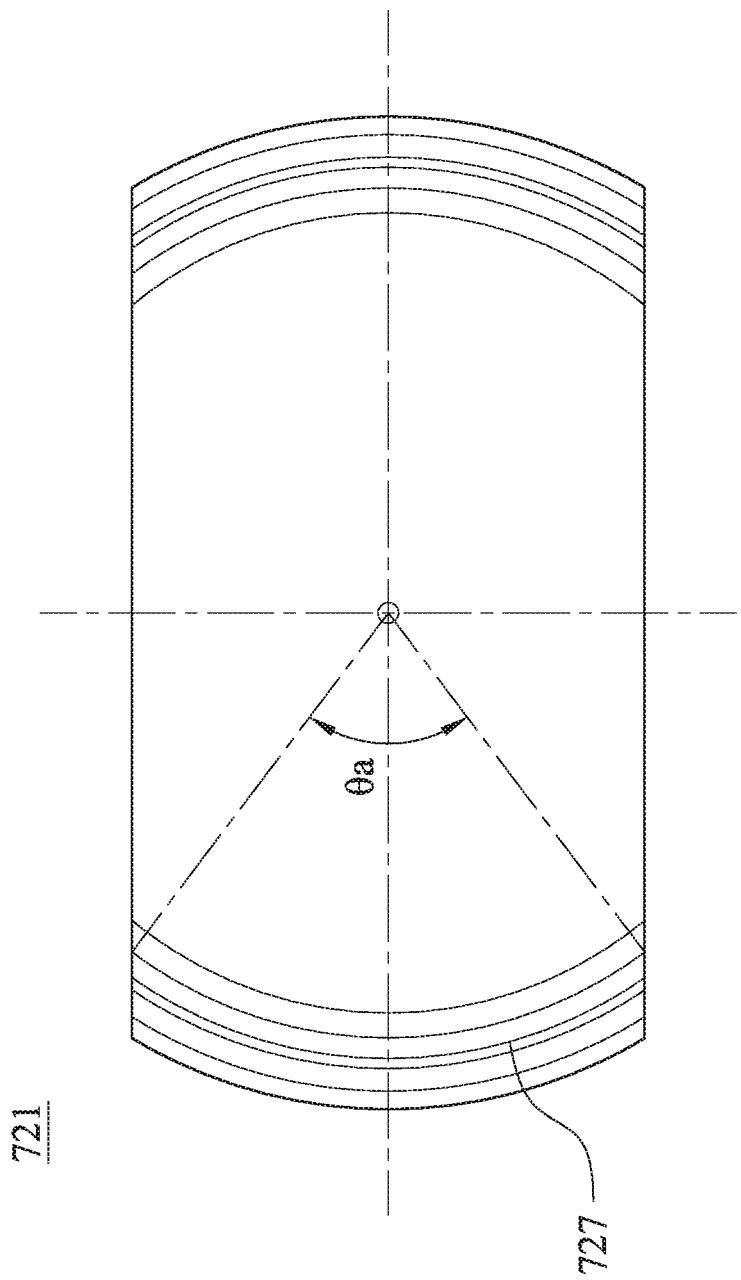
FIG. 7E is a plane view of the first lens element according to the 7th example in FIG. 7A.
Figure 7F:
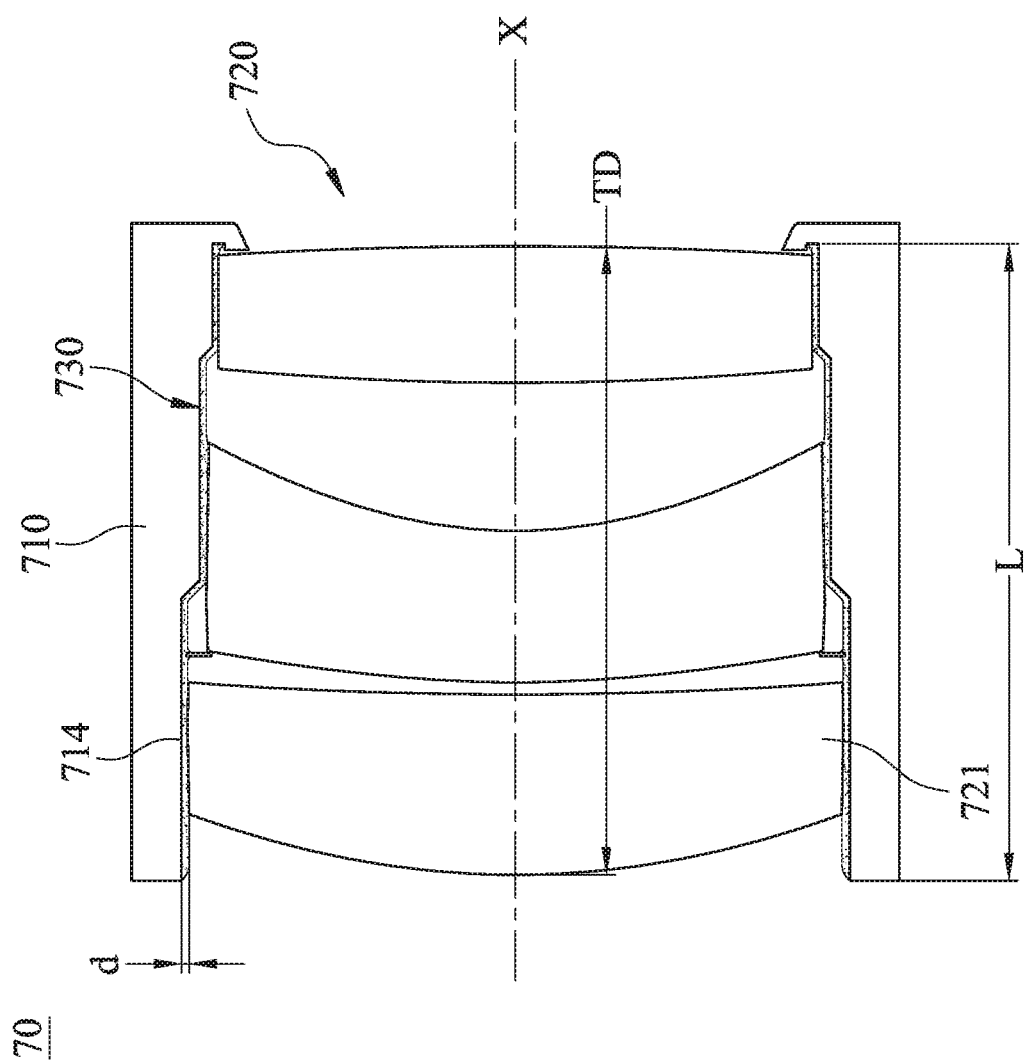
FIG. 7F is a schematic view of parameters according to the 7th example in FIG. 7A.

FIG. 7E is a plane view of the first lens element 721 according to the 7th example in FIG. 7A. FIG. 7F is a schematic view of parameters according to the 7th example in FIG. 7A. In FIGS. 7D to 7F, according to the 7th example, when an angle between the solid medium interval 730 at the plane vertical to the optical axis X and the optical axis X is θm, the range of the outer periphery of the at least one lens element of the lens elements directly contacted with the solid medium interval 730 is θm', a sum of the range of the outer periphery of the at least one lens element of the lens elements directly contacted with the solid medium interval 730 and the range of the outer periphery of the at least one lens element of the lens elements non-contacted with the solid medium interval 730 is θt (according to the 7th example, the lens element is the first lens element 721), an angle between each of the first axial assembling structures 727 at the plane vertical to the optical axis X and the optical axis X is θa, a total length of the solid medium interval 730 along the optical axis X is L, a total length of the imaging lens element set 720 along the optical axis X is TD, and a space width of the solid medium interval 730 between the lens elements and the inner surface 714 is d (according to the 7th example, the lens element is the first lens element 721), the following conditions of the Table 7 are satisfied.

TABLE 7

| 7th example | | | |
|---|---|---|---|
| θm (degree) | 114 | L (mm) | 5.134 |
| θm' (degree) | 228 | TD (mm) | 5.066 |
| θt (degree) | 360 | L/TD | 1.01 |
| θm'/θt | 0.63 | d (mm) | 0.062 |
| θa (degree) | 74 | | |

Furthermore, the angle between the solid medium interval 730 at the plane vertical to the optical axis X and the optical axis X is 114 degrees.

8th Example

Figure 8A:
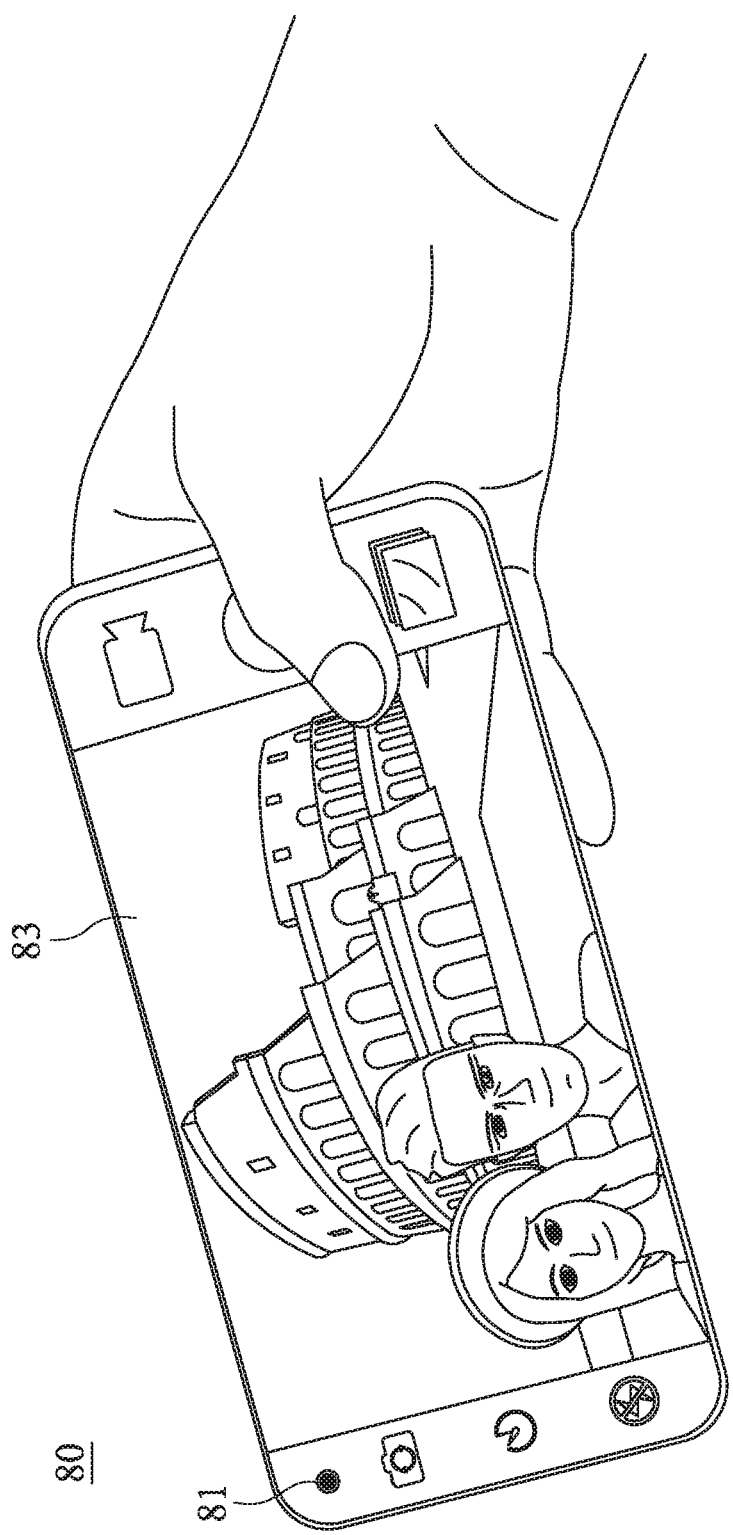
FIG. 8A is a schematic view of an electronic device according to the 8th example of the present disclosure.
Figure 8B:
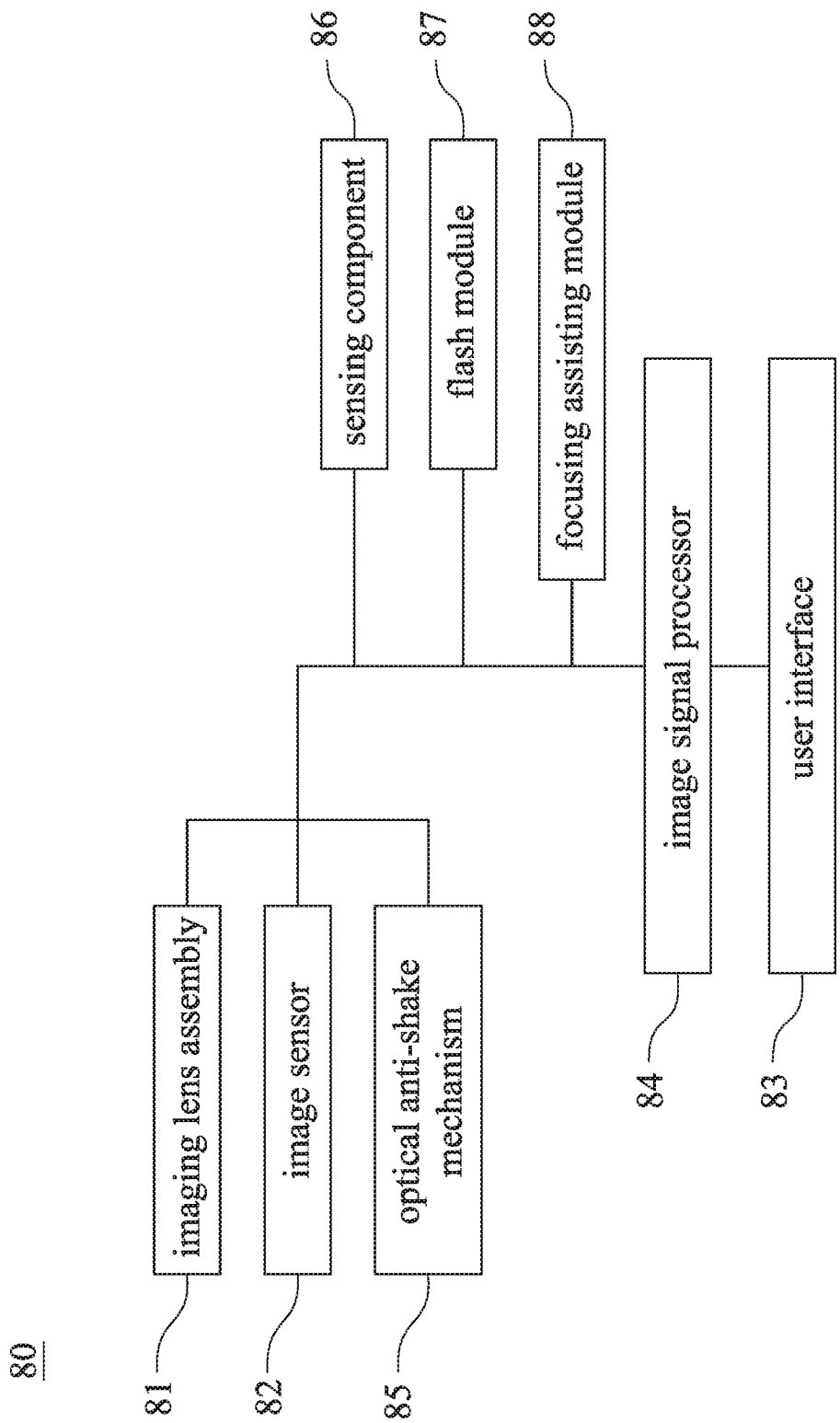
FIG. 8B is a block diagram of the electronic device according to the 8th example in FIG. 8A.

FIG. 8A is a schematic view of an electronic device 80 according to the 8th example of the present disclosure. FIG. 8B is a block diagram of the electronic device 80 according to the 8th example in FIG. 8A. In FIGS. 8A and 8B, the electronic device 80 is a smart phone, and includes an imaging lens assembly 81, a user interface 83 and an image sensor 82. The imaging lens assembly 81 according to the 8th example is disposed on an area of side of the user interface 83, the image sensor 82 is disposed on the image surface (not shown) of the imaging lens assembly 81, wherein the user interface 83 can be a touch screen or a display screen, but is not limited thereto. The imaging lens assembly 81 can be one of the imaging lens assembly according to the aforementioned 1st example to the 7th example, and the imaging lens assembly 81 includes a plastic carrier element (not shown) and an imaging optical element set (not shown), wherein the imaging optical element set is disposed in the plastic carrier element, but is not limited thereto.

Moreover, users enter a shooting mode via the user interface 83 of the electronic device 80. At this moment, the imaging light is gathered on the image sensor 82 via the imaging lens assembly 81, and an electronic signal about an image is output to an image signal processor (ISP) 84.

To meet a specification of a camera of the electronic device 80, the electronic device 80 can further include an optical anti-shake mechanism 85, which can be an optical image stabilization (OIS). Furthermore, the electronic device 80 can further include at least one auxiliary optical element (its reference numeral is omitted) and at least one sensing element 86. According to the 8th example, the auxiliary optical element is a flash module 87 and a focusing assisting module 88. The flash module 87 can be for compensating a color temperature, and the focusing assisting module 88 can be an infrared distance measurement component, a laser focus module, etc. The sensing element 86 can have functions for sensing physical momentum and kinetic energy, such as an accelerator, a gyroscope, a Hall Effect Element, to sense shaking or jitters applied by hands of the user or external environments. Accordingly, the imaging lens assembly 81 of the electronic device 80 equipped with an auto-focusing mechanism and the optical anti-shake mechanism 85 can be enhanced to achieve the superior image quality. Furthermore, the electronic device 80 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 80 can further include, but not be limited to, a display, a control unit, a storage unit, a random access memory (RAM), a read-only memory (ROM), or the combination thereof.

Figure 8C:
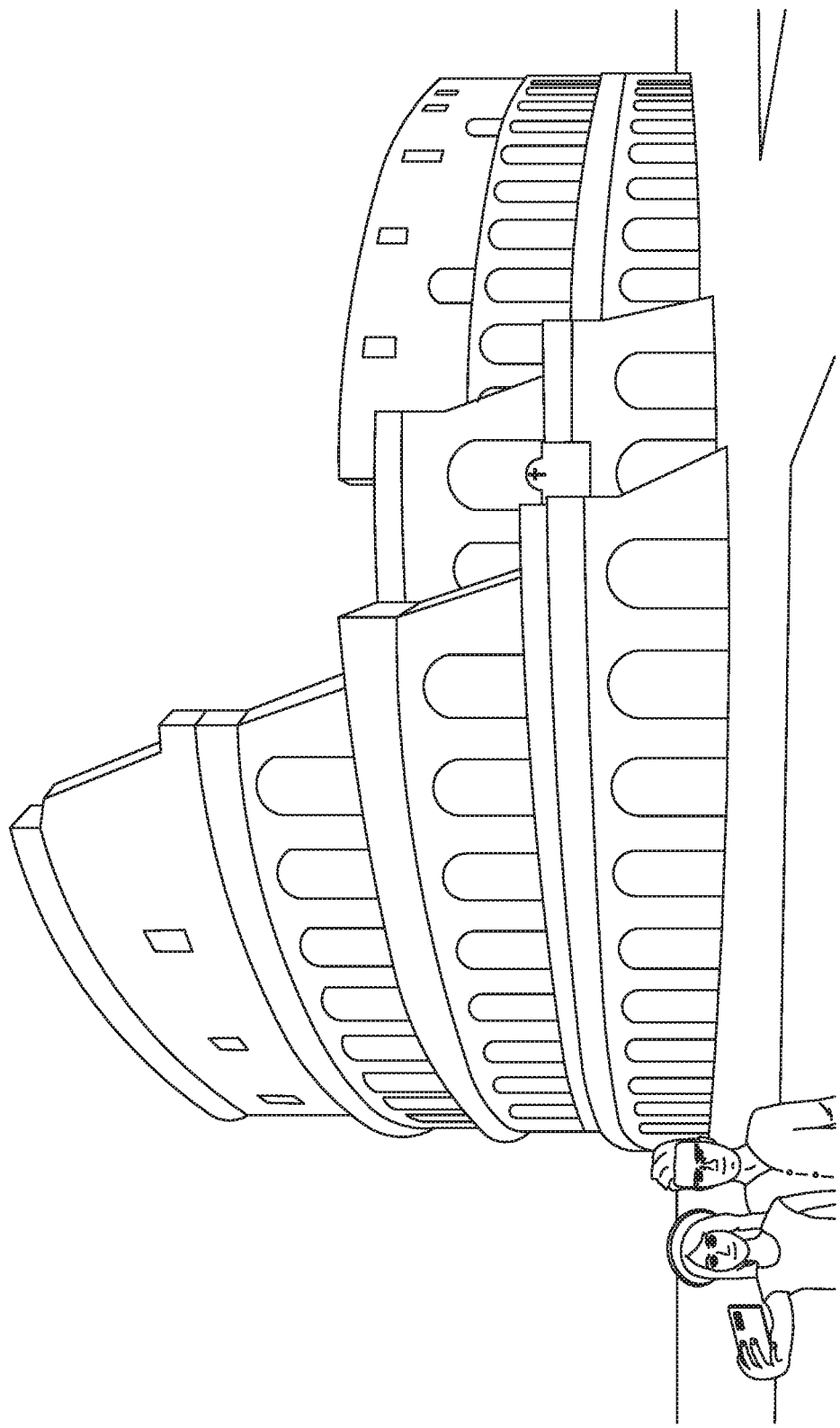
FIG. 8C is a schematic view of selfie scene according to the 8th example in FIG. 8A.
Figure 8D:
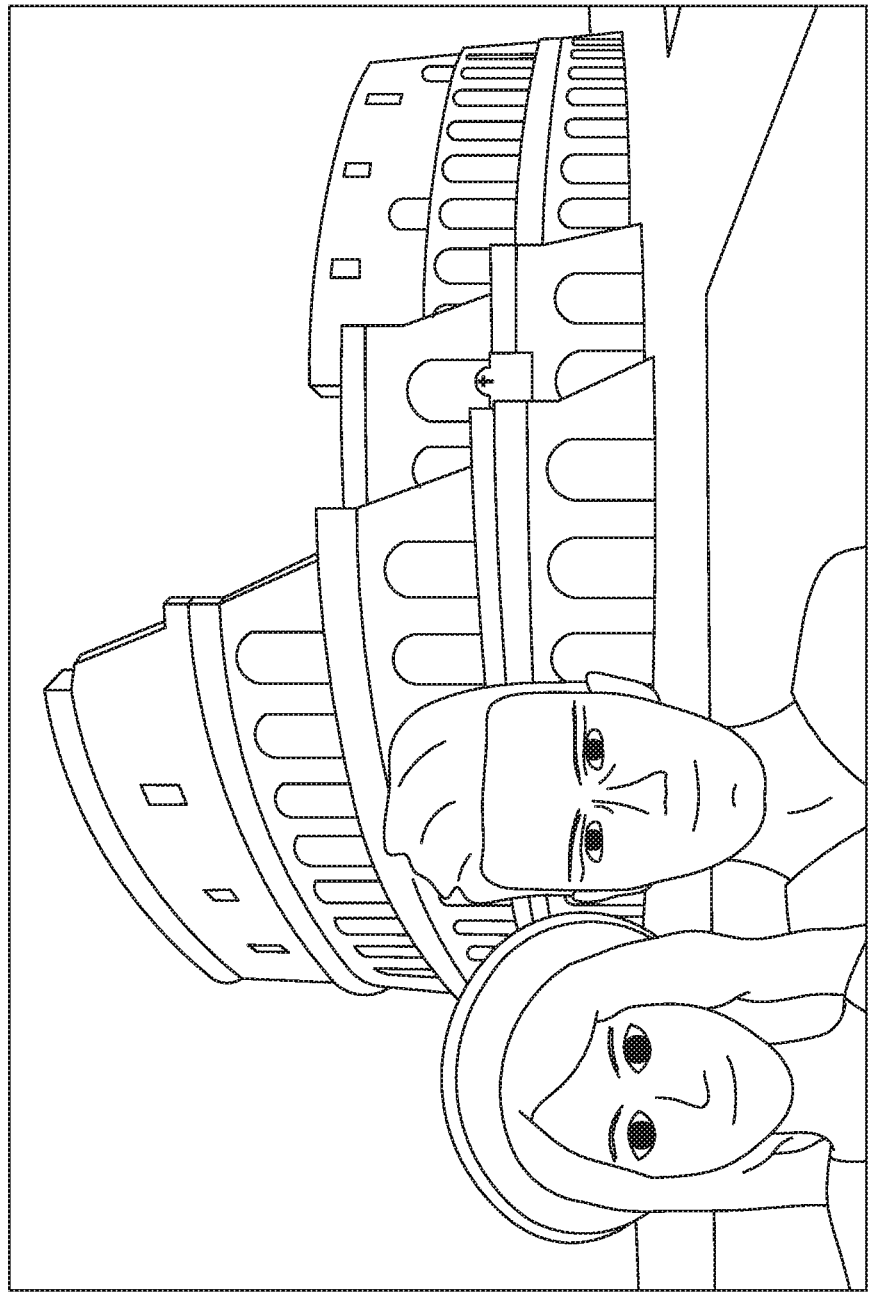
FIG. 8D is a schematic view of a captured image according to the 8th example in FIG. 8A.

FIG. 8C is a schematic view of selfie scene according to the 8th example in FIG. 8A. FIG. 8D is a schematic view of a captured image according to the 8th example in FIG. 8A. In FIGS. 8A to 8D, the imaging lens assembly 81 and the user interface 83 face towards the users. When proceeding selfie or live streaming, the users can watch a captured image and operate an interface at the same time, and the capture image as FIG. 8D can be obtained after shooting. Therefore, better shooting experience can be provided via the imaging lens assembly 81 of the present disclosure.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, which has an optical axis, comprising:
   a plastic carrier element comprising:
      an object-side surface comprising an object-side opening;
      an image-side surface comprising an image-side opening;
      an outer surface; and
      an inner surface connected to the object-side opening and the image-side opening; and
   an imaging lens element set disposed in the plastic carrier element, and comprising at least three lens elements, wherein each of at least two adjacent lens elements of the at least three lens elements comprises a first axial assembling structure, and the first axial assembling structures are corresponding to and connected to each other;
   wherein a solid medium interval is maintained between the at least two adjacent lens elements and the inner surface;
   wherein the solid medium interval is directly contacted with the at least two adjacent lens elements and the inner surface;
   wherein an air gap is further comprised between the at least two adjacent lens elements and the inner surface, and the air gap along a radial direction is closer to the optical axis than the solid medium interval to the optical axis;
   wherein at least one lens element of the at least two adjacent lens elements comprises an annular groove structure, and at least one of the solid medium interval and the air gap is interconnected to the annular groove structure;
   wherein the solid medium interval is made of a medium material, and the medium material is formed the solid medium interval after solidifying;
   wherein an angle between the solid medium interval at a plane vertical to the optical axis and the optical axis is θm, and the following condition is satisfied:
      90 degrees≤θm≤360 degrees.

2. The imaging lens assembly of claim 1, wherein the at least one lens element of the at least two adjacent lens elements comprises a plurality of protruding structures protruding along a direction vertical to the optical axis and regularly arranged around an outer periphery of the at least one lens element of the at least two adjacent lens elements, and the solid medium interval are directly contacted with the protruding structures.

3. The imaging lens assembly of claim 1, wherein a total length of the solid medium interval along the optical axis is L, a total length of the imaging lens element set along the optical axis is TD, and the following condition is satisfied:
   0.20<L/TD<1.20.

4. The imaging lens assembly of claim 3, wherein the total length of the solid medium interval along the optical axis is L, the total length of the imaging lens element set along the optical axis is TD, and the following condition is satisfied:
   0.30<L/TD<1.05.

5. The imaging lens assembly of claim 1, wherein an outer region of the at least one lens element of the at least two adjacent lens elements is totally non-contacted with the inner surface of the plastic carrier element.

6. The imaging lens assembly of claim 1, wherein a cement material is disposed between the at least two adjacent lens elements, and the at least two adjacent lens elements are cemented to each other to form a cemented lens group, wherein the first axial assembling structure of each of the at least two adjacent lens elements surrounds the cement material.

7. The imaging lens assembly of claim 1, wherein the solid medium interval is made of an opaque material.

8. The imaging lens assembly of claim 1, wherein an angle between each of the first axial assembling structures at the plane vertical to the optical axis and the optical axis is θa, and the following condition is satisfied:
   60 degrees<θa≤360 degrees.

9. An imaging lens assembly, which has an optical axis, comprising:
   a plastic carrier element comprising:
      an object-side surface comprising an object-side opening;
      an image-side surface comprising an image-side opening;
      an outer surface; and
      an inner surface connected to the object-side opening and the image-side opening; and
   an imaging lens element set disposed in the plastic carrier element, and comprising at least three lens elements, wherein each of at least two adjacent lens elements of the at least three lens elements comprises a first axial assembling structure, and the first axial assembling structures are corresponding to and connected to each other;
   wherein a solid medium interval is maintained between the at least two adjacent lens elements and the inner surface;
   wherein the solid medium interval is directly contacted with the at least two adjacent lens elements and the inner surface;
   wherein a range of an outer periphery of at least one lens element of the at least three lens elements directly contacted with the solid medium interval is larger than a range of the outer periphery of the at least one lens element of the at least three lens elements non-contacted with the solid medium interval at a plane vertical to the optical axis;

wherein an air gap is further comprised between the at least two adjacent lens elements and the inner surface, and the air gap along a radial direction is closer to the optical axis than the solid medium interval to the optical axis;

wherein at least one lens element of the at least two adjacent lens elements comprises an annular groove structure, and at least one of the solid medium interval and the air gap is interconnected to the annular groove structure;

wherein the solid medium interval is made of a medium material, and the medium material is formed the solid medium interval after solidifying;

wherein a space width of the solid medium interval between the at least two adjacent lens elements and the inner surface is d, and the following condition is satisfied:

0.01 mm≤d<0.18 mm.

10. The imaging lens assembly of claim 9, wherein the first axial assembling structures are relatively disposed on the optical axis.

11. The imaging lens assembly of claim 9, wherein each of the plastic carrier element and the at least one lens element of the at least three lens elements closest to an object side of the imaging lens element set comprises a second axial assembling structure, and the second axial assembling structures are corresponding to and connected to each other.

12. The imaging lens assembly of claim 9, wherein the solid medium interval is made of an opaque material.

13. The imaging lens assembly of claim 12, wherein the space width of the solid medium interval between the at least two adjacent lens elements and the inner surface is d, and the following condition is satisfied:

0.01 mm≤d<0.10 mm.

14. The imaging lens assembly of claim 9, wherein the solid medium interval is a closed full ring shape, and the solid medium interval surrounds the imaging lens element set.

15. The imaging lens assembly of claim 9, wherein a driving apparatus is disposed on the outer surface of the plastic carrier element, and the driving apparatus is for driving the imaging lens assembly to move along a direction parallel to the optical axis.

16. The imaging lens assembly of claim 9, wherein an outer region of the at least one lens element of the at least two adjacent lens elements is totally non-contacted with the inner surface of the plastic carrier element.

17. The imaging lens assembly of claim 9, wherein the range of the outer periphery of the at least one lens element of the at least three lens elements directly contacted with the solid medium interval is θm', a sum of the range of the outer periphery of the at least one lens element of the at least three lens elements directly contacted with the solid medium interval and the range of the outer periphery of the at least one lens element of the at least three lens elements non-contacted with the solid medium interval is θt, and the following condition is satisfied:

0.55<θm'/θt≤1.0.

18. An electronic device, comprising:
the imaging lens assembly of claim 9; and
an image sensor disposed on an image surface of the imaging lens assembly.

* * * * *